(12) United States Patent
Yeo et al.

(10) Patent No.: US 11,791,937 B2
(45) Date of Patent: Oct. 17, 2023

(54) METHOD AND APPARATUS FOR TRANSMISSION AND RECEPTION OF SIDELINK CONTROL INFORMATION IN WIRELESS COMMUNICATION SYSTEM

(71) Applicant: Samsung Electronics Co., Ltd., Suwon-si (KR)

(72) Inventors: Jeongho Yeo, Suwon-si (KR); Hyunseok Ryu, Suwon-si (KR); Cheolkyu Shin, Suwon-si (KR); Jonghyun Bang, Suwon-si (KR); Sungjin Park, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/170,207

(22) Filed: Feb. 16, 2023

(65) Prior Publication Data
US 2023/0208557 A1    Jun. 29, 2023

Related U.S. Application Data

(63) Continuation of application No. 17/486,249, filed on Sep. 27, 2021, now Pat. No. 11,588,581, which is a (Continued)

(30) Foreign Application Priority Data

May 2, 2019    (KR) .................. 10-2019-0051798
Dec. 2, 2019   (KR) .................. 10-2019-0158371
Dec. 3, 2019   (KR) .................. 10-2019-0159030

(51) Int. Cl.
*H04W 72/20*    (2023.01)
*H04L 1/00*     (2006.01)
(Continued)

(52) U.S. Cl.
CPC .......... *H04L 1/0072* (2013.01); *H04L 1/0013* (2013.01); *H04L 1/0023* (2013.01);
(Continued)

(58) Field of Classification Search
CPC ............................... H04W 4/46; H04W 92/18
See application file for complete search history.

(56) References Cited

U.S. PATENT DOCUMENTS

2010/0127361 A1    5/2010   Kuan et al.
2018/0139724 A1    5/2018   Loehr et al.
(Continued)

OTHER PUBLICATIONS

Interdigital Inc., On Physical Layer Structure for NR V2X Sidelink, R1-1905400, 3GPP TSG RAN WG1 Meeting #96b, Apr. 3, 2019, Xi'an, China, sections 2.4-2.4.1.
(Continued)

*Primary Examiner* — Kevin Kim
(74) *Attorney, Agent, or Firm* — Jefferson IP Law, LLP

(57) ABSTRACT

A communication method and a system for converging a 5th-generation (5G) communication system for supporting higher data rates beyond a 4th-generation (4G) system with a technology for Internet of things (IoT) are provided. The disclosure may be applied to intelligent services based on the 5G communication technology and the IoT-related technology, such as a smart home, a smart building, a smart city, a smart car, a connected car, health care, digital education, a smart retail, security and safety services. The disclosure provides a method and an apparatus for efficient transmission and reception of control information in a sidelink communication.

22 Claims, 37 Drawing Sheets

Related U.S. Application Data continuation of application No. 16/861,918, filed on Apr. 29, 2020, now Pat. No. 11,134,478.

(60) Provisional application No. 62/938,918, filed on Nov. 21, 2019.

(51) Int. Cl.
  *H04L 5/00* (2006.01)
  *H04L 1/1829* (2023.01)
  *H04L 27/26* (2006.01)

(52) U.S. Cl.
  CPC .......... *H04L 1/1861* (2013.01); *H04L 5/0007* (2013.01); *H04L 27/2607* (2013.01); *H04W 72/20* (2023.01); *H04L 27/261* (2013.01); *H04L 27/26025* (2021.01)

(56) References Cited

U.S. PATENT DOCUMENTS

| | | | |
|---|---|---|---|
| 2019/0052436 A1* | 2/2019 | Desai | H04L 5/0055 |
| 2020/0260472 A1 | 8/2020 | Ganesan et al. | |
| 2020/0288435 A1 | 9/2020 | Kwak et al. | |
| 2022/0078778 A1* | 3/2022 | Zhao | H04L 1/1887 |

OTHER PUBLICATIONS

Mediatek Inc., On sidelink physical layer structure, R1-1904492, 3GPP TSG RAN WG1 Meeting #96b, Apr. 3, 2019, Xi'an, China, section 2.

NTT DoCoMo, Inc., NR Sidelink Physical Layer Structure, R1-1905421, 3GPP TSG RAN WG1 Meeting #96b, Apr. 3, 2019, Xi'an, China, section 2.1; and figure 1.

Ericsson, PHY layer structure for NR sidelink, R1-1905475, 3GPP TSG RAN WG1 Meeting #96b, Apr. 2, 2019, Xi'an, China, section 3.1.

International Search Report dated Aug. 6, 2020, issued in International Application No. PCT/KR2020/005799.

Panasonic, Discussion on physical layer structure for sidelink in NR V2X, R1-1912752, 3GPP TSG RAN WG1 #99, Nov. 8, 2019, Reno, USA.

Samsung, Feature lead summary#1 for agenda item 7.2.4.1 physical layer structure for sidelink, R1-1912457, 3GPP TSG RAN WG1 #99 Meeting, Nov. 19, 2019, Reno, USA.

LG Electronics, Discussion on physical layer structure for NR sidelink, R1-1912586, 3GPP TSG RAN WG1 #99, Nov. 9, 2019, Reno, USA.

Nokia et al, Discussion of physical layer structure for sidelink, R1-1911952, 3GPP TSG RAN WG1 #99, Nov. 9, 2019, Reno, US.

European Search Report dated Apr. 8, 2022, issued in European Application No. 20798415.4.

* cited by examiner

FIG. 21

METHOD AND APPARATUS FOR TRANSMISSION AND RECEPTION OF SIDELINK CONTROL INFORMATION IN WIRELESS COMMUNICATION SYSTEM

CROSS-REFERENCE TO RELATED APPLICATION(S)

This application is a continuation application of prior application Ser. No. 17/486,249, filed on Sep. 27, 2021, which has issued as U.S. Pat. No. 11,588,581 on Feb. 21, 2023, which is a continuation application of prior application Ser. No. 16/861,918, filed on Apr. 29, 2020, which has issued as U.S. Pat. No. 11,134,478 on Sep. 28, 2021 and is based on and claims priority under 35 U.S.C. § 119(e) of a U.S. provisional patent application Ser. No. 62/938,918, filed on Nov. 21, 2019, in the U.S. Patent and Trademark Office, and under 35 U.S.C. § 119(a) of a Korean patent application number 10-2019-0051798, filed on May 2, 2019, in the Korean Intellectual Property Office, of a Korean patent application number 10-2019-0158371, filed on Dec. 2, 2019, in the Korean Intellectual Property Office, and of a Korean patent application number 10-2019-0159030, filed on Dec. 3, 2019, in the Korean Intellectual Property Office, the disclosure of each of which is incorporated by reference herein in its entirety.

BACKGROUND

1. Field

The disclosure relates to a wireless communication system, and relates to a method and an apparatus for transmission and reception of control information in a sidelink. More particularly, the disclosure relates to an operation between terminals, a resource mapping method, and a decoding method in case of applying a method for transmission and reception of control information dividedly in two stages in a sidelink.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a wireless communication system, and a method and an apparatus for transmission and reception of control information in a sidelink.

Another aspect of the disclosure is to provide an operation between terminals, a resource mapping method, and a decoding method in case of applying a method for transmission and reception of control information dividedly in two stages in a sidelink. In a method for transmission and reception of control information in two stages, a receiving terminal decodes first control information, decodes second control information, and decodes sidelink data based on the second control information and the first control information. In such a method, a method by a transmitting terminal for mapping and transmitting the second control information and a method by a receiving terminal for finding out and decoding a mapping location of the second control information are necessary. The disclosure makes smooth sidelink transmission and reception possible by providing a method for mapping and decoding the second control information and a method and an apparatus for calculating the number of coded bits after applying a channel coding.

Additional aspects will be set forth in part in the description which follows and, in part, will be apparent from the description, or may be learned by practice of the presented embodiments.

In accordance with an aspect of the disclosure, a method performed by a first terminal in a communication system is provided. The method includes identifying second sidelink control information (SCI) for transmitting sidelink data, identifying first SCI for transmitting the sidelink data based on the second SCI, identifying resources for the first SCI and the second SCI, and transmitting, to a second terminal, the first SCI and the second SCI on the identified resources, wherein the resource for the second SCI is identified based on a number of coded symbols for the second SCI, and wherein the number of coded symbols for the second SCI is identified based on a parameter corresponding to a number of one or more resource elements in a resource block to which a last coded symbols for the second SCI is mapped.

In accordance with another aspect of the disclosure, a method performed by a first terminal in a communication system is provided. The method includes receiving, from a second terminal, first SCI for receiving sidelink data, identifying a resource for second SCI for receiving the sidelink data based on the first SCI, and performing a decoding of the second SCI based on the identified resource, wherein the identified resource for the second SCI is identified based on a number of coded symbols for the second SCI, and wherein the number of coded symbols for the second SCI is identified based on a parameter corresponding to a number of one or more resource elements in a resource block to which a last coded symbols for the second SCI is mapped.

In accordance with another aspect of the disclosure, a first terminal in a communication system is provided. The first terminal includes a transceiver, and at least one processor coupled with the transceiver and configured to identify second SCI for transmitting sidelink data, identify first SCI for transmitting the sidelink data based on the second SCI, identify resources for the first SCI and the second SCI, and transmit, to a second terminal, the first SCI and the second SCI on the identified resources, wherein the resource for the second SCI is identified based on a number of coded symbols for the second SCI, and wherein the number of coded symbols for the second SCI is identified based on a parameter corresponding to a number of one or more resource elements in a resource block to which a last coded symbols for the second SCI is mapped.

In accordance with another aspect of the disclosure, a first terminal in a communication system is provided. The first terminal includes a transceiver, and at least one processor coupled with the transceiver and configured to receive, from a second terminal, first SCI for receiving sidelink data, identify a resource for second SCI for receiving the sidelink data based on the first SCI, and perform a decoding of the second SCI based on the identified resource, wherein the identified resource for the second SCI is identified based on a number of coded symbols for the second SCI, and wherein the number of coded symbols for the second SCI is identified based on a parameter corresponding to a number of one or more resource elements in a resource block to which a last coded symbols for the second SCI is mapped.

According to aspects of the disclosure, the smooth sidelink transmission and reception becomes possible by providing the method for mapping and decoding the second control information and the method and the apparatus for calculating the number of coded bits after applying the channel coding.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which:

FIG. 21 is a diagram illustrating a method for transmitting second control information on a PSSCH according to an embodiment of the disclosure;

Throughout the drawings, like reference numerals will be understood to refer to like parts, components, and structures.

DETAILED DESCRIPTION

Figure 1:
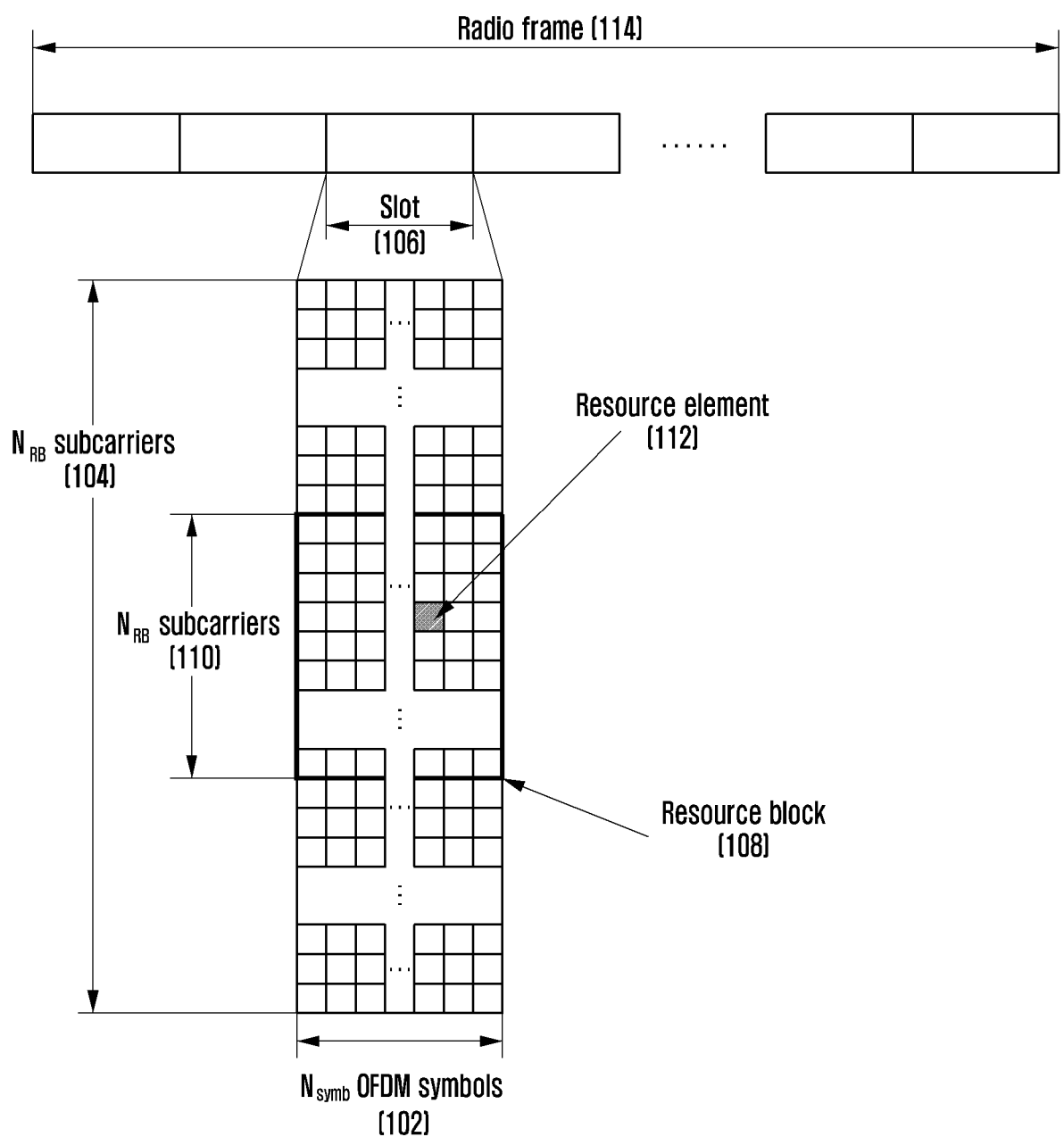
FIG. 1 is a diagram illustrating a basic structure of a time-frequency domain that is a radio resource region in which data or a control channel is transmitted on a downlink or an uplink in a new radio (NR) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In a new radio access technology (NR) that is a new $5^{th}$ generation (5G) communication, various services have been designed so that they can be freely multiplexed on time and frequency resources, and accordingly, waveform/numerology and reference signals can be dynamically or freely allocated as needed for the corresponding services. In order to provide optimum services to a terminal in wireless communications, it is important to optimize the data transmission through measurement of the channel quality and the interference amount, and thus it is essential to measure an accurate channel state. However, in case of the 5G channel, in contrast with the 4G communication in which the channel and interference characteristics are not greatly changed depending on the frequency resources, the channel and interference characteristics are greatly changed depending on the services, and thus it is necessary to support a subset of frequency resource group (FRG) dimensions that makes it possible to dividedly measure the channel and interference characteristics. Meanwhile, in the NR system, supported services may be divided into categories of an enhanced mobile broadband (eMBB), massive machine type communications (mMTC), and ultra-reliable and low-latency communications (URLLC). The eMBB may be considered as a service aimed at high-speed transmission of high-capacity data, the mMTC may be considered as a service aimed at minimization of a terminal power and accesses of a plurality of terminals, and the URLLC may be considered as a service aimed at high reliability and low latency. Different requirements may be applied in accordance with the kinds of services applied to the terminal.

Hereinafter, embodiments of the disclosure will be described with reference to the accompanying drawings.

In describing the embodiments of the disclosure, explanation of technical contents that are well known in the art to which the disclosure pertains and are not directly related to the disclosure will be omitted. This is to transfer the subject matter of the disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the disclosure and methods for achieving the aspects and features will be apparent by referring to the embodiments to be described with reference to the accompanying drawings. However, the disclosure is not limited to the embodiments disclosed hereinafter, and it can be implemented in diverse forms. The matters defined in the description, such as the detailed construction and elements, are only specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

In addition, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as field programmable gate array (FPGA) or application specific integrated circuit (ASIC), which performs certain tasks. However, "~unit" is not meant to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card. Further, in an embodiment, "~unit" may include one or more processors.

A wireless communication system was initially developed for the purpose of providing a voice-oriented service, but it has been expanded to, for example, a broadband wireless communication system that provides a high-speed and high-quality packet data service together with the communication standards, such as 3GPP high speed packet access (HSPA), long term evolution (LTE) or evolved universal terrestrial radio access (E-UTRA), LTE-Advanced (LTE-A), 3GPP2 high rate packet data (HRPD), ultra-mobile broadband (UMB), and IEEE 802.16e. In addition, for the 5th generation wireless communication system, 5G or new radio (NR) communication standards have been made.

In the NR system that is a representative example of broadband wireless communication systems, the downlink (DL) and uplink (UL) adopt orthogonal frequency division multiplexing (OFDM) schemes. More specifically, the downlink adopts a cyclic-prefix OFDM (CP-OFDM) scheme, and the uplink (UL) adopts a discrete Fourier transform spreading OFDM (DFT-S-OFDM) scheme in addition to the CP-OFDM. The uplink means a radio link in which a terminal (or user equipment (UE) or mobile station (MS)) transmits data or a control signal to a base station (or gNodeB or base station (BS)), and the downlink means a radio link in which the base station transmits data or a control signal to the terminal. Such a multi-access scheme may discriminate data or control information of respective users from each other by allocating and operating time-frequency resources on which the data or control information of the respective users is to be carried so that the time-frequency resources do not overlap each other, that is, so as to establish orthogonality.

The NR system adopts a hybrid automatic repeat request (HARQ) scheme in which a physical layer retransmits the corresponding data if decoding failure occurs during an initial transmission. According to the HARQ scheme, a receiver may transmit information (negative acknowledgement (NACK)) for notifying a transmitter of the decoding failure if the receiver has not accurately decoded the data, and the transmitter may make a physical layer retransmit the corresponding data. The receiver may combine the data that is retransmitted by the transmitter with the previous data of which the decoding has failed to heighten the data reception performance. Further, if the receiver has accurately decoded the data, the HARQ scheme may transmit information (acknowledgement (ACK)) for notifying of a decoding success to the transmitter, so that the transmitter can transmit new data.

FIG. 1 is a diagram illustrating a basic structure of a time-frequency domain that is a radio resource region in which data or a control channel is transmitted on a downlink or an uplink in an NR system according to an embodiment of the disclosure.

Referring to FIG. 1, in a radio frame 114, a horizontal axis represents a time domain, and a vertical axis represents a frequency domain. In the time domain, the minimum transmission unit is an OFDM symbol, and $N_{symb}$ OFDM symbols 102 constitute one slot 106. The length of the subframe is defined as 1.0 ms, and a radio frame is defined as 10 ms. In the frequency domain, the minimum transmission unit is a subcarrier, and the transmission bandwidth of the whole system includes $N_{BW}$ subcarriers 104 in total.

In the time-frequency domain, the basic unit of resources is a resource element (RE) 112, which may be expressed by an OFDM symbol index and a subcarrier index. A resource block (RB) 108 or a physical resource block (PRB) is defined by $N_{RB}$ contiguous subcarriers 110 in the frequency domain. In general, the minimum transmission unit of data is the RB as described above. In the NR system, it is general that $N_{symb}=1^4$ and $N_{RB}=12$, and $N_{BW}$ is in proportion to the bandwidth of the system transmission band. The data rate may be increased in proportion to the number of RBs that are scheduled to the terminal.

In case of an FDD system that operates to discriminate a downlink and an uplink by means of frequencies in the NR system, the downlink transmission bandwidth and the uplink transmission bandwidth may differ from each other. A channel bandwidth indicates an RF bandwidth corresponding to the system transmission bandwidth. Tables 1 and 2 present a part of the corresponding relationship among the system transmission bandwidth that is defined by the NR system in the frequency band that is lower than 6 GHz and in the frequency band that is higher than 6 GHz, subcarrier spacing, and channel bandwidth. For example, the NR system having 100 MHz channel bandwidth with 30 kHz subcarrier spacing has the transmission bandwidth that includes 273 RBs. Hereinafter, N/A may be a bandwidth-subcarrier combination that is not supported by the NR system.

TABLE 1

| Channel bandwidth $BW_{channel}$ [MHz] | Subcarrier spacing | 5 MHz | 10 MHz | 20 MHz | 50 MHz | 80 MHz | 100 MHz |
|---|---|---|---|---|---|---|---|
| Transmission bandwidth configuration $N_{RB}$ | 15 kHz | 25 | 52 | 106 | 270 | N/A | N/A |
| | 30 kHz | 11 | 24 | 51 | 133 | 217 | 273 |
| | 60 kHz | N/A | 11 | 24 | 65 | 107 | 135 |

TABLE 2

| Channel bandwidth $BW_{channel}$ [MHz] | Subcarrier Spacing | 50 MHz | 100 MHz | 200 MHz | 400 MHz |
|---|---|---|---|---|---|
| Transmission bandwidth configuration $N_{RB}$ | 60 kHz | 66 | 132 | 264 | N/A |
| | 120 kHz | 32 | 66 | 132 | 264 |

In the NR system, the frequency range may be dividedly defined by FR1 and FR2 as in Table 3 below.

TABLE 3

| Frequency range designation | Corresponding frequency range |
|---|---|
| FR1 | 450 MHz-7125 MHz |
| FR2 | 24250 MHz-52600 MHz |

As described above, it may be possible that the range of the FR1 and FR2 may be differently applied. As an example, the frequency range of FR1 may be changed and applied from 450 MHz to 6000 MHz.

In the NR system, scheduling information on downlink data or uplink data is transferred from the base station to the terminal through downlink control Information (DCI). The DCI may be defined in accordance with various formats, and it may corresponds to whether the DCI is scheduling information on uplink data (UL grant) or scheduling information on downlink data (DL grant) according to each format, whether the DCI is compact DCI having a small size of control information, whether spatial multiplexing using multiple antennas is applied, and whether the DCI is DCI for power control. For example, DCI format 1-1 that is the scheduling control information on the downlink data (DL grant) may include at least one piece of the following control information.

Carrier indicator: This indicates on what frequency carrier the corresponding DCI is transmitted.

DCI format indicator: This is an indicator discriminating whether the corresponding DCI is for a downlink or an uplink.

Bandwidth part (BWP) indicator: This indicates from what BWP the corresponding DCI is transmitted.

Frequency domain resource assignment: This indicates the RB of the frequency domain allocated to the data transmission. An expressed resource is determined in accordance with the system bandwidth and resource allocation scheme.

Time domain resource assignment: This indicates from what OFDM symbol of what slot a data related channel is to be transmitted.

VRB-to-PRB mapping: This indicates in what scheme a virtual RB (VRB) index and a physical RB (PRB) index are mapped onto each other.

Modulation and coding scheme (MCS): This indicates a modulation scheme and the size of a transport block that is data intended to be transmitted.

HARQ process number: This indicates a process number of HARQ.

New data indicator: This indicates whether HARQ is initially transmitted or retransmitted.

Redundancy version: This indicates a redundancy version of HARQ.

Transmit power control (TCP) command for a physical uplink control channel (PUCCH): This indicates a transmission power control command for PUCCH that is an uplink control channel.

In case of data transmission through a physical uplink shared channel (PUSCH) as described above, the time domain resource assignment may be transferred by information on a slot on which the PUSCH is transmitted, a start OFDM symbol location S on the corresponding slot, and the number L of symbols onto which the PUSCH is mapped. As described above, the location S may be a relative location from the start of the slot, L may be the number of contiguous symbols, and S and L may be determined by a start and length indicator value (SLIV) defined as follows.

if $(L-1) \leq 7$ then $$SLIV = 14 \cdot (L-1) + S$$

else $$SLIV = 14 \cdot (14 - L + 1) + (14 - 1 - S)$$

where $0 < L \leq 14 - S$

In the NR system, the terminal can be configured with information on the SLIV value, the PUSCH mapping type, and the PUSCH transmission slot in one row through radio resource control (RRC) configuration (e.g., the above-described information may be configured in the form of a table). Thereafter, in the time domain resource assignment of the DCI, the base station can transfer the information on the SLIV value, the PUSCH mapping type, and the PUSCH transmission slot to the terminal by indicating index values in the configured table.

In the NR system, as the PUSCH mapping type, type A and type B have been defined. According to the PUSCH mapping type A, the first symbol of DMRS symbols is located on the second or third OFDM symbol of the slot. According to the PUSCH mapping type B, the first symbol of the DMRS symbols is located on the first OFDM symbol in the time domain resource allocated through the PUSCH transmission.

The PUSCH resource mapping method as described above may also be applied to the downlink data transmission through the physical downlink shared channel (PDSCH) in a similar manner. In the NR system, the PDSCH mapping type may be defined as type A and type B, and particularly in the mapping type B, the first symbol of the DMRS symbols may be located on the first symbol of the PDSCH.

The DCI may pass through a channel coding and modulation process, and may be transmitted on a physical downlink control channel (PUCCH) that is a downlink physical control channel. In the disclosure, a case that the control information is transmitted on the PDCCH or PUCCH may be expressed as a case that the PDCCH or PUCCH is transmitted. In the same manner, a case that the data is transmitted on the PUSCH or PDSCH may be expressed as a case that the PUSCH or PDSCH is transmitted.

In general, the DCI is scrambled with a specific radio network temporary identifier (RNTI) (or terminal identifier) independently of respective terminals to be added with a cyclic redundancy check (CRC), is channel-coded, and is configured as independent PDCCHs to be transmitted. The PDCCH is mapped onto a control resource set (CORESET) configured to the terminal to be transmitted.

The downlink data may be transmitted on a PDSCH that is a physical channel for downlink data transmission. The PDSCH may be transmitted after a control channel transmission interval, and scheduling information, such as a detailed mapping location in the frequency domain and a modulation scheme, is determined based on the DCI being transmitted on the PDCCH.

Through the MCS among the control information constituting the DCI, the base station notifies the terminal of a modulation scheme applied to the PDSCH intended to be transmitted to the terminal and the size of data (transport block size (TBS)) intended to be transmitted. In an embodiment of the disclosure, the MCS may include 5 bits or more or less. The TBS corresponds to the size of the data (transport block (TB)) that the base station intends to transmit before the channel coding for error correction is applied thereto.

In the disclosure, the transport block (TB) may include a medium access control (MAC) header, a MAC control element (CE), one or more MAC service data units (SDUs), and padding bits. Further, the TB may indicate a data unit being delivered from the MAC layer to the physical layer or a MAC protocol data unit (PDU).

The modulation scheme that is supported in the NR system may be quadrature phase shift keying (QPSK), 16 quadrature amplitude modulation (16 QAM), 64 QAM, and 256 QAM, and respective modulation orders Qm correspond to 2, 4, 6, and 8. For example, in case of the QPSK modulation, 2 bits per symbol may be transmitted, and in case of the 16 QAM, 4 bits per symbol may be transmitted. Further, in case of the 64 QAM, 6 bits per symbol may be transmitted, and in case of the 256 QAM, 8 bits per symbol may be transmitted.

Figure 2A:
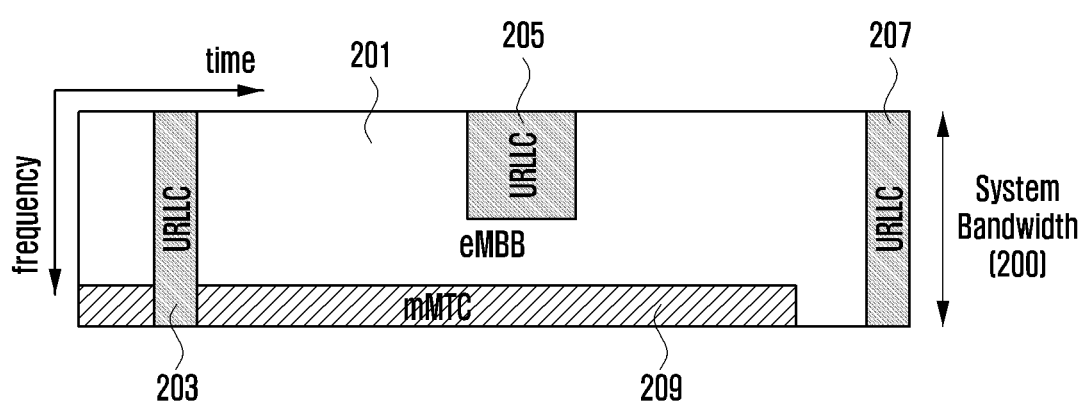
FIG. 2A is a diagram illustrating frequency and time resources being allocated for information transmission in an NR system according to an embodiment of the disclosure.
Figure 2B:
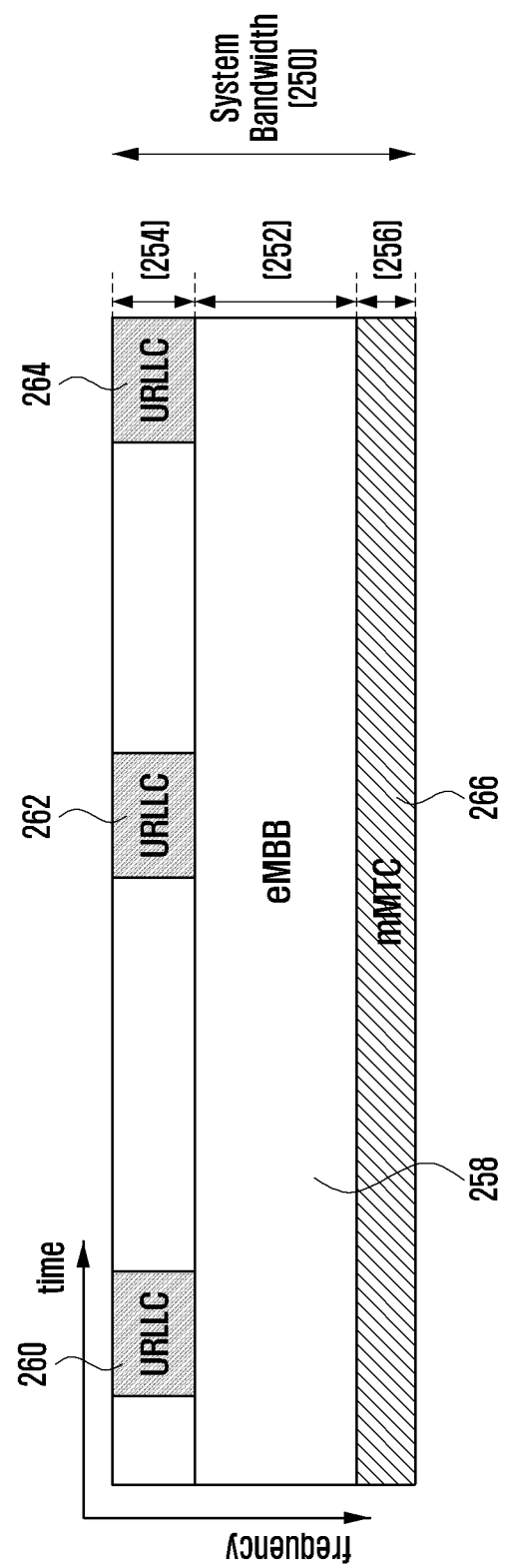
FIG. 2B is a diagram illustrating frequency and time resources being allocated for information transmission in an NR system according to an embodiment of the disclosure.

FIGS. 2A and 2B are diagrams illustrating a state where data for eMBB, URLLC, and mMTC, which are services being considered in a 5G or NR system, are allocated with frequency-time resources.

With reference to FIGS. 2A and 2B, it can be identified that frequency and time resources are allocated for information transmission in the respective systems.

FIG. 2A is a diagram illustrating frequency and time resources being allocated for information transmission in the NR system according to various embodiments of the disclosure.

Referring to FIG. 2A, it illustrates that data for eMBB, URLLC, and mMTC are allocated in a whole system frequency band 200. If URLLC data 203, 205, and 207 are generated while eMBB 201 and mMTC 209 are allocated and transmitted in a specific frequency band, and transmission of the generated URLLC data is necessary, the URLLC data 203, 205, and 207 may be transmitted without emptying or transmitting a portion in which the eMBB 201 and the mMTC 209 have already been allocated. Because it is necessary to reduce a latency of the URLLC among the above-described services, the URLLC data 203, 205, and 207 may be allocated to a portion of the resource allocated to the eMBB 201 to be transmitted. Of course, if the URLLC is additionally allocated and transmitted on the eMBB-allocated resource, the eMBB data may not be transmitted on the redundant frequency-time resources, and thus the transmission performance of the eMBB data may be lowered. In this case, an eMBB data transmission failure due to the URLLC allocation may occur.

FIG. 2B is a diagram illustrating frequency and time resources being allocated for information transmission in the NR system.

Referring to FIG. 2B, respective subbands 252, 254, and 256 that are obtained through division of a whole system frequency band 250 may be used for the purpose of transmitting services and data. Information related to subband configuration may be predetermined, and this information may be transmitted from a base station to a terminal through higher signaling. Further, information related to the subbands may be optionally divided by the base station or a network node, and services may be provided to the terminal without transmission of separate subband configuration information to the terminal. FIG. 2B illustrates a state where subband 252 is used to transmit eMBB data (258), subband 254 is used to transmit URLLC data (260, 262, and 264), and subband 256 is used to transmit mMTC data (266).

In an embodiment of the disclosure, the length of a transmission time interval (TTI) that is used for URLLC transmission may be shorter than the length of the TTI that is used to transmit the eMBB or mMTC. Further, a response to the information related to the URLLC may be transmitted earlier than that of the eMBB or mMTC, and thus the information can be transmitted and received with a low latency. Physical layer channels used for respective types to transmit the three kinds of services or data as described above may have different structures. For example, at least one of the transmission time interval (TTI) length, frequency resource allocation unit, control channel structure, and data mapping method may differ Although three kinds of services and three kinds of data have been described, more than three kinds of services and corresponding data may exist, and even in such a case, the contents of the disclosure will be able to be applied.

In order to illustrate a method and an apparatus proposed in embodiments of the disclosure, the terms "physical channel" and "signal" in an NR system may be used. However, the contents of the disclosure may also be applied to a wireless communication system that is not the NR system.

Hereinafter, embodiments of the disclosure will be described with reference to the accompanying drawings. In describing the disclosure, a description of related functions or configurations will be omitted if it is determined that it obscures the disclosure in unnecessary detail. Further, all terms used in the description are terms that are defined based on their functions in the disclosure, but may differ depending on intentions of a user or an operator, or customs. Accordingly, they should be defined on the basis of the contents of the whole description of the disclosure. Hereinafter, a sidelink (SL) is called a signal transmission/reception path between terminals, and may be interchangeably used with a PC5 interface. Hereinafter, the base station is the subject that performs resource allocation to the terminal, and may be a base station supporting both V2X communication and general cellular communication or a base station supporting only V2X communication. For example, the base station may mean an NR base station (gNB), LTE base station (eNB), or road site unit (RSU) (or fixed station). The terminal may include user equipment, mobile station, vehicle supporting vehicular-to-vehicular communication (V2V), vehicle supporting vehicular-to-pedestrian (V2P), pedestrian's handset (e.g., smart phone), vehicle supporting vehicular-to-network communication (V2N), vehicle supporting vehicular-to-infrastructure communication (V2I), RSU mounted with a terminal function, RSU mounted with a base station function, or RSU mounted with a part of a base station function and a part of a terminal function. In the disclosure, a downlink (DL) is a radio transmission path of a signal that is transmitted from the base station to the terminal, and an uplink (UL) means a radio transmission path of a signal that is transmitted from the terminal to the base station. Hereinafter, although the NR system is exemplified in embodiments of the disclosure, the embodiments of the disclosure can be applied to even other various communication systems having similar technical backgrounds or channel types. Further, the embodiments of the disclosure may also be applied to other communication systems through partial modifications thereof in a range that does not greatly deviate from the scope of the disclosure by the judgment of those skilled in the art.

In the disclosure, the terms "physical channel" and "signal" in the related art may be interchangeably used with data or a control signal. For example, although the PDSCH is a physical channel on which data is transmitted, it may be called data in the disclosure.

Hereinafter, in the disclosure, higher signaling is a signal transfer method in which the base station transfers a signal to the terminal using a downlink data channel of a physical layer, or the terminal transfers a signal to the base station using an uplink data channel of the physical layer, and it may also be mentioned as RRC signaling or MAC control element (MAC CE).

In the following embodiments of the disclosure, a method and an apparatus for performing data transmission/reception between the base station and the terminal or between the terminals are provided. In this case, data may be transmitted from one terminal to a plurality of terminals, or data may be transmitted from one terminal to one terminal. Further, data may be transmitted from a base station to a plurality of terminals. However, the data transfer is not limited thereto, but the disclosure will be able to be applied to various cases.

Figure 3:
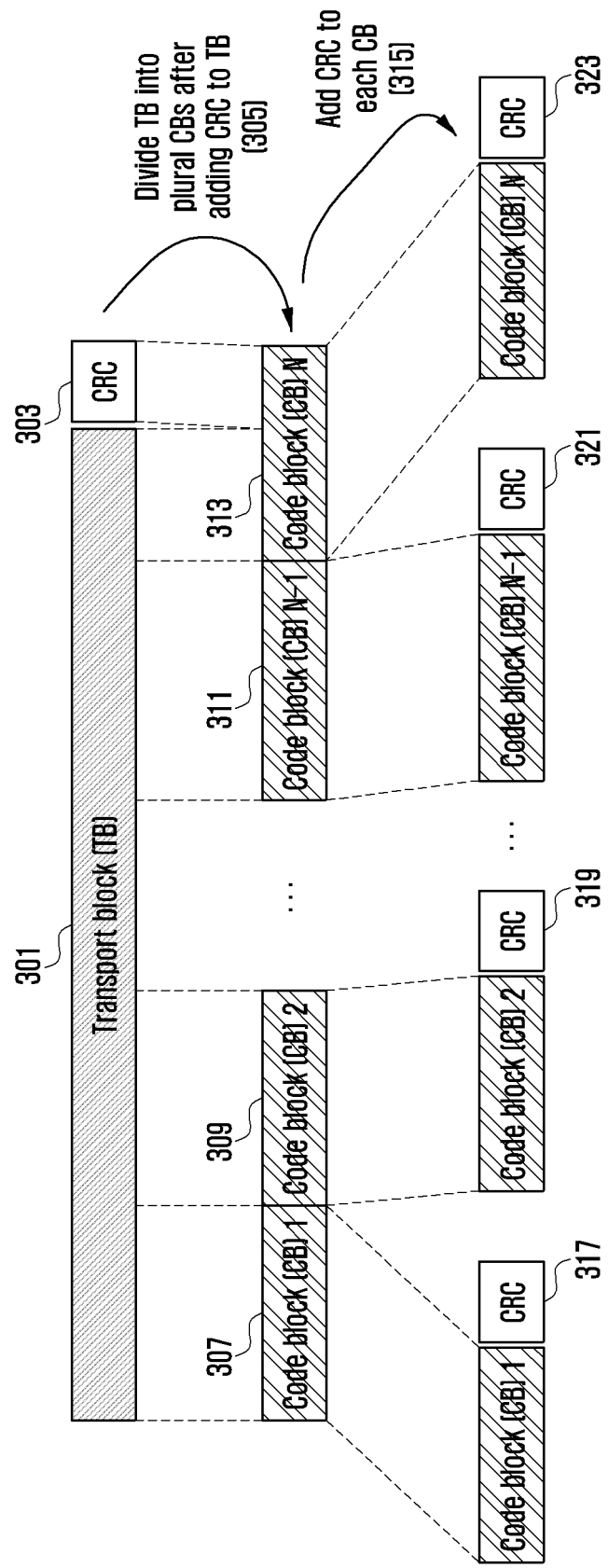
FIG. 3 is a diagram illustrating a process in which one transport block is divided into several code blocks and cyclic redundancy check (CRC) is added to each of the code blocks according to an embodiment of the disclosure.

FIG. 3 is a diagram illustrating a process in which one transport block is divided into several code blocks and CRCs are added thereto according to an embodiment of the disclosure.

Referring to FIG. 3, a CRC 303 may be added to the last or head portion of one transport block (TB) 301 intended to be transmitted on an uplink or a downlink. The CRC 303 may include 16 bits, 24 bits, or a prefixed bit number, or may be include a variable bit number in accordance with channel situations. The CRC 303 may be used to determine whether channel coding has succeeded. A block including the TB 301 and the CRC 303 added thereto may be divided into several code blocks (CBs) 307, 309, 311, and 313 (305). Here, the divided code blocks may have predetermined maximum sizes, and in this case, the last code block 313 may have a size that is smaller than the size of other code blocks 307, 309, and 311. However, this is merely exemplary, and according to another example, the last code block 313 may be set to have the same length as the length of other code blocks 307, 309, and 311 through insertion of 0, a random value, or 1 into the last code block 313. CRCs 317, 319, 321, and 323 may be respectively added to the code blocks 307, 309, 311, and 313 (315). The CRC may include 16 bits, 24 bits, or a prefixed bit number, and may be used to determine whether the channel coding has succeeded.

In order to create the CRC 303, the TB 301 and a cyclic generator polynomial may be used, and the cyclic generator polynomial may be defined in various methods. For example, if it is assumed that a cyclic generator polynomial for the CRC of 24 bits is $gCRC24A(D)=D^{24}+D^{23}+D^{18}+D^{17}+D^{14}+D^{11}+D^{10}+D^7+D^6+D^5+D^4+D^3+D+1$, and L is L=24, with respect to TB data $a_0, a_1, a_2, a_3, \ldots a_{A-1}$, CRC $p_0, p_1, p_2, p_3, \ldots, p_{L-1}$ may be determined as a value obtained by dividing $a_0 D^{A+23} + a_1 D^{A+22+} \ldots + a_{A-1} D^{24} + p_0 D^{23} + p_1 D^{22} + \ldots + p_{22} D^1 + p_{23}$ by gCRC24A(D) with a remainder of 0. In the above-described example, although it is assumed that the CRC length L is 24, the CRC length L may be determined to include various lengths, such as 12, 16, 24, 32, 40, 48, 64, and the like.

After the CRC is added to the TB in the process as described above, the TB may be divided into N CBs 307, 309, 311, and 313. CRCs 317, 319, 321, and 323 may be added to the divided CBs 307, 309, 311, and 313, respectively (315). The CRC added to the CB may have a length that is different from the length of the CRC added to the TB, or another cyclic generator polynomial may be used. However, the CRC 303 added to the TB and the CRCs 317, 319, 321, and 323 added to the code blocks may be omitted depending on the kind of a channel code to be applied to the code blocks. For example, if a low density parity check (LDPC) code, rather than a turbo code, is to be applied to the code blocks, the CRCs 317, 319, 321, and 323 to be inserted into the respective code blocks may be omitted.

However, even in case that the LDPC is applied, the CRCs 317, 319, 321, and 323 may be added to the code blocks as they are. Further, even in case that a polar code is used, the CRCs may be added or omitted.

As described above with reference to FIG. 3, in the TB intended to be transmitted, the maximum length of one code block may be determined in accordance with the kind of the applied channel coding, and in accordance with the maximum length of the code blocks, division of the TB and the CRC added to the TB into the code blocks may be performed.

In an LTE system in the related art, a CRC for a CB is added to a divided CB, and data bits of the CB and the CRC are encoded with a channel code to determine coded bits, and as pre-engaged with respect to the respective coded bits, the number of the rate-matched bits may be determined.

In an NR system, the size of the TB may be calculated through the following operations.

Operation 1: In one PRB within an allocated resource, $N_{RE}'$ that is the number of REs allocated to PDSCH mapping is calculated.

Here, $N_{RE}'$ may be calculated by $N_{sc}^{RB} \cdot N_{symb}^{sh} - N_{DMRS}^{PRB} - N_{oh}^{PRB}$. Here, $N_{sc}^{RB}$ is 12, and $N_{symb}^{sh}$ may indicate the number of OFDM symbols allocated to the PDSCH. $N_{DMRS}^{PRB}$ is the number of REs in one PRB occupied by a DMRS of a CDM group. $N_{oh}^{PRB}$ is the number of REs occupied by an overhead in one PRB configured through higher signaling, and may be configured to one of 0, 6, 12, and 18. Thereafter, the total number $N_{RE}$ of REs allocated to the PDSCH may be calculated. Here, $N_{RE}$ is calculated as $\min(156, N_{RE}') \cdot n_{PRB}$, and $n_{PRB}$ indicates the number of PRBs allocated to the terminal.

Operation 2: The number $N_{info}$ of temporary information bits may be calculated as $N_{RE} * R * Q_m * v$. Here, R is a code rate, $Q_m$ is a modulation order, and information of these values may be transferred using a table pre-engaged with an MCS bit field in control information. Further, v is the number of allocated layers. If $N_{info} \leq 3824$, a TBS may be calculated through operation 3 below. Otherwise, the TBS may be calculated through operation 4.

Operation 3: $N_{info}'$ may be calculated through formulas of $$N_{info}' = \max\left(24, 2^n * \left\lfloor \frac{N_{info}}{2^n} \right\rfloor\right) \text{ and } n = \max(3, \lfloor \log_2(N_{info}) \rfloor - 6).$$

The TBS may be determined as a value that is closest to t among values that are not smaller than $N_{info}'$ in Table 4 below.

TABLE 4

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |

TABLE 4-continued

| Index | TBS |
|---|---|
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Operation 4: $N_{info}'$ may be calculated through formulas of $$N_{info}' = \max\left(3840, 2^n \times \text{round}\left(\frac{N_{info} - 24}{2^n}\right)\right) \text{ and } n = \lfloor \log_2(N_{info} - 24) \rfloor - 5.$$

The TBS may be determined through $N_{info}'$ value and [pseudo-code 1] below.

[Pseudo-code 1 Start]
if $R \le 1/4$ $$TBS = 8 * C * \left\lceil \frac{N_{info}' + 24}{8 * C} \right\rceil - 24, \text{ where } C = \left\lceil \frac{N_{info}' + 24}{3816} \right\rceil$$

else
  if $N_{info}' > 8424$ $$TBS = 8 * C * \left\lceil \frac{N_{info}' + 24}{8 * C} \right\rceil - 24, \text{ where } C = \left\lceil \frac{N_{info}' + 24}{8424} \right\rceil$$

else $$TBS = 8 * \left\lceil \frac{N_{info}' + 24}{8} \right\rceil - 24$$

end if
end if
[Pseudo-code 1 End]

If one CB is inputted to an LDPC encoder in an NR system, parity bits may be added to the CB to be outputted. In this case, the quantity of parity bits may differ in accordance with an LDCP base graph. A method for sending all parity bits created by LDPC coding with respect to a specific input may be called full buffer rate matching (FBRM), and a method for limiting the number of transmittable parity bits may be called a limited buffer rate matching (LBRM). If resources are allocated for data transmission, an LDPC encoder output is made as a circular buffer, and bits of the made buffer are repeatedly transmitted to the extent of the allocated resources. In this case, the length of the circular buffer may be $N_{cb}$. If the number of all parity bits being created by the LDPC coding is N, the length of the circular buffer becomes $N_{cb}=N$ in the FBRM method.

In the LBRM method, $N_{cb}$ becomes $\min(N, N_{ref})$, $N_{ref}$ is given as $$\left\lfloor \frac{TBS_{LBRM}}{C \cdot R_{LBRM}} \right\rfloor,$$

and $R_{LBRM}$ may be determined as 2/3. In order to obtain $TBS_{LBRM}$, the above-described method for obtaining the TBS, and the maximum number of layers supported by the terminal in the corresponding cell and the maximum modulation order configured to the terminal in the corresponding cell may be assumed, and 64 QAM may be assumed in case that the maximum modulation order is not configured. Further, it may be assumed that the code rate is 948/1024 that is the maximum code rate, $N_{RE}$ is 156·$n_{PRB}$, and $n_{PRB}$ is $n_{PRB,LBRM}$. Here, $n_{PRB,LBRM}$ may be given as in Table 5 below.

TABLE 5

| Maximum number of PRBs across all configured BWPs of a carrier | $n_{PRB,LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

In the NR system, the maximum data rate supported by the terminal may be determined through Equation 1 below.

Equation 1

$$\text{data rate (in } Mbps) = 10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^\mu} \cdot (1 - OH^{(j)}) \right)$$

In Equation 1, it may mean that J is the number of carriers tied through carrier aggregation, $R_{max}=948/1024$, $v_{Layers}^{(j)}$ is the maximum number of layers, $Q_m^{(j)}$ is the maximum modulation order, $f^{(j)}$ is a scaling index, μ is a subcarrier spacing. Here, $f^{(j)}$ is one value of 1, 0.8, 0.75, and 0.4, which can be reported by the terminal, and μ may be given as in Table 6 below.

TABLE 6

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Further, $T_s^\mu$ is an average OFDM symbol length, $T_s^\mu$ may be calculated as $\frac{10^{-3}}{14 \cdot 2^\mu}$, and $N_{PRR}^{(BW(j),\mu)}$ is the maximum number of RBs in BW(j). Further, $OH^{(j)}$ is an overhead value, which may be given as 0.14 in a downlink of FR1 (not higher than 6 GHz band) and may be given as 0.18 in an uplink, and which may be given as 0.08 in a downlink of FR2 (higher than 6 GHz band) and may be given as 0.10 in an uplink. The maximum data rate in the downlink in the cell having 100 MHz frequency bandwidth in 30 kHz subcarrier spacing through the Equation 1 may be calculated as in Table 7 below.

TABLE 7

| $f^{(j)}$ | $v_{layers}^{(j)}$ | $Q_m^{(j)}$ | Rmax | $N_{PRB}^{BW(j),\mu}$ | $T_s^\mu$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

In contrast, the actual data rate that can be measured by the terminal in the actual data transmission may be a value obtained by dividing the data amount by the data transmission time. This may be TBS in 1 TB transmission, and may be a value obtained by dividing the sum of TBSs by the TTI length in 2 TB transmission. As an example, in the same manner as the assumption to obtain Table 7 above, the maximum actual data rate in the downlink in the cell having the 100 MHz frequency bandwidth in the 30 kHz subcarrier spacing may be determined as in Table 8 below in accordance with the number of allocated PDSCH symbols.

TABLE 8

| $N_{symb}^{sh}$ | $N_{DMRS}^{PRB}$ | $N_{RB}'$ | $N_{RE}$ | $N_{info}$ | n | $N_{info}'$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

Through Table 7, it is possible to identify the maximum data rate supported by the terminal, and through Table 8, it is possible to identify the actual data rate following the allocated TBS. In this case, the actual data rate may be higher than the maximum data rate in accordance with scheduling information.

In a wireless communication system, and particularly, in a new radio (NR) system, the data rate that can be supported by the terminal may be pre-engaged between the base station and the terminal. This may be calculated using the maximum frequency band supported by the terminal, the maximum modulation order, and the maximum number of layers. However, the calculated data rate may be different from the value calculated from the transport block size (TBS) being used for the actual data transmission and the length of the transmission time interval (TTI).

Accordingly, the terminal may be allocated with the TBS that is larger than the value corresponding to the data rate supported by the terminal itself, and to prevent this, there may be limitations in schedulable TBS in accordance with the data rate supported by the terminal.

Figure 4:
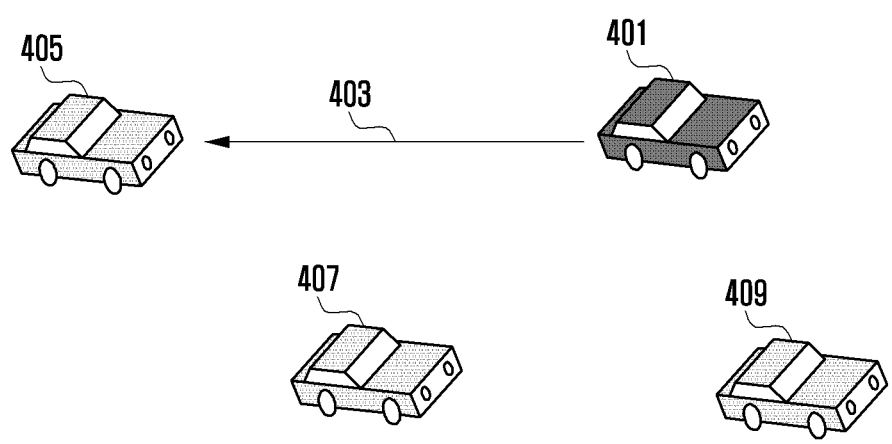
FIG. 4 is a diagram illustrating one-to-one communication, that is, unicast communication, being performed between two terminals through a sidelink according to an embodiment of the disclosure.

FIG. 4 is a diagram illustrating one-to-one communication, that is, unicast communication, being performed between two terminals through a sidelink according to an embodiment of the disclosure.

Referring to FIG. 4, an example in which a signal 403 is transmitted from a first terminal 401 to a second terminal 405, and the direction of the signal transmission may be opposite to the above-described direction is illustrated. For example, the signal may be transmitted from the second terminal 405 to the first terminal 401. Other terminals 407 and 409 excluding the first terminal 401 and the second terminal 405 may be unable to receive the signal being exchanged through the unicast communication between the first terminal 401 and the second terminal 405. The signal exchange through the unicast between the first terminal 401 and the second may include processes of mapping on resources engaged between the first terminal 401 and the second terminal 405, scrambling using an engaged value, control information mapping, data transmission using a configured value, and identifying inherent ID values. The terminal may be a terminal that moves together with a vehicle. For the unicast, transmission of separate control information, physical control channel, and data may be performed.

Figure 5:
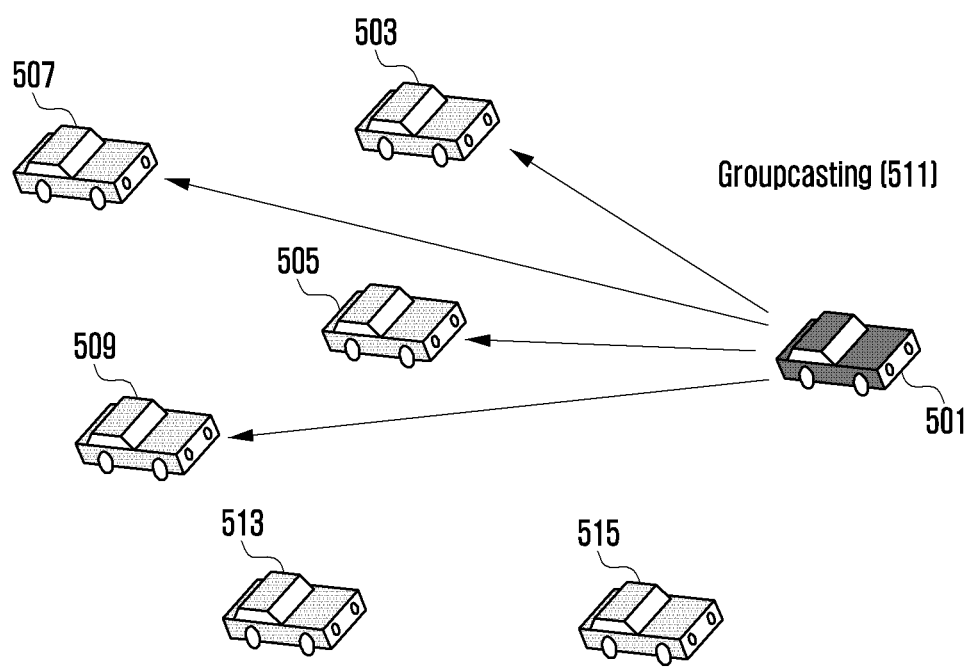
FIG. 5 is a diagram illustrating a groupcast communication in which one terminal transmits common data to a plurality of terminals through a sidelink according to an embodiment of the disclosure.

FIG. 5 is a diagram illustrating a groupcast communication in which one terminal transmits common data to a plurality of terminals through a sidelink according to an embodiment of the disclosure.

Referring to FIG. 5, it illustrates an example a groupcast communication 511 in which a first terminal 501 transmits common data to other terminals 503, 505, 507, and 509 in a group through a sidelink, and other terminals 513 and 515 which are not included in the group may be unable to receive signals being transmitted for the groupcast.

The terminal that transmits the signal for the groupcast may be another terminal in the group, and resource allocation for the signal transmission may be provided by the base station, may be provided by the terminal that serves as a leader in the group, or may be selected by the terminal that transmits the signal. The terminal may be a terminal that moves together with a vehicle. For the groupcasting, transmission of separate control information, physical control channel, and data may be performed.

Figure 6:
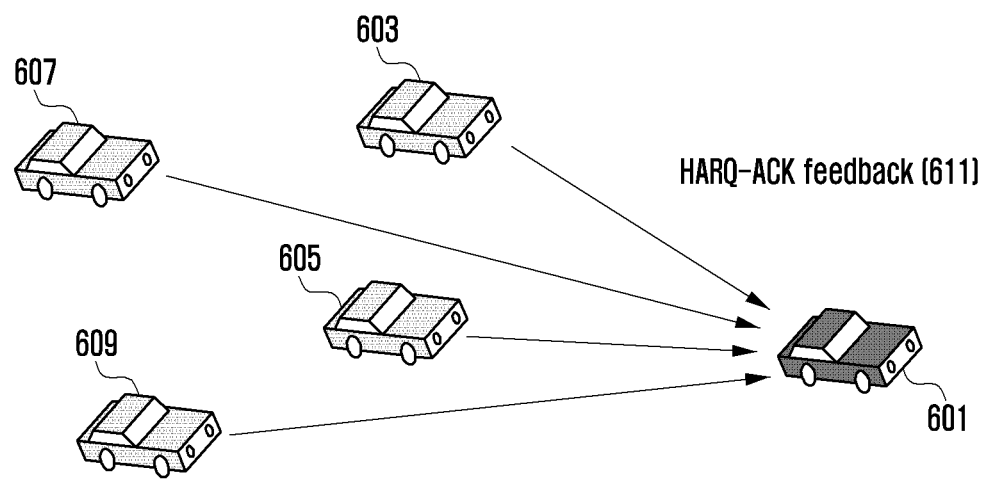
FIG. 6 is a diagram illustrating a process in which terminals having received common data through groupcasting transmit information related to data reception success or failure to a terminal having transmitted the data according to an embodiment of the disclosure.

FIG. 6 is a diagram illustrating a process in which terminals having received common data through groupcasting transmit information related to data reception success or failure to a terminal having transmitted the data according to an embodiment of the disclosure.

Referring to FIG. 6, the terminals 603, 605, 607, and 609 having received the common data through the groupcasting transmit the information related to the data reception success or failure to a terminal 601 having transmitted the data. The information may be information, such as HARQ-ACK feedback (611). Further, the terminals may be terminals having LTE-based sidelink or NR-based sidelink function. The terminal having only the LTE-based sidelink function may be unable to transmit/receive NR-based sidelink signal and a physical channel. In the disclosure, the sidelink may be interchangeably used with PC5, V2X, or D2D. Referring to FIGS. 5 and 6, the transmission/reception in accordance with the groupcasting is exemplified, but it may also be applied to unicast signal transmission/reception between the terminals.

Figure 7:
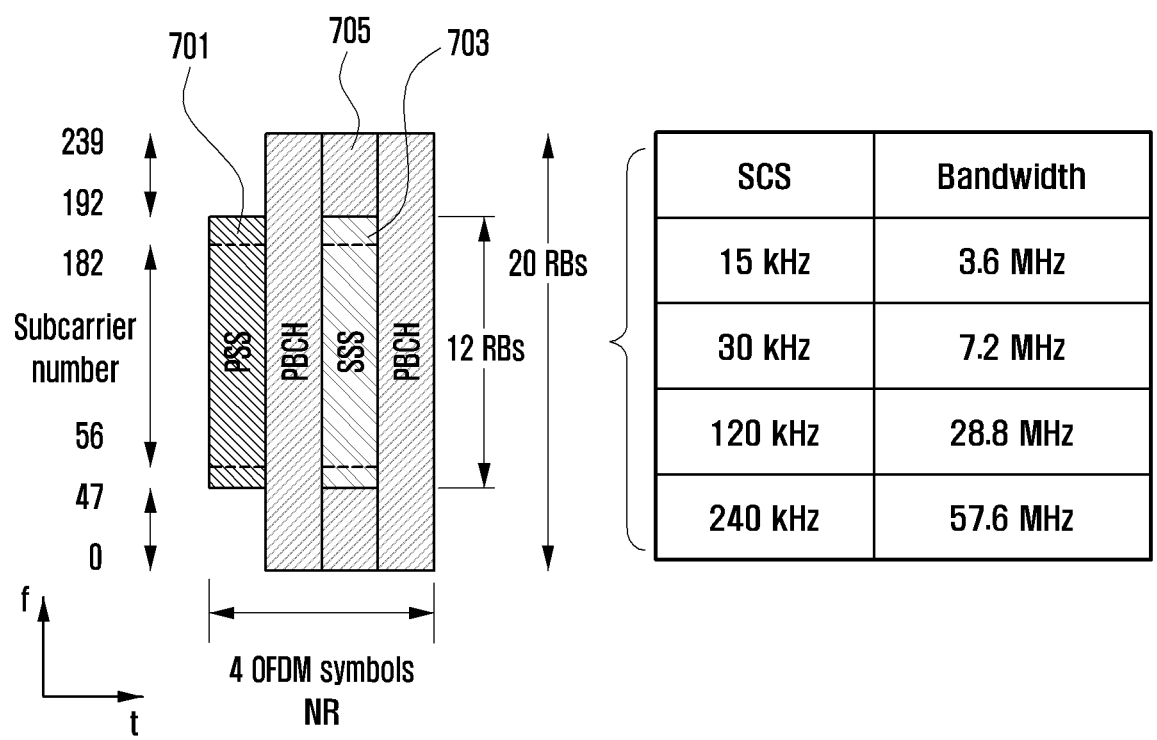
FIG. 7 is a diagram illustrating a state in which a synchronization signal of an NR system and a physical broadcast channel are mapped onto each other in a frequency and time domain according to an embodiment of the disclosure.

FIG. 7 is a diagram illustrating a state in which a synchronization signal of an NR system and a PBCH are mapped onto each other in the frequency and time domain according to an embodiment of the disclosure.

Referring to FIG. 7, a primary synchronization signal (PSS) 701, a secondary synchronization signal (SSS) 703, and a PBCH (705) are mapped onto each other over 4 OFDM symbols, the PSS and the SSSS are mapped onto 12 RBs, and the PBCH is mapped onto 20 RBs. It is illustrated in the table of FIG. 7 how the frequency bands of 20 RBs are varied in accordance with a subcarrier spacing (SCS). A resource region on which the PSS, SSS, and PBCH are transmitted may be called an SS/PBCH block. Further, the SS/PBCH block may be called an SSB block.

Figure 8:
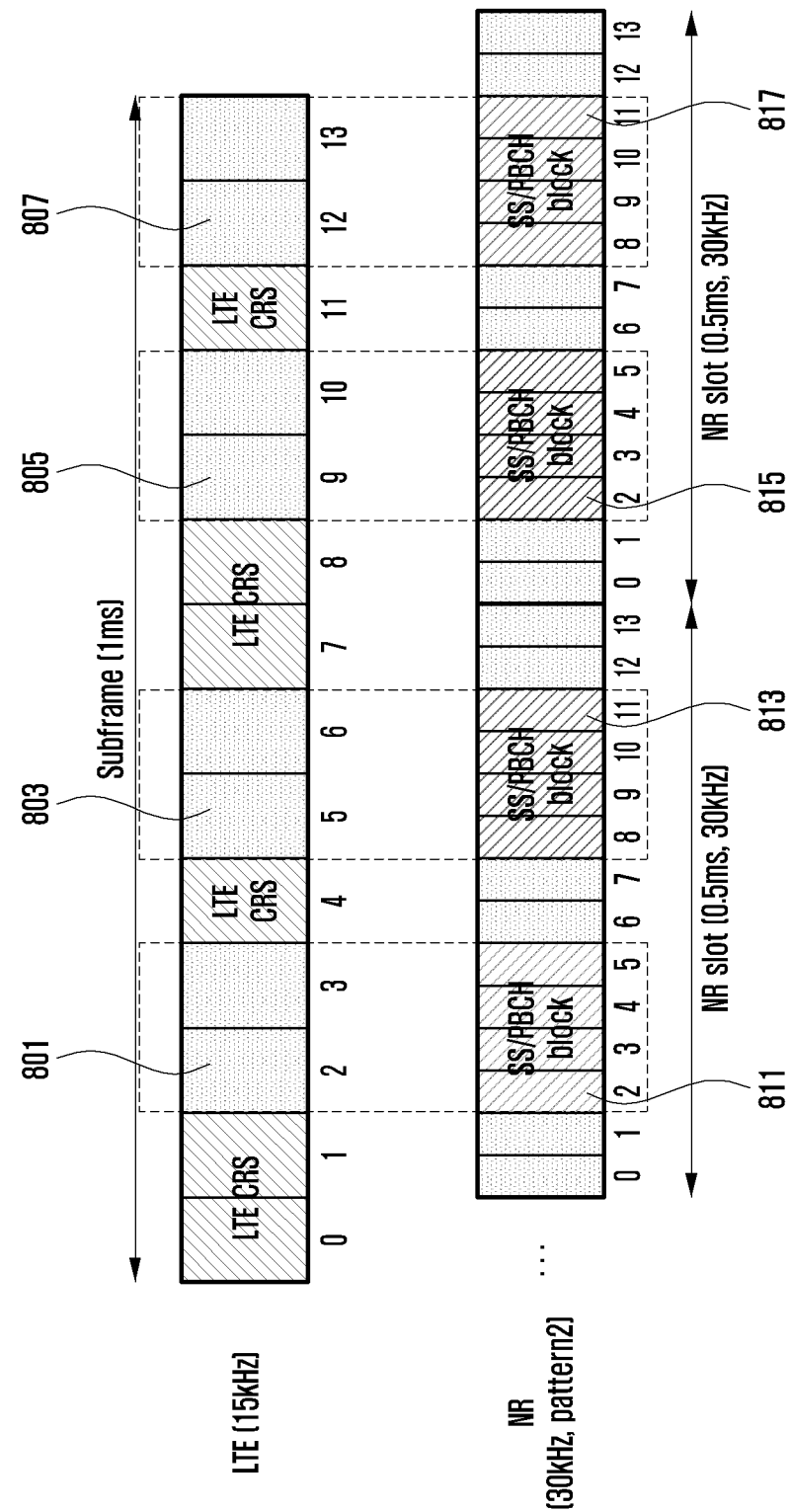
FIG. 8 is a diagram illustrating what symbols one synchronization signal/physical broadcast channel (SS/PBCH) block is mapped onto in a slot according to an embodiment of the disclosure.

FIG. 8 is a diagram illustrating what symbols one SS/PBCH block is mapped onto in a slot according to an embodiment of the disclosure.

Referring to FIG. 8, it illustrates examples of an LTE system in the related art using a subcarrier spacing of 15 kHz and an NR system using a subcarrier spacing of 30 kHz. It is designed that SS/PBCH blocks 811, 813, 815, and 817 of the NR system are transmitted in locations 801, 803, 805, and 807 in which cell-specific reference signals (CRS) being always transmitted in the LTE system can be avoided. This is for the LTE system and the NR system to coexist in one frequency band.

Figure 9:
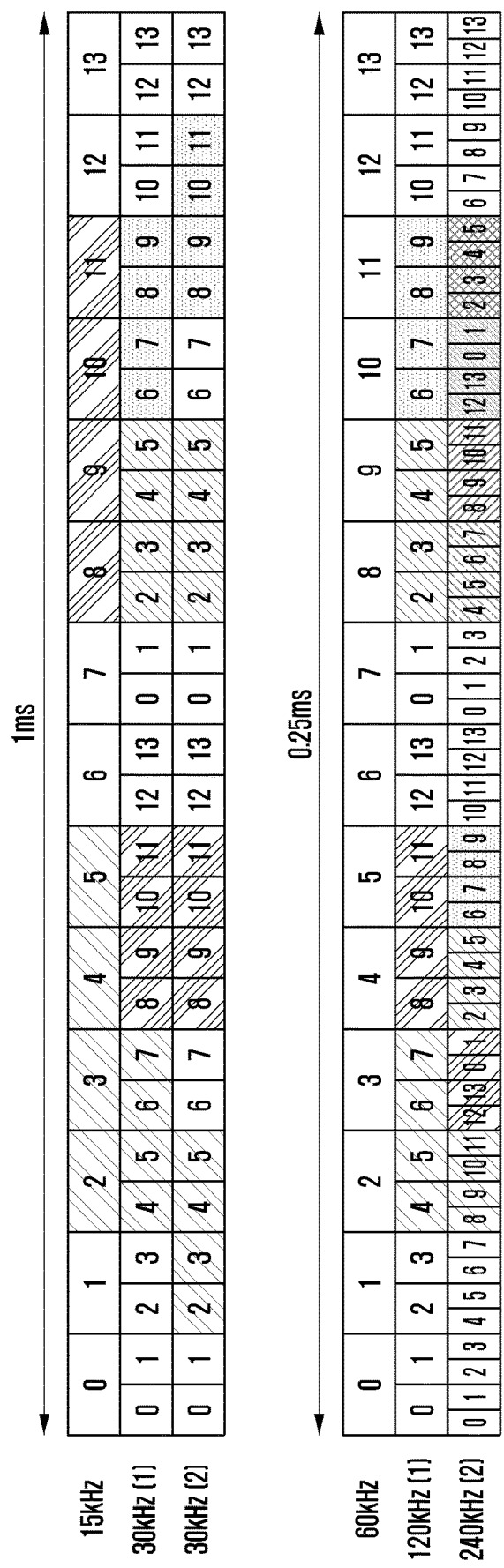
FIG. 9 is a diagram illustrating symbols on which SS/PBCH blocks can be transmitted in accordance with a subcarrier spacing according to an embodiment of the disclosure.

FIG. 9 is a diagram illustrating symbols on which SS/PBCH blocks can be transmitted in accordance with subcarrier spacing according to an embodiment of the disclosure.

Referring to FIG. 9, the subcarrier spacing may be configured as 15 kHz, 30 kHz, 120 kHz, and 240 kHz, and in accordance with the subcarrier spacing, the location of a symbol in which an SS/PBCH block (or SSB block) can be located may be determined. FIG. 9 illustrates the symbol location in which the SSB in accordance with the subcarrier spacing can be transmitted on each symbol within 1 ms, and it is not necessary that the SSB is always transmitted in the region indicated in FIG. 9. Accordingly, the location in which the SSB block is transmitted may be configured in the terminal through system information or dedicated signaling.

Figure 10:
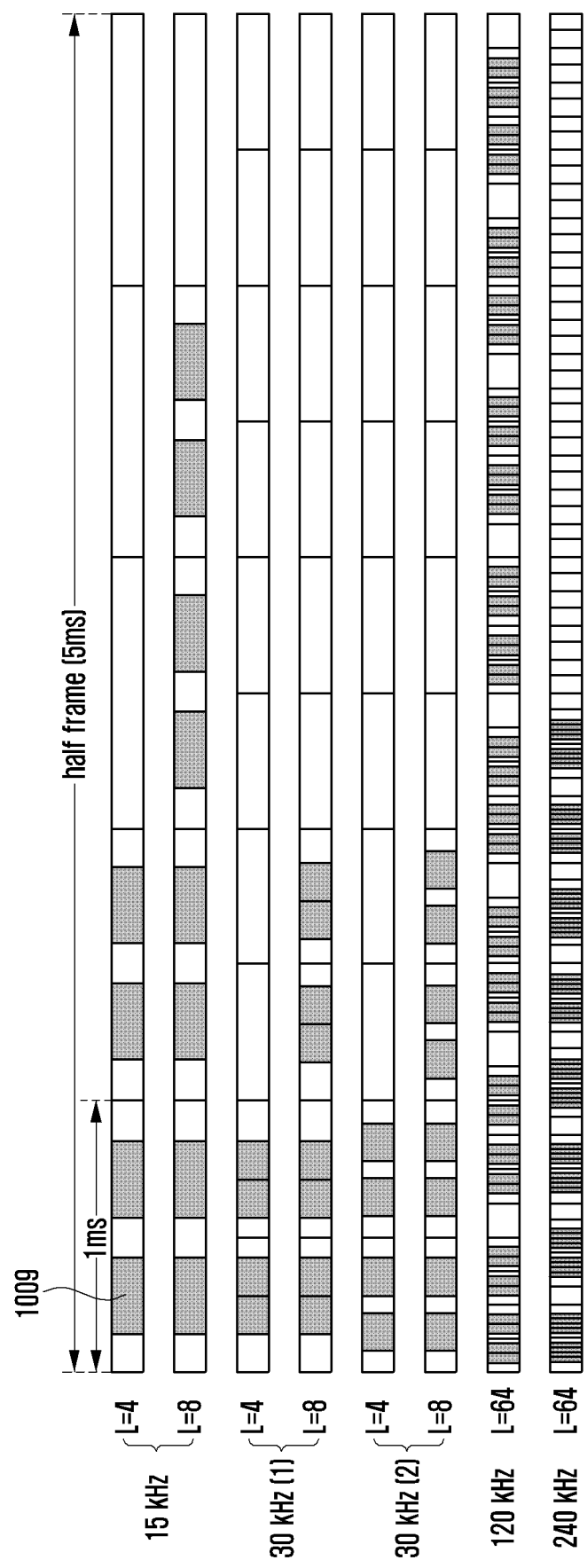
FIG. 10 is a diagram illustrating symbols on which SS/PBCH blocks can be transmitted in accordance with a subcarrier spacing according to an embodiment of the disclosure.

FIG. 10 is a diagram illustrating symbols on which SS/PBCH blocks can be transmitted in accordance with subcarrier spacing according to an embodiment of the disclosure.

Referring to FIG. 10, the subcarrier spacing may be configured as 15 kHz, 30 kHz, 120 kHz, and 240 kHz, and in accordance with the subcarrier spacing, the location of a symbol in which an SS/PBCH block (or SSB block) can be located may be determined. FIG. 10 illustrates a symbol location 1009 in which the SSB block in accordance with the subcarrier spacing can be transmitted on each symbol within 5 ms, and the location in which the SSB block is transmitted may be configured in the terminal through system information or dedicated signaling. It is not necessary that the SS/PBCH block is always transmitted in the region in which the SS/PBCH block can be transmitted, and the SS/PBCH block may be or may not be transmitted depending on the selection of the base station. Accordingly, the location in which the SSB block is transmitted may be configured in the terminal through the system information or the dedicated signaling.

In the disclosure, a sidelink control channel may be called a physical sidelink control channel (PSCCH), and a sidelink shared channel or a data channel may be called a physical sidelink shared channel (PSSCH). Further, a broadcast channel that is broadcasted together with a synchronization signal may be called a physical sidelink broadcast channel (PSBCH), and a channel for feedback transmission may be called a physical sidelink feedback channel (PSFCH). However, the feedback transmission may be performed using the PSCCH or PSSCH. In accordance with the transmitting communication system, the channel may be mentioned as LTE-PSCCH, LTE-PSSCH, NR-PSCCH, or NR-PSSCH. In the disclosure, a sidelink may means a link between terminals, and a Uu link may mean a link between a base station and a terminal.

Figure 11:
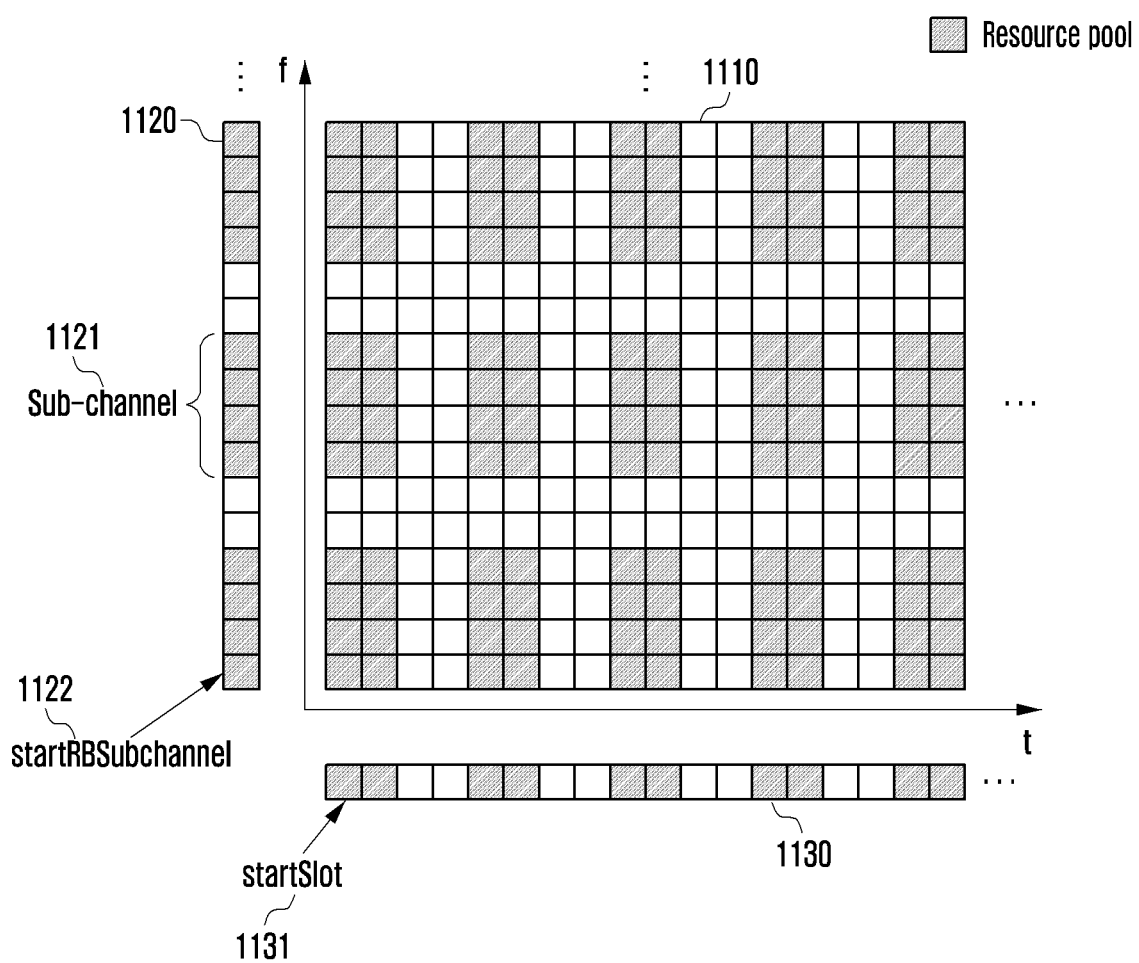
FIG. 11 is a diagram illustrating a resource pool that being defined as a set of resources on time and frequency being used for sidelink transmission and reception according to an embodiment of the disclosure.

FIG. 11 is a diagram illustrating a resource pool that is defined as a set of resources on time and frequency being used for sidelink transmission and reception according to an embodiment of the disclosure.

Referring to FIG. 11, the reference numeral "1110" denotes an example in which a resource pool is non-contiguously allocated on time and frequency. In the disclosure, although explanation has been made focused on a case where a resource pool is non-contiguously allocated on frequency, the resource pool can also be contiguously allocated on the frequency.

"1120" denotes an example in which non-contiguous resource allocation is performed on the frequency. The granularity of resource allocation on the frequency may be a PRB.

"1121" denotes an example in which the resource allocation on the frequency is performed based on a sub-channel. The sub-channel may be defined in the unit on the frequency including a plurality of RBs. In other words, the sub-channel may be defined as an integer multiple of the RB. "1121" denotes an example in which the sub-channel includes four contiguous PRBs. The size of the sub-channel may be differently configured, and although it is general that one sub-channel includes contiguous PRBs, it is not necessary that the sub-channel includes the contiguous PRBs. The sub-channel may become the basic unit of resource allocation on a physical sidelink shared channel (PSSCH) or physical sidelink control channel (PSCCH), and thus the size of the sub-channel may be differently configured depending on whether the corresponding channel is the PSSCH or PSCCH. Further, the term "sub-channel" may be replaced by another term, such as a resource block group (RBG).

Meanwhile, startRBSubchanel of "1122" indicates a start location of a sub-channel on the frequency in a resource pool.

The resource block that is a frequency resource that belongs to a resource pool for the PSSCH in an LTE V2X system may be determined in the following method.

The resource block pool consists of $N_{subCH}$ sub-channels where $N_{subCH}$ is given by higher layer parameter numSubchannel.

The sub-channel m for m=0, 1, ..., $N_{subCH}$−1 consists of a set of $n_{subCHsize}$ contiguous resource blocks with the physical resource block number $n_{PRB}=n_{subCHRBstd}+m*n_{subCHsize}+j$ for j=0, 1, ..., $n_{subCHsize}$−1 where $n_{subCHRBstd}$ and $n_{subCHsize}$ are given by higher layer parameters startRBSubchannel and sizeSubchannel, respectively "1130" denotes an example in which non-contiguous resource allocation is performed on time. The granularity of resource allocation on time may be a slot. In the disclosure, although it is exemplified that the resource pool is non-contiguously allocated on the time, the resource pool can also be contiguously allocated on the time.

Meanwhile, startSlot of "1131" indicates a start location of a slot on time. Subframes ($t_0^{SL}, t_1^{SL}, \ldots, t_{T_{max}}^{SL}$) that are time resources that belong to the resource pool for the PSSCH in the LTE V2X system may be determined in the following method.

$0 \leq t_i^{SL} < 10240$, the subframe index is relative to subframe #0 of the radio frame corresponding to SFN 0 of the serving cell or DFN 0 (described in [11]), the set includes all the subframes except the following subframes, subframes in which SLSS resource is configured, downlink subframes and special subframes if the sidelink transmission occurs in a TDD cell, reserved subframes which are determined by the following operations:

1) the remaining subframes excluding $N_{slss}$ and $N_{dssf}$ subframes from the set of all the subframes are denoted by ($l_0, l_1, \ldots, l_{(10240-N_{slss}-N_{dssf}-1)}$) arranged in increasing order of subframe index, where $N_{slss}$ is the number of subframes in which SLSS resource is configured within 10240 subframes and $N_{dssf}$ is the number of downlink subframes and special subframes within 10240 subframes if the sidelink transmission occurs in a TDD cell.

2) a subframe $l_r(0 \leq r < (10240-N_{slss}-N_{dssf}))$ belongs to the reserved subframes if $$r = \left\lfloor \frac{m \cdot (10240 - N_{slss} - N_{dssf})}{N_{reserved}} \right\rfloor$$

where m=0, ..., $N_{reserved}$−1 and $N_{reserved}=(10240-N_{slss}-N_{dssf}) \bmod L_{bitmap}$. Here, $L_{bitmap}$ the length of the bitmap is configured by higher layers.

the subframes are arranged in increasing order of subframe index.

A bitmap ($b_0, b_1, \ldots, b_{L_{bitmap}-1}$) associated with the resource pool is used where $L_{bitmap}$ the length of the bitmap is configured by higher layers.

A subframe $t_k^{SL}(0 \leq k < (10240-N_{slss}-N_{dssf}-N_{reserved}))$ belongs to the subframe pool if $b_{k'}=1$ where k'=k mod $L_{bitmap}$.

Figure 12:
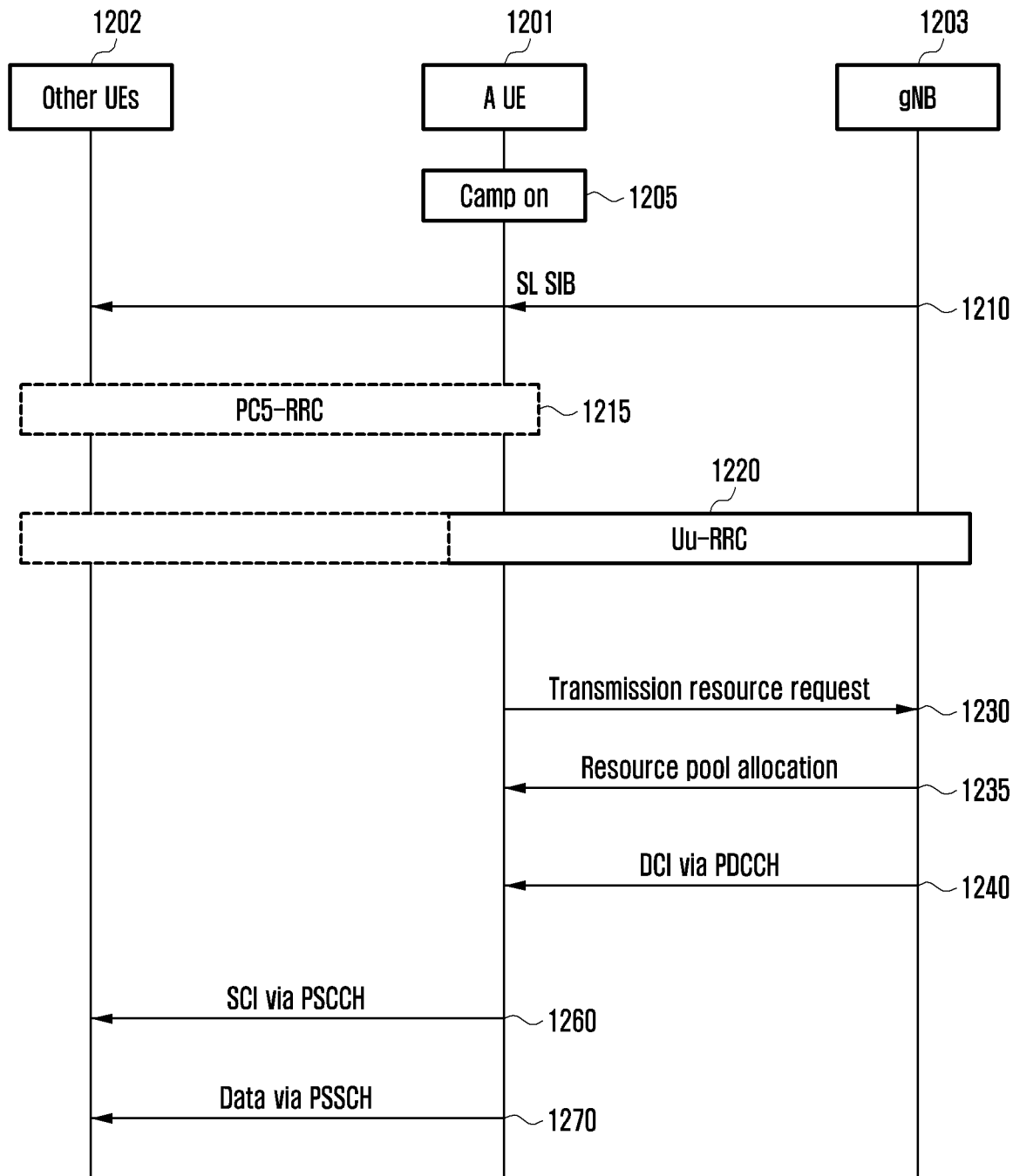
FIG. 12 is a diagram illustrating a scheduled resource allocation (mode 1) method in a sidelink according to an embodiment of the disclosure.

FIG. 12 is a diagram illustrating a scheduled resource allocation (mode 1) method in a sidelink according to an embodiment of the disclosure. The scheduled resource allocation (mode 1) is a method in which a base station allocates resources being used for sidelink transmission in a dedicated scheduling method to RRC-connected terminals. According to the above-described method, the base station can manage the resources of the sidelink, and thus it may be effective in performing interference management and resource pool management.

Referring to FIG. 12, a camp-on (1205) terminal 1201 receives (1210) a sidelink system information block (SL SIB) from a base station 1203. The system information may include resource pool information for transmission/reception, configuration information for a sensing operation, information for synchronization configuration, and information for inter-frequency transmission/reception. If data traffic for V2X is created, the terminal 1201 performs an RRC connection with the base station (1220). Here, the RRC connection between the terminal and the base station may be called a Uu-RRC (1220). The above-described Uu-RRC connection process may be performed before the data traffic is created.

The terminal 1201 requests the base station to provide a transmission resource for performing V2X communication (1230). In this case, the terminal 1201 may request the transmission resource from the base station using an RRC message or a MAC CE. Here, as the RRC message, a SidelinkUEInformation or UEAssistanceInformation message may be used. Meanwhile, the MAC CE may be, for example, a buffer status report MAC CE of a new format (including at least an indicator notifying of a buffer status report for V2X communication or information on the size of data being buffered for D2D communication). With respect to the detailed format and the contents of the buffer status report being used in the 3GPP, the 3GPP standards TS36.321 "E-UTRA MAC Protocol Specification" are referred to. The base station 1203 allocates the V2X transmission resource to the terminal 1201 through a dedicated Uu-RRC message. This message may be included in an RRCConnectionReconfiguration message. The allocated resource may be a V2X resource through the Uu or a resource for PC5 depending on the kind of traffic requested by the terminal or the congestion degree of the corresponding link. For the above-described determination, the terminal may additionally send ProSe per packet priority (PPPP) or logical channel ID information of the V2X traffic through UEAssistanceInformation or MAC CE.

Because the base station is also aware of information on resources being used by other terminals, the base station allocates a remaining resource pool among the resources requested by the terminal 1201 (1235). The base station may indicate the final scheduling to the terminal 1201 by means of DCI transmission through the PDCCH (1240).

Next, in case of the broadcast transmission, the terminal 1201 broadcasts sidelink control information (SCI) to other terminals 1202 on the PSCCH through broadcasting without additional RRC configuration (1205) of the sidelink (1270). Further, the terminal 1201 may broadcast data to other terminals 1202 on the PSSCH (1270).

In contrast with this, in case of the unicast and groupcast transmission, the terminal 1201 may perform the RRC connection with other terminals in a one-to-one manner. Here, for discrimination against the Uu-RRC, the RRC connection between the terminals may be called a PC5-RRC. Even in case of the groupcast, the PC5-RRC (1250) is individually connected between the terminals in the group. Although FIG. 12 illustrates that the connection of the PC5-RRC (1215) is an operation after "1210", it may be performed any time before "1210" or before "1260".

If the RRC connection is necessary between the terminals, the terminal 1201 performs the PC5-RRC connection of the sidelink (1250), and transmits the SCI to other terminals 1202 on the PSCCH through the unicast and groupcast (1260). In this case, the groupcast transmission of the SCI may be construed as the group SCI. Further, the terminal 1201 transmits data to other terminals 1202 on the PSSCH through the unicast and groupcast (1270).

Figure 13:
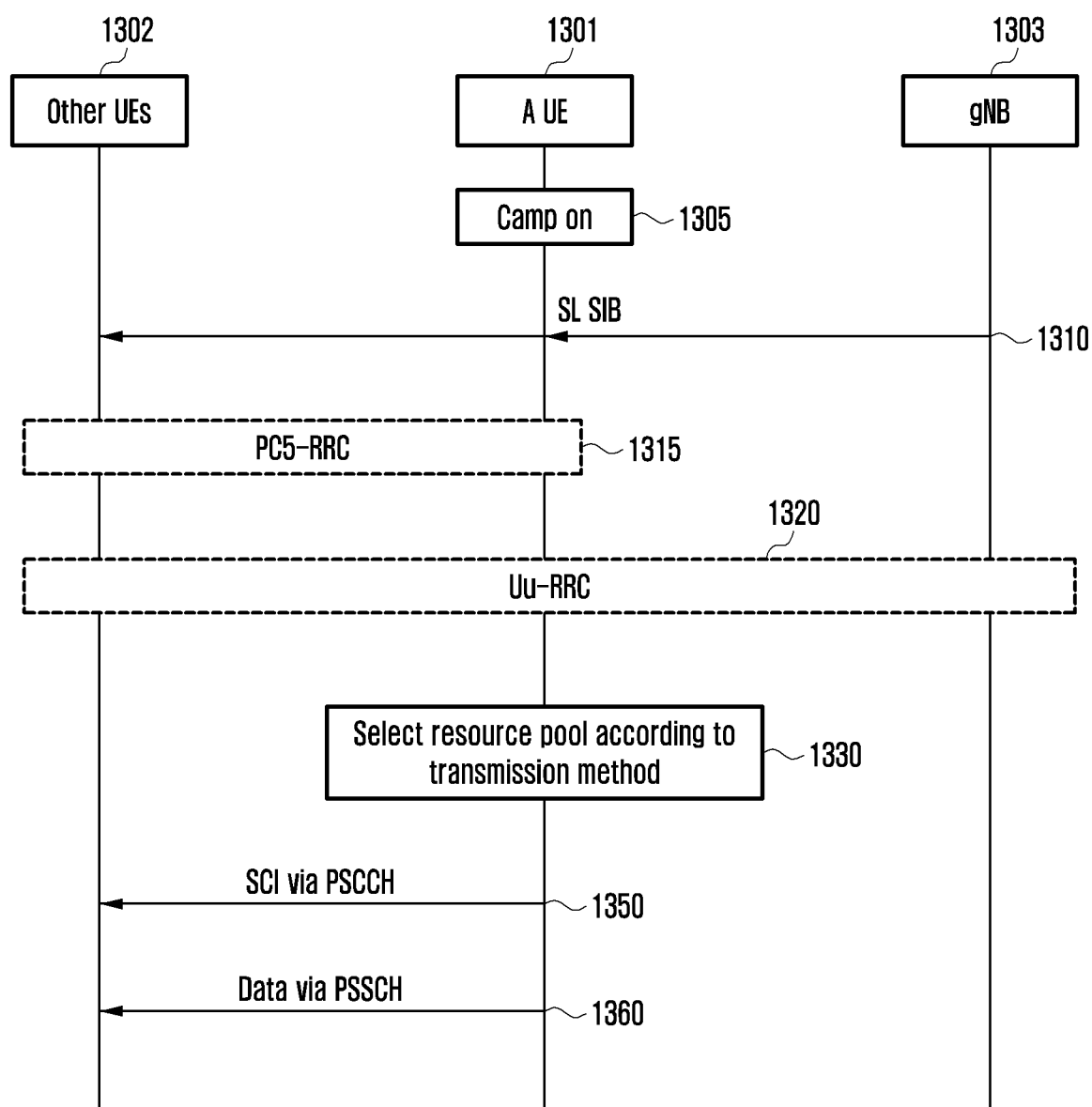
FIG. 13 is a diagram illustrating a UE autonomous resource allocation (mode 2) method in a sidelink according to an embodiment of the disclosure.

FIG. 13 is a diagram illustrating a UE autonomous resource allocation (mode 2) method in a sidelink according to an embodiment of the disclosure.

Referring to FIG. 13, in the UE autonomous resource allocation (mode 2), the base station provides a sidelink transmission/reception resource pool for V2X as system information, and the terminal selects the transmission resource in accordance with a determined rule. The resource selection method may be zone mapping or sensing based resource selection or random selection. In contrast with the scheduled resource allocation (mode 1) method in which the base station directly participates in the resource allocation, the UE autonomous resource allocation (mode 2) method of FIG. 13 is different from the scheduled resource allocation (mode 1) method on the point that the terminal 1301 autonomously selects the resource based on the resource pool pre-received through the system information, and transmits the data.

In the V2X communication, the base station 1303 may allocate various kinds of resource pools (V2X resource pool and V2P resource pool) for the terminal 1301. The resource pool may include a resource pool on which the terminal can autonomously select an available resource pool after sensing the resources being used by other neighboring terminals and a resource pool on which the terminal randomly selects a resource from a predetermined resource pool.

A camp-on (1305) terminal 1301 receives (1310) an SL SIB from a base station 1303. The system information may include resource pool information for transmission/reception, configuration information for a sensing operation, information for synchronization configuration, and information for inter-frequency transmission/reception. The operation illustrated in FIG. 13 is greatly different from the operation illustrated in FIG. 12 on the point that in case of FIG. 12, the base station 1203 and the terminal 1201 operate in an RRC-connected state, whereas in case of FIG. 13, they may operate even in an idle mode in which the RRC is not connected. Further, even in the RRC-connected state, the base station 1303 does not directly participate in the resource allocation, and may operate so that the terminal autonomously selects the transmission resource. Here, the RRC connection between the terminal and the base station may be called a Uu-RRC (1320). If data traffic for V2X is created, the terminal 1301 selects (1330) the resource pool of the time and/or frequency region in accordance with the transmission operation configured among the resource pools transferred from the base station 1303 through the system information.

Next, in case of the broadcast transmission, the terminal 1301 broadcasts the SCI to other terminals 1302 on the PSCCH through broadcasting without additional RRC configuration (1340) of the sidelink (1350). Further, the terminal 1201 may broadcast data to other terminals 1302 on the PSSCH (1360).

In contrast with this, in case of the unicast and groupcast transmission, the terminal 1301 may perform the RRC connection with other terminals in a one-to-one manner. Here, for discrimination against the Uu-RRC, the RRC connection between the terminals may be called a PC5-RRC. Even in case of the groupcast, the PC5-RRC is individually connected between the terminals in the group. This may be similar to the RRC layer connection in the connection between the base station and the terminal in the NR uplink and downlink in the related art, and the connection of the RRC layer in the sidelink may be called the PC5-RRC. Through the PC5-RRC connection, UE capability information for the sidelink may be exchanged between the terminals, or the exchange of configuration information required for the signal transmission/reception may be performed. Although FIG. 13 illustrates that the connection of the PC5-RRC (1315) is an operation after "1310", it may be performed any time before "1310" or before "1350".

If the RRC connection is necessary between the terminals, the terminal 1301 performs the PC5-RRC connection of the sidelink (1340), and transmits the SCI to other terminals 1302 on the PSCCH through the unicast and groupcast (1350). In this case, the groupcast transmission of the SCI may be construed as the group SCI. Further, the terminal 1301 transmits data to other terminals 1302 on the PSSCH through the unicast and groupcast (1360).

In the disclosure, in order to effectively perform the sensing in a situation where periodic and aperiodic traffics coexist, sensing window A and sensing window B are defined.

Figure 14A:
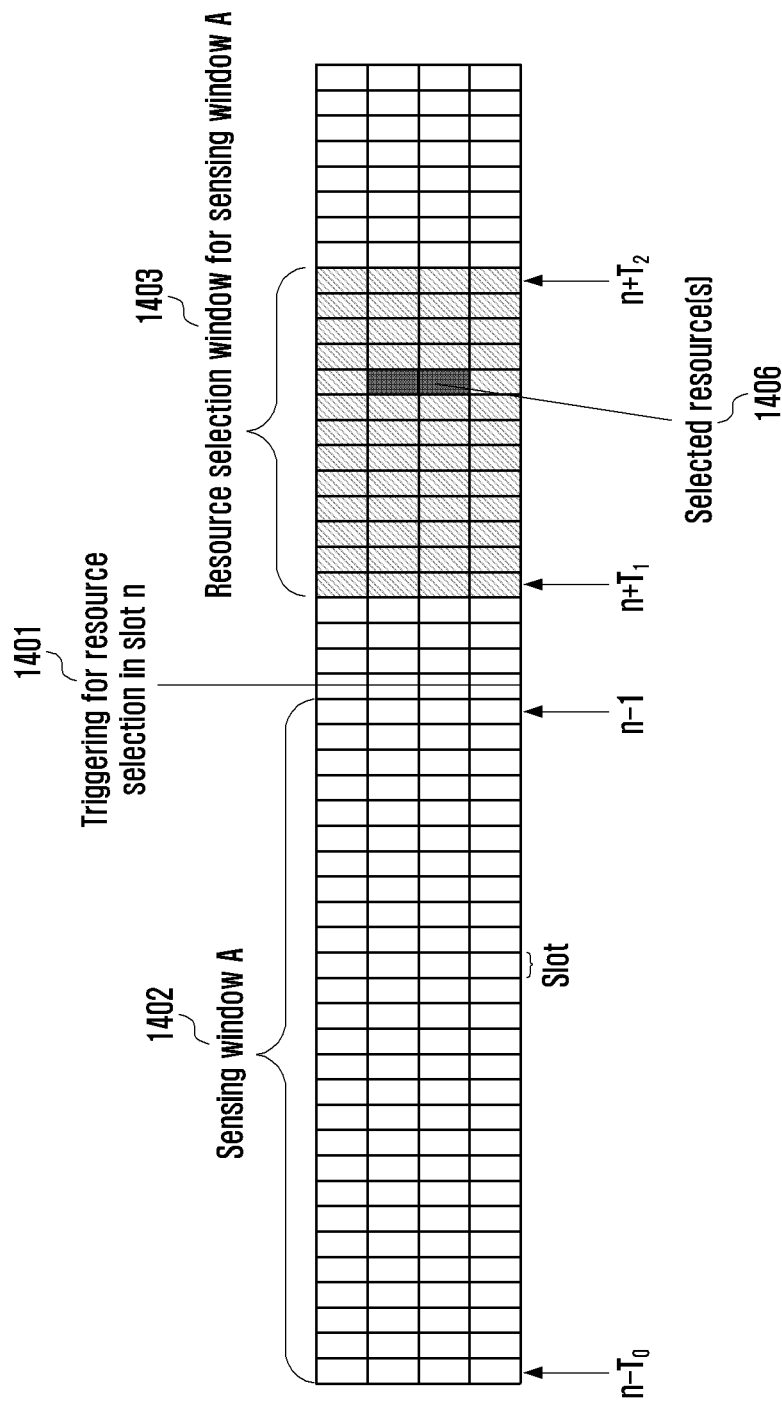
FIG. 14A is a diagram illustrating a method for configuring sensing window A for user equipment (UE) autonomous resource allocation (mode 2) of a sidelink according to an embodiment of the disclosure.

FIG. 14A is a diagram illustrating a method for configuring sensing window A for UE autonomous resource allocation (mode 2) of a sidelink according to an embodiment of the disclosure.

Referring to FIG. 14A, (1400), in case that triggering for selecting a transmission resource occurs in slot n (1401), sensing window A 1402 may be defined as follows.

Sensing window A may be defined as a slot section of [n–$T_0$, n–1]. Here, $T_0$ may be determined as a fixed value, and may be determined to be configurable.

As an example of a case where $T_0$ is determined as a fixed value, it may be indicated as $T_0=1000*2$ with respect to the periodic traffic. In contrast with this, $T_0$ may be configured as a fixed value of $T_0=100*2$ with respect to the aperiodic traffic. As exemplified above, the fixed $T_0$ value may be changed to another value in accordance with the traffic characteristic being considered, and may be fixed to the same value with respect to the periodic and aperiodic traffics. Here, is an index corresponding to numerology, and is configured as the following values in accordance with the subcarrier spacing.

SCS=15 kHz, =0
SCS=30 kHz, =1
SCS=60 kHz, =2
SCS=120 kHz, =3

In case that $T_0$ is determined to be configurable, the configuration for this may be indicated through the SL SIB or UE-specific higher signaling. In case of being indicated through the SL SIB, the corresponding value may be configured within resource pool information among the corresponding system information. If $T_0$ is configured within the resource pool information, always constant $T_0$ is used within the resource pool.

In the sensing window A, SCI decoding and sidelink measurement for another terminal may be performed.

The terminal that performs the sensing may acquire resource allocation information for another terminal and QoS information for a packet from the received SCI within the sensing window A. Here, the resource allocation information may include a reservation interval for the resource. Further, the QoS information may be latency, reliability, and priority information in accordance with the minimum required communication range for the transmitted traffic and data rate requirements. Further, the terminal may acquire location information of another terminal from the received SCI. The terminal may calculate a TX-RX distance from the location information of another terminal and its own location information.

The terminal may measure a sidelink reference signal received power (SL RSRP) from the received SCI within the sensing window A.

The terminal may measure a sidelink received signal strength indicator (SL RSSI) within the sensing window A.

The sensing window A may be used for the main purpose of determining resources for the UE autonomous resource allocation (mode 2) through sensing of the periodic traffic. The terminal may grasp the periodic resource allocation information of another terminal through the SCI decoding, and if the terminal determines that allocation of the transmission resource to the resource to be used by another terminal is not effective using the result of measuring the sidelink, such as the SL RSRP or SL RSSI, the corresponding resource may be excluded from the resource selection window 1403. As illustrated in FIG. 14A, in case that the triggering for selecting the transmission resource occurs in slot n (1401), the resource selection window 1403 may be defined as follows.

The resource selection window may be defined as a slot section of $[n+T_1, n+T_2]$. Here, $T_1$ and $T_2$ may be determined as fixed values or may be determined to be configurable. In contrast with this, $T_1$ and $T_2$ may be determined in a fixed range, and the terminal may configure proper values within the fixed range based on the implementation thereof.

$T_1$ and $T_2$ may be determined in a fixed range, and based on the implementation thereof, the terminal may configure proper values within the fixed range, for example, in the range of $T_1 \leq 4$ and $20 \leq T_2 \leq 100$.

The final transmission resource 1405 may be selected within the resource selection window using the result of the sensing performed in the sensing window A.

In case that the sensing is performed using only the sensing window A as illustrated in FIG. 14A, and the transmission resource selection is performed through this, the following transmission resource selection method may be used.

Transmission resource selection method-1

Operation-1: The number $M_{total}$ of resource candidates capable of performing resource allocation is determined based on the resource pool information within the resource selection window (1403).

Operation-2: The terminal excludes resources of which the usage is determined to be ineffective due to occupation by another terminal within the resource selection window 1403 using the sensing result in the sensing window A (1402), and remains $X(\leq M_{total})$ resource candidates capable of performing resource allocation.

For this, a method for excluding resources through SCI decoding for another terminal and sidelink measurement may be used.

Operation-3: A resource candidate list X is reported to a higher layer of the terminal, and the final transmission resource among X candidates is randomly selected on the higher layer of the terminal.

Figure 14B:
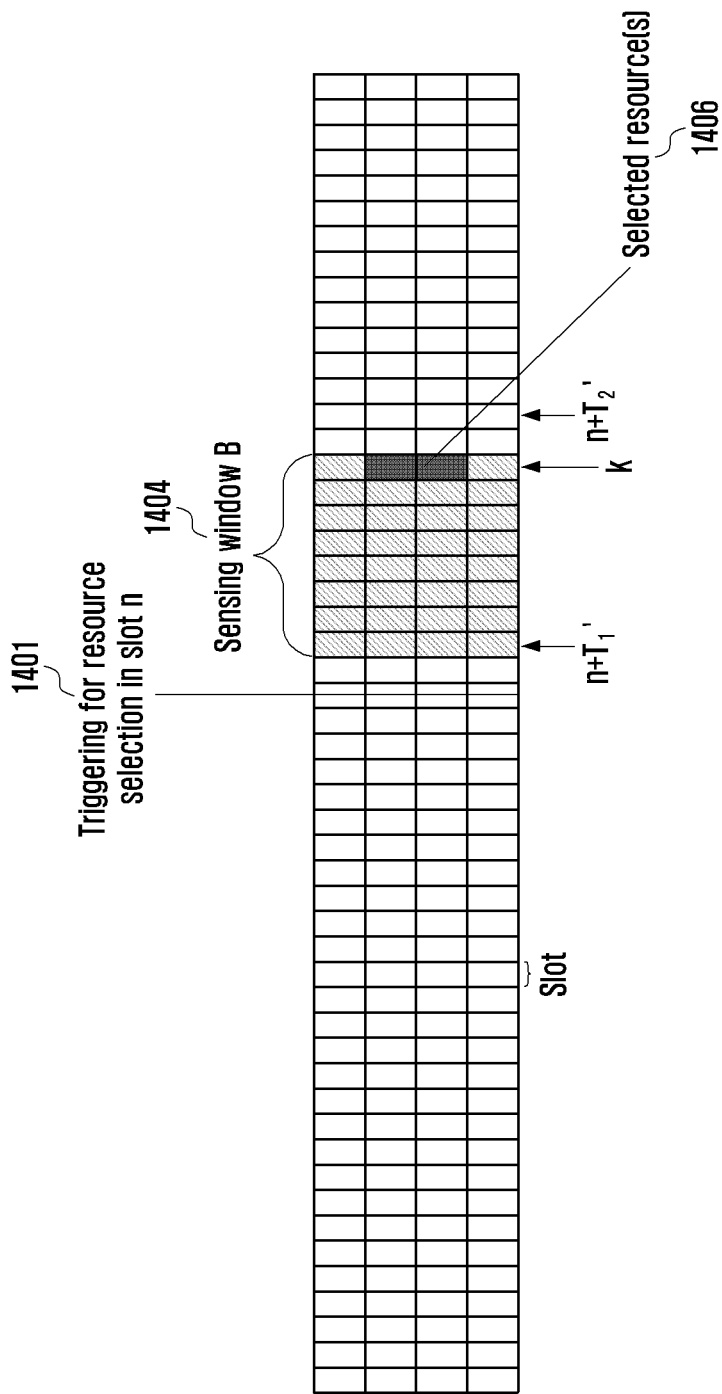
FIG. 14B is a diagram illustrating a method for configuring sensing window B for UE autonomous resource allocation (mode 2) of a sidelink according to an embodiment of the disclosure.

FIG. 14B is a diagram illustrating a method for configuring sensing window B for UE autonomous resource allocation (mode 2) of a sidelink according to an embodiment of the disclosure.

Referring to FIG. 14B, (1430), in case that triggering for selecting a transmission resource occurs in slot n (1401), sensing window B 1404 may be defined as follows.

Sensing window B may be defined as a slot section of $[n+T_1', n+T_2']$. Here, $T_1'$ and $T_2'$ may be determined as fixed values, or may be determined to be configurable. In contrast with this, $T_1'$ and $T_2'$ may be determined in a fixed range, and the terminal may configure proper values within the fixed range based on the implementation thereof. Further, in case that k indicates the slot in which the resource is finally selected, the sensing window B is interrupted in k slot, and in this case, the sensing window B becomes $[n+T_1', k]$.

$T_1'$ and $T_2'$ may be configured to have the same values as the values of $T_1$ and $T_2$ of the resource selection window (1403), respectively, or may be configured to have different values.

For example, if $T_1'$ is configured as $T_1'=0$, it means that sensing is performed from a triggering slot n for selecting the transmission resource.

By the configured $T_1'$ and $T_2'$ values, the sensing window B may be configured as one slot or more slots.

In the sensing window B, the SCI decoding for another terminal and sidelink measurement may be performed.

Sensing in the sensing window B is performed.

The sensing window B may be used for the purpose of determining resources for UE autonomous resource allocation (mode 2) through additional sensing of periodic and aperiodic traffics with respect to the sensing window A. In the sensing window B configured hereinafter based on a triggering slot n for selecting the transmission resource, it is possible to sense an aperiodic traffic that is unable to be predicted in the sensing window A using the sidelink measurement for the slot to which an actual transmission resource can be allocated. The sensing through the sensing window B may be understood as an operation of performing the sensing with respect to the traffic sensed for each slot regardless of whether the traffic is periodic or aperiodic. In case that the sensing is performed using the sensing window B as illustrated in FIG. 14B, and the transmission resource selection is performed through this, the following transmission resource selection method may be used.

Transmission resource selection method-2

Operation-1: It is determined whether a corresponding resource is idle by performing sensing in the corresponding slot within the sensing window B (1404).

The resource allocation unit on frequency may be defined as $A(\geq 1)$ sub-channels or all sub-channels. The number $N_{total}$ of resource candidates capable of performing resource allocation within the corresponding slot is determined in accordance with the resource allocation unit on the frequency.

The sensing may be performed through SCI decoding and sidelink measurement.

Operation-2-1: If it is determined that the corresponding resource is idle through the sensing in operation-1 as described above, the final transmission resource 1406 among the number $N_{total}$ of resource candidates capable of performing resource allocation within the corresponding slot is determined.

Operation-2-2: If it is determined that all the corresponding resources are busy through the sensing in operation-1 as described above, the following operation may be selected.

If the next slot is also configured as the sensing window B (1404), the operation skips to the next slot, and operation-1 as described above is performed.

If the next slot is not configured to the sensing window B (1404), the following operation may be considered.

In the current slot, the final transmission resource 1406 is determined using QoS information or the result of energy detection. The QoS information may be priority information in accordance with at least one of priority, latency, reliability, proximity service (ProSe) per-packet priority (PPPP), ProSe per-packet reliability (PPPR), minimum required communication range for traffics being transmitted, or data rate requirements. The priority may mean to include the PPPP and the PPPR, and may be a value selected within a range of predetermined values, and data that is necessary to be transmitted in the sidelink may have one priority value.

The transmission in the current slot may be canceled, and a backoff operation may be performed.

As defined through FIGS. 14A and 14B, the sensing window A and the sensing window B may be divided based on a time point where triggering for selecting the transmission resource comes down. Specifically, based on the triggering slot n for selecting the transmission resource, the previously configured sensing section may be defined as the sensing window A, and the sensing section configured thereafter may be defined as the sensing window B.

Figure 14C:
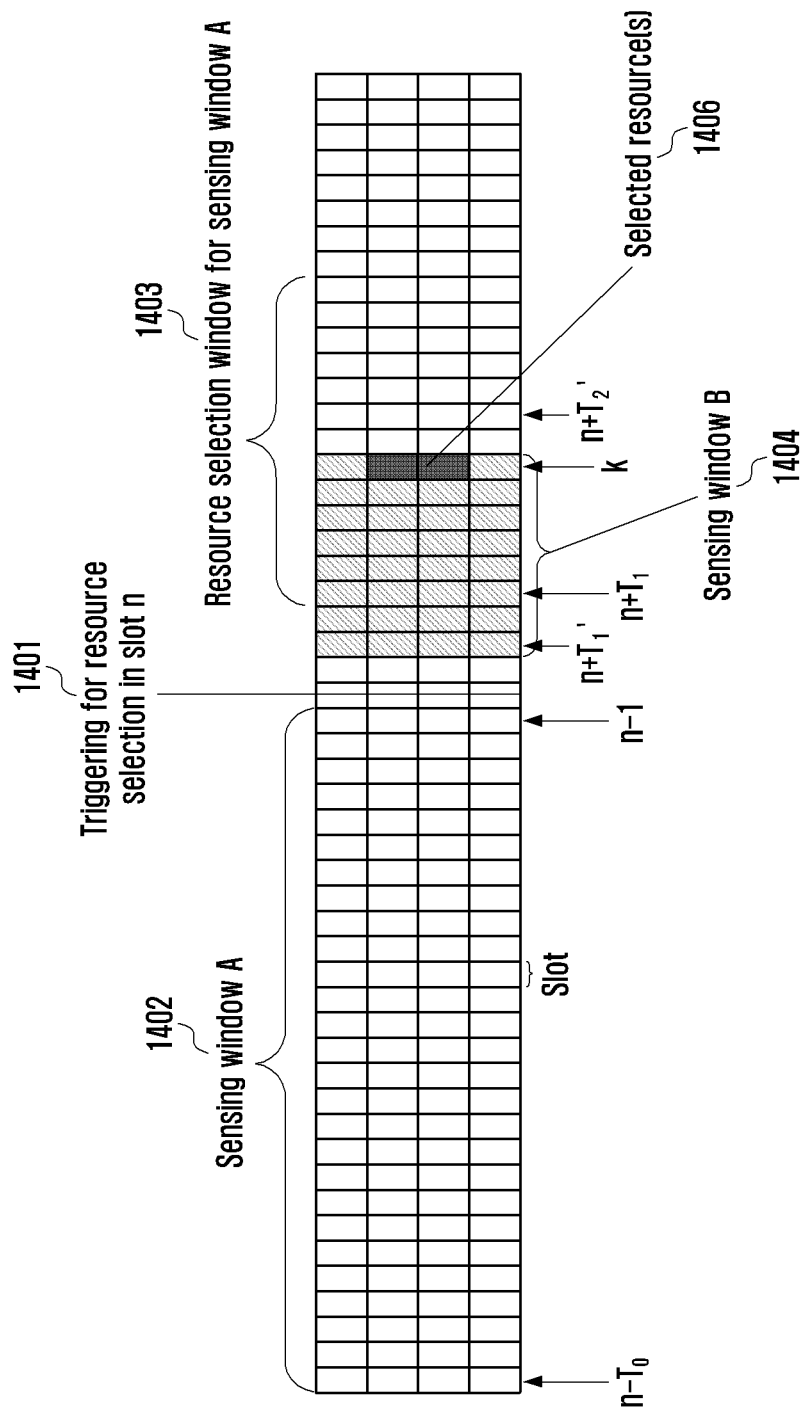
FIG. 14C is a diagram illustrating a method for configuring sensing window A and sensing window B for UE autonomous resource allocation (mode 2) of a sidelink according to an embodiment of the disclosure.

FIG. 14C is a diagram illustrating a method for configuring sensing window A and sensing window B for UE autonomous resource allocation (mode 2) of a sidelink according to an embodiment of the disclosure.

Referring to FIG. 14C, (1460) illustrates an example of a case that sensing window A and sensing window B are simultaneously configured. In case that the triggering for selecting the transmission resource occurs in slot n (1401), the sensing window A (1402) and the sensing window B (1404) may refer to the above-described definition. In case that the sensing is performed using both the sensing window A and sensing window B as illustrated in FIG. 14C, and the transmission resource selection is performed through this, the following transmission resource selection method may be used.

Transmission resource selection method-3

Operation-1: The number $M_{total}$ of resource candidates capable of performing resource allocation is determined based on the resource pool information within the resource selection window (1403).

Operation-2: The terminal performing the sensing excludes resources of which the usage is determined to be ineffective due to occupation by another terminal within the resource selection window 1403 using the sensing result in the sensing window A (1402), and remains $X(\leq M_{total})$ resource candidates capable of performing resource allocation. SCI decoding for another terminal and sidelink measurement may be used to exclude the resources.

Operation-3: A resource candidate list X is reported to a higher layer of the terminal, and Y candidates among X candidates are randomly down-selected on the higher layer of the terminal.

Operation-4-1: If the sensing window B (1404) is included in the resource selection window (1403), the terminal selects the final transmission resource (1406) among Y candidates determined on the higher layer by the transmission resource selection method-2 using the sensing result of the sensing window B (1404) on the physical layer.

If the sensing window B (1404) is included in the resource selection window (1403), this corresponds to a section of $[n+T_1, k]$ in FIG. 14C. Such a condition may be determined by the configuration of $T_1$ and $T_2$, and $T_1'$ and $T_2'$.

Operation-4-2: If the sensing window B (1404) is not included in the resource selection window (1403), the final transmission resource 1406 is selected by the transmission resource selection method-2 using the sensing result in the sensing window B on the physical layer.

The case that the sensing window B (1404) is not included in the resource selection window (1403) corresponds to a section of $[n+T_1', n+T_1-1]$ in FIG. 14C. Such a condition may be determined by the configuration of $T_1$ and $T_2$, and $T_1'$ and $T_2'$.

In the transmission resource selection method-e, the selection of Y candidates on the higher layer may be omitted, and the following method may be used.

Transmission resource selection method-4

Operation-1: The number $M_{total}$ of resource candidates capable of performing resource allocation is determined based on the resource pool information within the resource selection window (1403).

Operation-2: The terminal performing the sensing excludes resources of which the usage is determined to be ineffective due to occupation by another terminal within the resource selection window 1403 using the sensing result in the sensing window A (1402), and remains $X(\leq M_{total})$ resource candidates capable of performing resource allocation. SCI decoding for another terminal and sidelink measurement may be used to exclude the resources.

Operation-3-1: If the sensing window B (1404) is included in the resource selection window (1403), the terminal selects the final transmission resource (1406) among X candidates by the transmission resource selection method-2 using the sensing result of the sensing window B (1404) on the physical layer.

If the sensing window B (1404) is included in the resource selection window (1403), this corresponds to a section of $[n+T_1, k]$ in FIG. 14C. Such a condition may be determined by the configuration of $T_1$ and $T_2$, and $T_1'$ and $T_2'$.

Operation-3-2: If the sensing window B (1404) is not included in the resource selection window (1403), the final transmission resource 1406 is selected by the transmission resource selection method-2 using the sensing result in the sensing window B on the physical layer.

The case that the sensing window B (1404) is not included in the resource selection window (1403) corresponds to a section of $[n+T_1', n+T_1-1]$ in FIG. 14C. Such a condition may be determined by the configuration of $T_1$ and $T_2$, and $T_1'$ and $T_2'$.

If the sensing window A and the sensing window B are simultaneously configured, the final resource selection may be determined by the resource selection window (1403) and the sensing window B (1404). The transmission resource selection method-3 and the transmission resource selection method-4 as proposed above are methods for performing the sensing in a situation where the periodic and aperiodic traffics coexist by simultaneously configuring the sensing window A and the sensing window B and optimizing the selection of the transmission resource through the sensing.

The sensing and the transmission resource selection in the UE autonomous resource allocation (mode 2) of the sidelink as described above may be implemented in various methods. For example, in case of simultaneously configuring the sensing window A and the sensing window B, if the triggering for selecting the transmission resource occurs in slot n in a state where the terminal is always performing the sensing for the sensing window A, the terminal may be implemented to select the final transmission resource by sensing the sensing window B. However, the terminal, which always performs the sensing for the sensing window A, can immediately use the sensing result of the sensing window A anytime, and thus it has the advantage on the side of the latency in selecting the transmission resource, but it has the disadvantage on the side of energy consumption.

Accordingly, as another method, the terminal may be implemented to immediately perform the sensing for the sensing window A if a traffic to be transmitted occurs, and to select the final transmission resource by performing the sensing for the sensing window B after performing triggering for selecting the transmission resource. The latter method has the advantage that it can minimize the energy consumption of the terminal, but has the disadvantage on the side of the latency in selecting the transmission resource.

From the foregoing, an example has been described, in which an empty frequency-time resource is searched for the communication between the terminals in the sidelink, and the signal is transmitted on the searched resources. However, the method and the apparatus provided in the disclosure are not limited thereto, and can be applied to various channel occupation and channel reservation methods.

Figure 15:
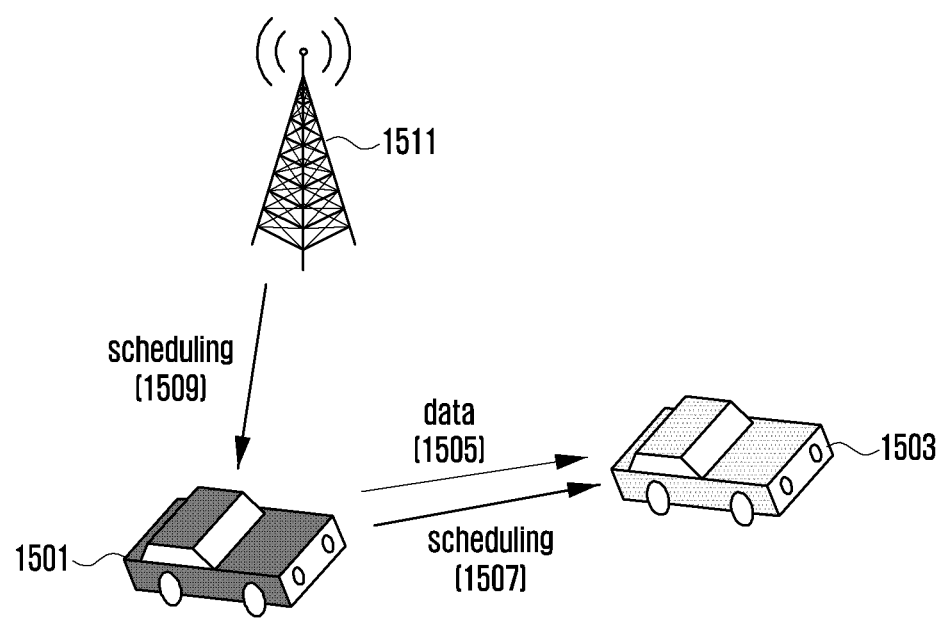
FIG. 15 is a diagram illustrating a mode 1 method that is a method for performing sidelink data transmission through reception of scheduling information from a base station according to an embodiment of the disclosure.

FIG. 15 is a diagram illustrating a mode 1 method that is a method for performing sidelink data transmission through reception of scheduling information from a base station according to an embodiment of the disclosure. In the disclosure, a method for receiving scheduling information from a base station and performing sidelink communication based on the scheduling information is called mode 1, but it is also possible to call the method as other names.

Referring to FIG. 15, a terminal 1501 intended to perform transmission in a sidelink receives scheduling information 1509 for sidelink communication from a base station 1511. In the disclosure, the terminal 1501 intended to perform transmission in the sidelink may be called a transmitting terminal, and a terminal 1503 performing data reception in the sidelink may be called a receiving terminal. However, the transmitting terminal 1501 and the receiving terminal 1503 may be able to perform both data transmission and reception in the sidelink. The scheduling information 1509 for the sidelink communication may be obtained through reception of downlink control information (DCI) transmitted by the base station 1511, and the DCI may include following information.

Carrier indicator: This may be used for the purpose of scheduling the sidelink of another carrier in a situation where carrier aggregation (CA) is applied.

Lowest index of sub-channel allocation for initial transmission: This may be used for frequency resource allocation of the initial transmission.

Information to be included in sidelink control information
This may include frequency resource allocation information, the frequency resource allocation information for initial transmission and retransmission, and resource allocation for subsequent N-times transmission or resource reservation information.

Time interval information between initial transmission and retransmission

This may include information on the sidelink slot structure, and information on what slot and what symbols can be used for the sidelink.

This may include HARQ-ACK/CSI feedback timing information, and timing information for transmitting HARQ-ACK or CSI feedback in the sidelink to the base station.

Addressee ID: ID information on what terminals are to receive information

Quality-of-Service (QoS) information, such as priority: Information on what priority data is to be transmitted with The scheduling may be used as scheduling for once sidelink transmission, or may be used for periodic transmission, semi-persistent scheduling (SPS), or configured grant. The scheduling methods may be discriminated by an indicator included in the DCI, RNTI scrambled in a CRC added to the DCI, or ID value. Zero (0) bit may be additionally added to the DCI to make the size of the DCI equal to the size of other DCI formats, such as DCI for downlink scheduling or uplink scheduling.

The transmitting terminal 1501 receives the SCI for sidelink scheduling from the base station 1511, transmits a PSCCH including the sidelink scheduling information (1507), and transmits a PSSCH that is the corresponding data (1505). The sidelink scheduling information 1507 may be sidelink control information (SCI), and the SCI may include the following information.

HARQ process number: HARQ process ID for HARQ-related operation of data being transmitted New data indicator (NDI): Information on whether the currently transmitted data is new data Redundancy Version: Information on what parity bit is to be sent when mapping is performed through channel coding of data Layer-1 source ID: ID information on a physical layer of a sending terminal Layer-1 destination ID: ID information on a physical layer of a receiving terminal Frequency-domain resource assignment for scheduling PSSCH: Frequency-domain resource configuration information of data being transmitted MCS: modulation order and coding rate information QoS indication: This may include a priority, target latency/delay, target distance, and target error rate.

Antenna port(s): Antenna port information for data transmission

DMRS sequence initialization: This may include information on an ID value for initialization of a DMRS sequence.

PTRS-DMRS association: This may include information on PTRS mapping.

CBGTI: This may be utilized as an indicator for code block group (CBG) unit retransmission.

Resource reservation: Information for resource reservation

Time gap between initial transmission and retransmission: Time interval information between initial transmission and retransmission Retransmission index: Indicator for discriminating retransmission Transmission format/cast type indicator: Discrimination indicator of a transmission format or unicast/groupcast/broadcast Zone ID: Location information of a transmitting terminal NACK distance: Reference indicator determining whether a receiving terminal transmits HARQ-ACK/NACK HARQ feedback indication: This may include whether a feedback is to be transmitted or whether the feedback is being transmitted.

Time-domain resource assignment for scheduling PSSCH: Time-domain resource information of sidelink data being transmitted Second SCI indication: Indicator including mapping information of the second SCI in case of 2-stage control information DMRS pattern: DMRS pattern (e.g., DMRS-mapped symbol location) information The control information may be included in one SCI to be transmitted to the receiving terminal, or may be included in two SCIs to be transmitted. The transmission of the control information through two SCIs may be called a 2-stage SCI method.

Figure 16:
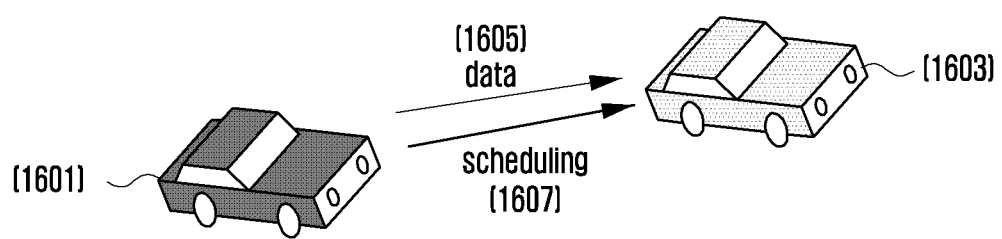
FIG. 16 is a diagram illustrating a mode 2 method that is a method in which a terminal performs sidelink data transmission without scheduling of a base station according to an embodiment of the disclosure.

FIG. 16 is a diagram illustrating a mode 2 method that is a method in which a terminal performs sidelink data transmission without scheduling of a base station according to an embodiment of the disclosure.

Referring to FIG. 16, a first terminal 1601 transmits scheduling information 1607 and data 1605 in accordance with the scheduling information 1607 to a second terminal 1603.

Figure 17:
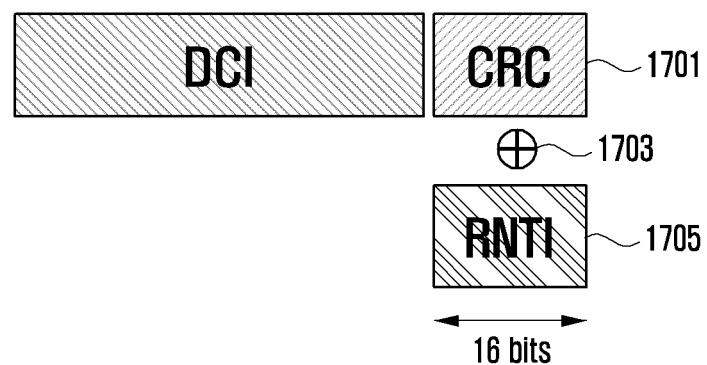
FIG. 17 is a diagram illustrating a method in which a long term evolution (LTE) system in the related art enables a terminal to distinguish its own control signal by allocating radio network temporary identifier (RNTI) having a length of 16 bits to the terminal and transmitting a control signal through masking of the allocated RNTI value with a 16-bit CRC added to the control signal according to an embodiment of the disclosure.

FIG. 17 is a diagram illustrating a method in which an LTE system in the related art enables a terminal to distinguish its own control signal by allocating RNTI having a length of 16 bits to the terminal and transmitting a control signal through masking of the allocated RNTI value with a 16-bit CRC added to the control signal according to an embodiment of the disclosure.

Referring to FIG. 17, downlink control information (DCI) includes a 16-bit CRC added to the last part of the DCI (1701), and a 16-bit RNTI value is added to the CRC through an XOR operation (1705). The RNTI value may be used for terminal discrimination or control signal purpose discrimination. For example, the terminal is aware of an SI-RNTI value, and the SI-RNTI value may be used to detect a control signal for system information transmission. The above-described case that the RNTI is used to detect the control signal may mean that the terminal may identify whether a CRC check has succeeded by performing the CRC check with respect to the result of re-performing the RNTI value masking when performing the CRC check after decoding the control signal (1703).

Figure 18:
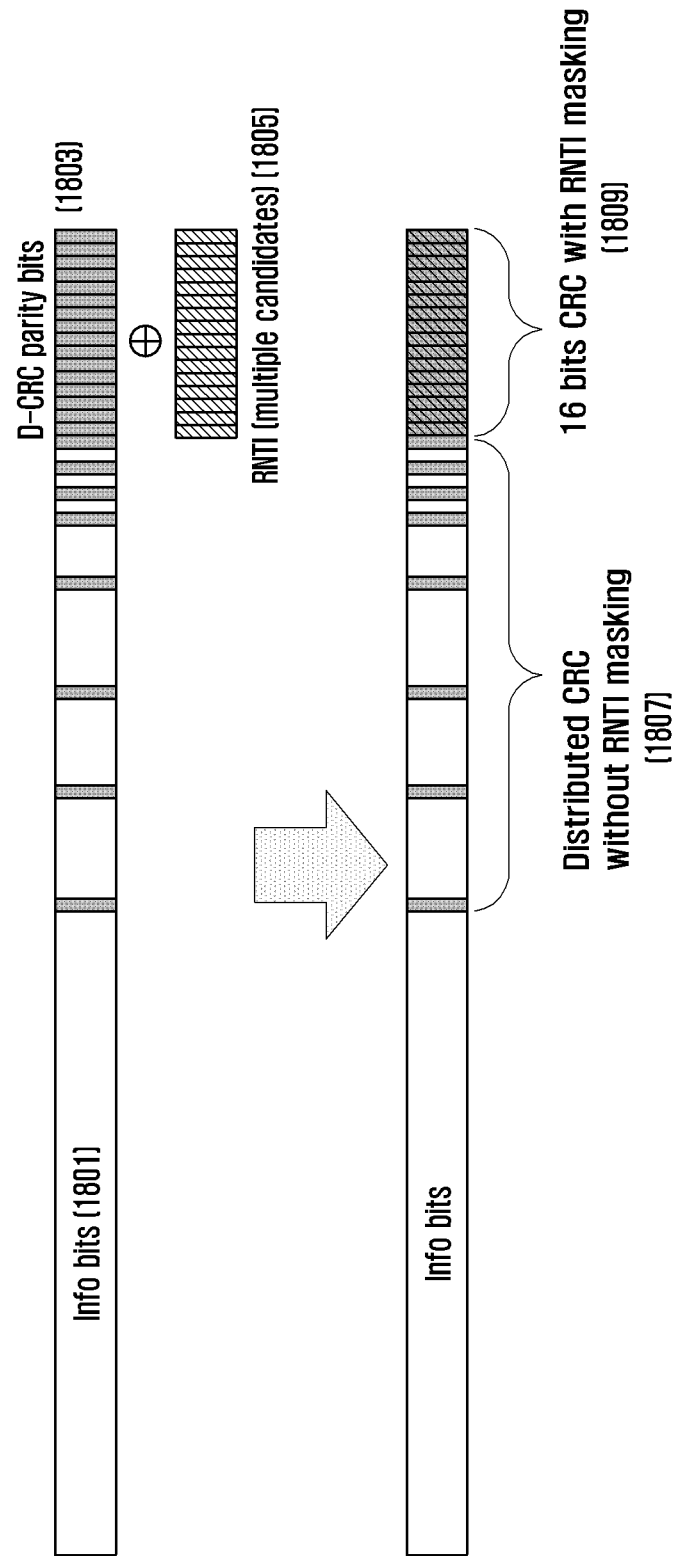
FIG. 18 is a diagram illustrating downlink control Information (DCI) information bits being added with 24-bit CRC and 16-bit RNTI is masked with a part of the CRC in an NR system according to an embodiment of the disclosure.

FIG. 18 is a diagram illustrating DCI information bits being added with 24-bit CRC and 16-bit RNTI is masked with a part of the CRC in an NR system in the related art according to an embodiment of the disclosure.

Referring to FIG. 18, the total 24-bit CRC 1803 is added to the DCI information bits 1801, and a part of the CRC 1803 is added to the middle of the DCI information bits and the remaining CRC is added to the last part of the DCI information. The RNTI value 1805 which is configured or known to the terminal is masked with the last 16 bits 1809 of the added CRC. The masking may mean performing of an XOR operation of bit values in the same location, and may be an operation which produces "0" if the two bit values are equal to each other, and produces "1" if the two bit values are different from each other. With the front 8 bits 1807 of the added CRC, the masking of the RNTI value is not performed. As described above, after addition of the CRC 1803 and the partial masking of the RNTI, channel coding through a polar code is performed with respect to the created control information to be transmitted. After decoding the control information using the polar code, a receiving end may determine whether to detect the DCI by performing the CRC check through re-performing of the masking with respect to a part where the RNTI is masked with the added CRC based on the already known or configured RNTI value or performing of an operation to release the masking.

The disclosure provides a method and an apparatus for dividing sidelink control information into two pieces of sidelink control information and transferring the divided sidelink control information to the receiving terminal. This may be called a 2-stage (or 2-operation) control information transfer method (i.e., 2-stage SCI method).

In the 2-stage control information transfer method for sidelink communication according to an embodiment of the disclosure, first control information may be called first control information or SCI_1, and second control information may be called second control information or SCI_2. When performing the sidelink communication, it is not always necessary for one terminal to decode both the first control information and the second control information in all cases of the data decoding, and in a specific case, data decoding scheduled by the first control information may be possible even by decoding the first control information only.

First Embodiment

First embodiment provides a method and an apparatus for transmission and reception of control information performed by a transmitting terminal and a receiving terminal in a method for transmission and reception of sidelink control information in 2 stages.

Figure 19:
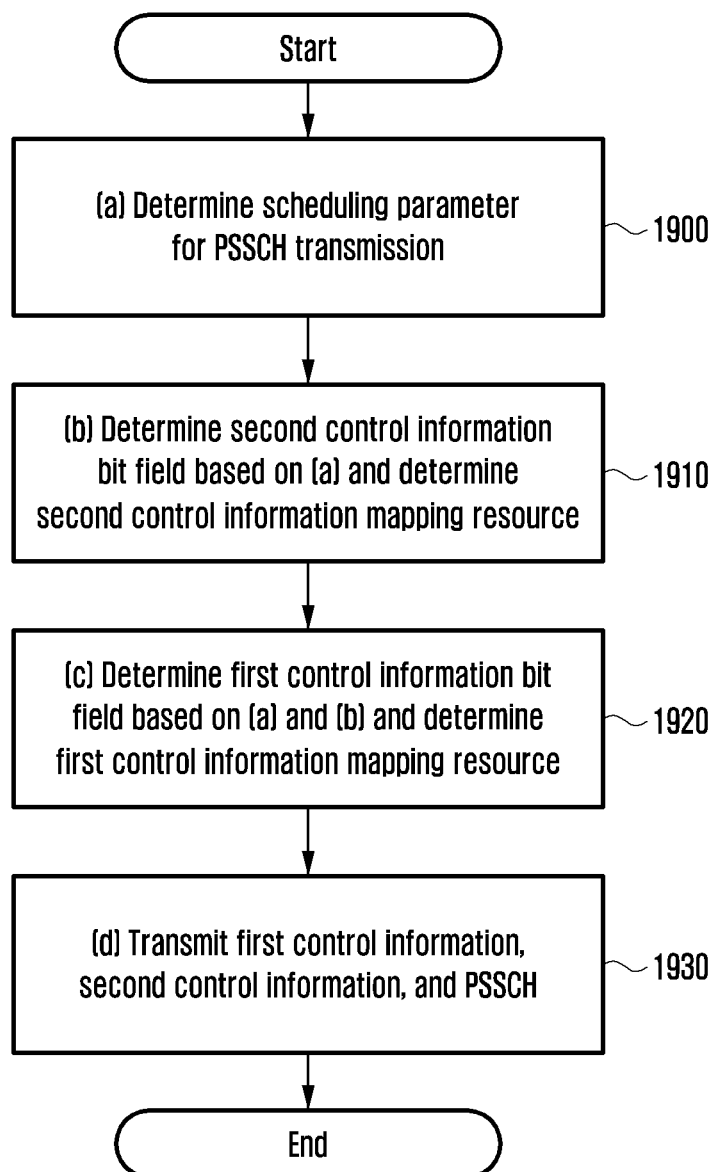
FIG. 19 is a flowchart illustrating a method by a transmitting terminal for determining bit field values of first control information and second control information according to an embodiment of the disclosure.

FIG. 19 is a flowchart illustrating a method by a transmitting terminal for determining bit field values of first control information and second control information according to an embodiment of the disclosure.

Referring to FIG. 19, the transmitting terminal determines a resource for transmitting a PSSCH through the above-described methods for channel occupation or channel reservation at operation 1900. Based on this, the transmitting terminal determines scheduling parameters included in SCI. The scheduling parameter may include PSSCH frequency and time resources, MCS, RV, NDI, and HARQ process ID. The transmitting terminal determines bit field values of second control information based on the determined scheduling parameter, and determines where to map the second control information, that is, a transmission resource at operation 1910. Further, the transmitting terminal determines the bit field value of first control information based on the PSSCH scheduling parameter, the bit field value of the second control information, and determines the transmission resource onto which the second control information is mapped at operation 1920. This is because information for decoding of the second control information may be included in the first control information. Based on the determined information, the transmitting terminal transmits the first control information, the second control information, and the PSSCH at operation 1930.

Figure 20:
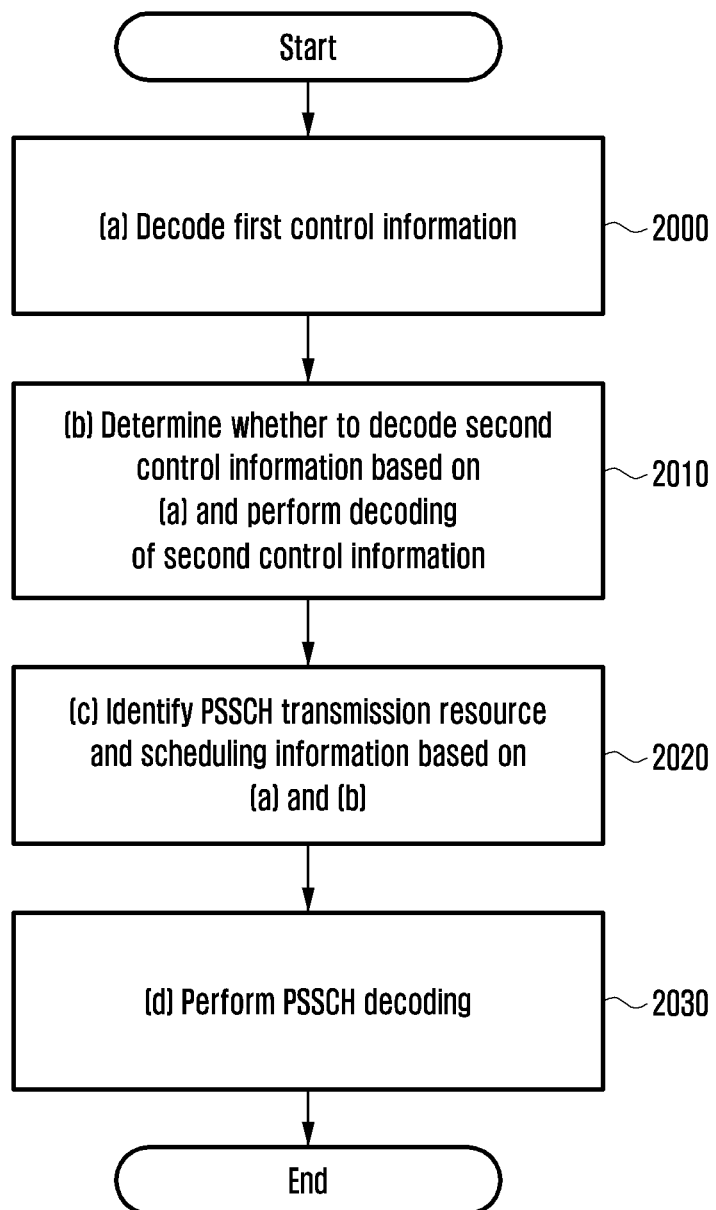
FIG. 20 is a flowchart illustrating a method by a receiving terminal for contiguously decoding first control information and second control information and decoding a physical sidelink shared channel (PSSCH) based on this according to an embodiment of the disclosure.

FIG. 20 is a flowchart illustrating a method by a receiving terminal for contiguously decoding first control information and second control information and decoding a PSSCH based on this according to an embodiment of the disclosure.

Referring to FIG. 20, the receiving terminal attempts decoding of the first control information based on predetermined information at operation 2000. In accordance with the bit field value of the first control information of which the decoding has succeeded in the above-described process, the receiving terminal determines whether to decode the second control information, and if decoding of the second control information is necessary, the receiving terminal determines which resource the second control information is mapped onto, and performs decoding of the second control information at operation 2010. As described above, the reason why to determine whether to decode the second control information is that it is possible to decode the PSSCH only through decoding of the first control information in a certain transmission type or transmission mode. The receiving terminal identifies a PSSCH transmission resource and other scheduling information based on the bit field values of the decoded first control information and second control information at operation 2020. The receiving terminal performs the PSSCH decoding using the identified scheduling information, and performs necessary subsequent operations at operation 2030.

Second Embodiment

Second embodiment provides a method and an apparatus for mapping second control information onto a resource. In an embodiment of the disclosure, it is exemplified that the second control information is mapped onto the PSSCH to be transmitted, and such mapping may be a method similar to the method in which uplink control information (UCI) is mapped onto a PUSCH to be transmitted in an uplink of an NR system in the related art.

Figure 21:
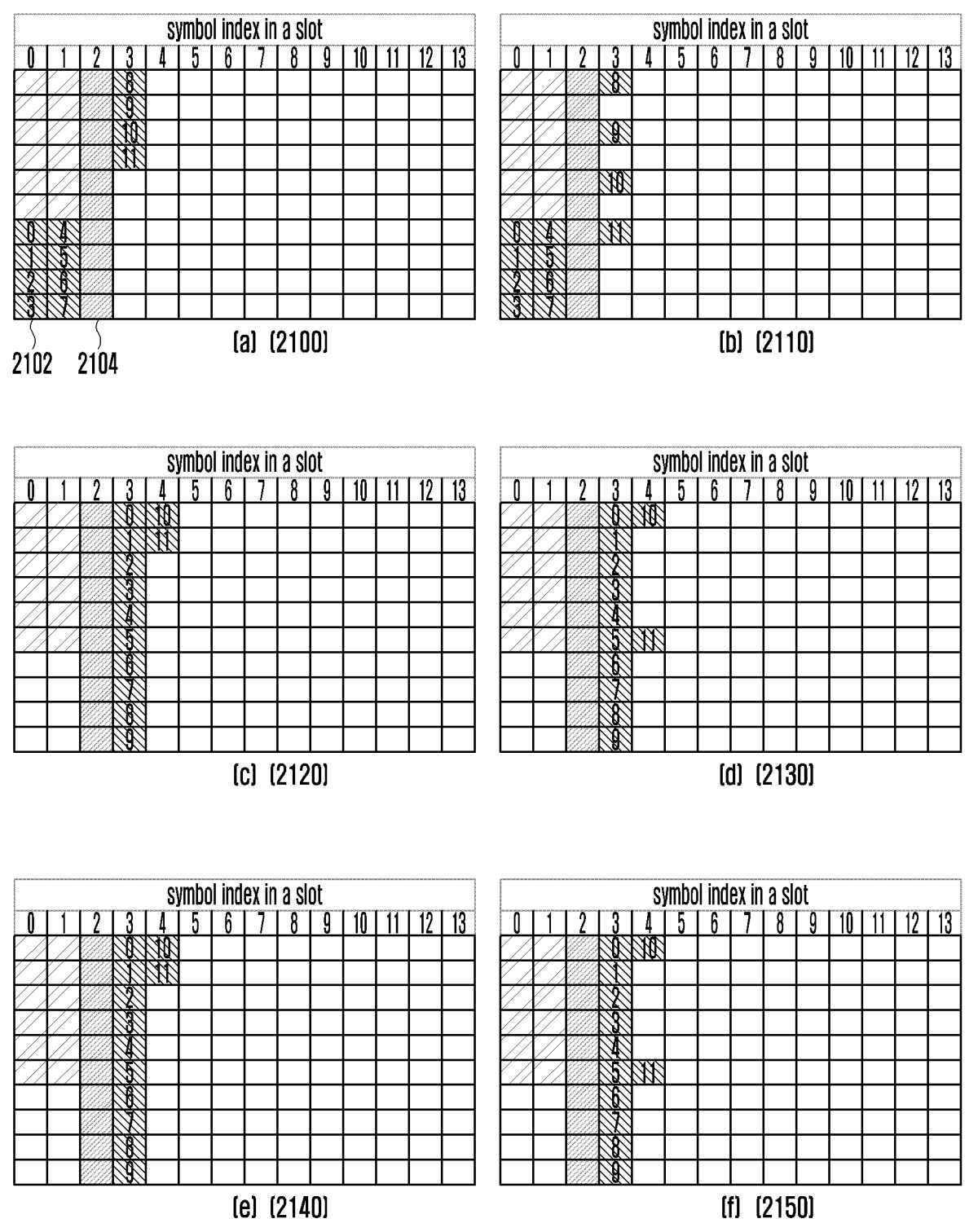

FIG. 21 is a diagram illustrating a method for transmitting second control information on a PSSCH according to an embodiment of the disclosure.

Referring to FIG. 21, this method may be referred to a case that second control information is piggybacked on the PSSCH, and corresponds to a method in which the second control information is encoded by a channel coding method different from an SL-SCH included in the PSSCH and is mapped. The transmitting terminal transmits the PSCCH and PSSCH to the receiving terminal, and on the PSCCH, the first control information may be mapped to be transferred to the receiving terminal. The transmitting terminal maps and transmits the first control information using the PSCCH, and transmits the PSSCH in accordance with PSSCH scheduling information included in the first control information. The transmitting terminal maps the second control information onto a resource region.

Referring to FIG. 21, it is exemplified that the second control information is mapped onto the PSCCH. (a) (2100) denotes an example in which the second control information 2102 is mapped onto the maximally front part of a slot so that the second control information 2102 can be received as soon as possible. It is also possible that the second control information 2102 is mapped after a DMRS 2104 of the PSSCH. (b) (2110) denotes an example in which the second control information 2102 is mapped onto the maximally front part of a slot so that the second control information 2102 can be received as soon as possible, and the second control information is mapped onto the last symbol so as to be widely spread in a frequency domain. According to the (a) (2100) and (b) (2110), it is effective that the receiving terminal is able to decode the second control information as soon as possible.

(c) (2120) denotes an example in which the second control information 2102 is mapped onto the maximally front part just after the mapping of the DMRS 2104 of the PSSCH so that the second control information 2102 can be received as soon as possible after the DMRS 2104 of the PSSCH is received. (d) (2130) denotes an example in which the second control information 2102 is mapped onto the maximally front part just after the mapping of the DMRS of the PSSCH so that the second control information 2102 can be received as soon as possible after the DMRS 2104 of the PSSCH is received, and the second control information is mapped onto the last symbol so as to be widely spread in the frequency domain to be mapped.

(e) (2140) denotes an example in which the second control information 2102 is mapped onto the maximally front part just after the mapping of the DMRS 2104 of the PSSCH so that the second control information 2102 can be received as soon as possible from the same symbol as that of the DMRS 2104 of the PSSCH. (f) (2150) denotes an example in which the second control information 2102 is mapped onto the maximally front part just after the mapping of the DMRS 2104 of the PSSCH so that the second control information 2102 can be received as soon as possible from the same symbol as that of the DMRS 2104 of the PSSCH, and the second control information 2102 is mapped onto the last symbol so as to be widely spread in the frequency domain to be mapped. According to the (c) (2120), (d) (2130), (e) (2140), and (f) (2150), the receiving terminal can decode the second control information as soon as possible after completing the channel estimation using the DMRS of the PSSCH, and it is effective that elaborate channel estimation information can be used.

Figure 22:
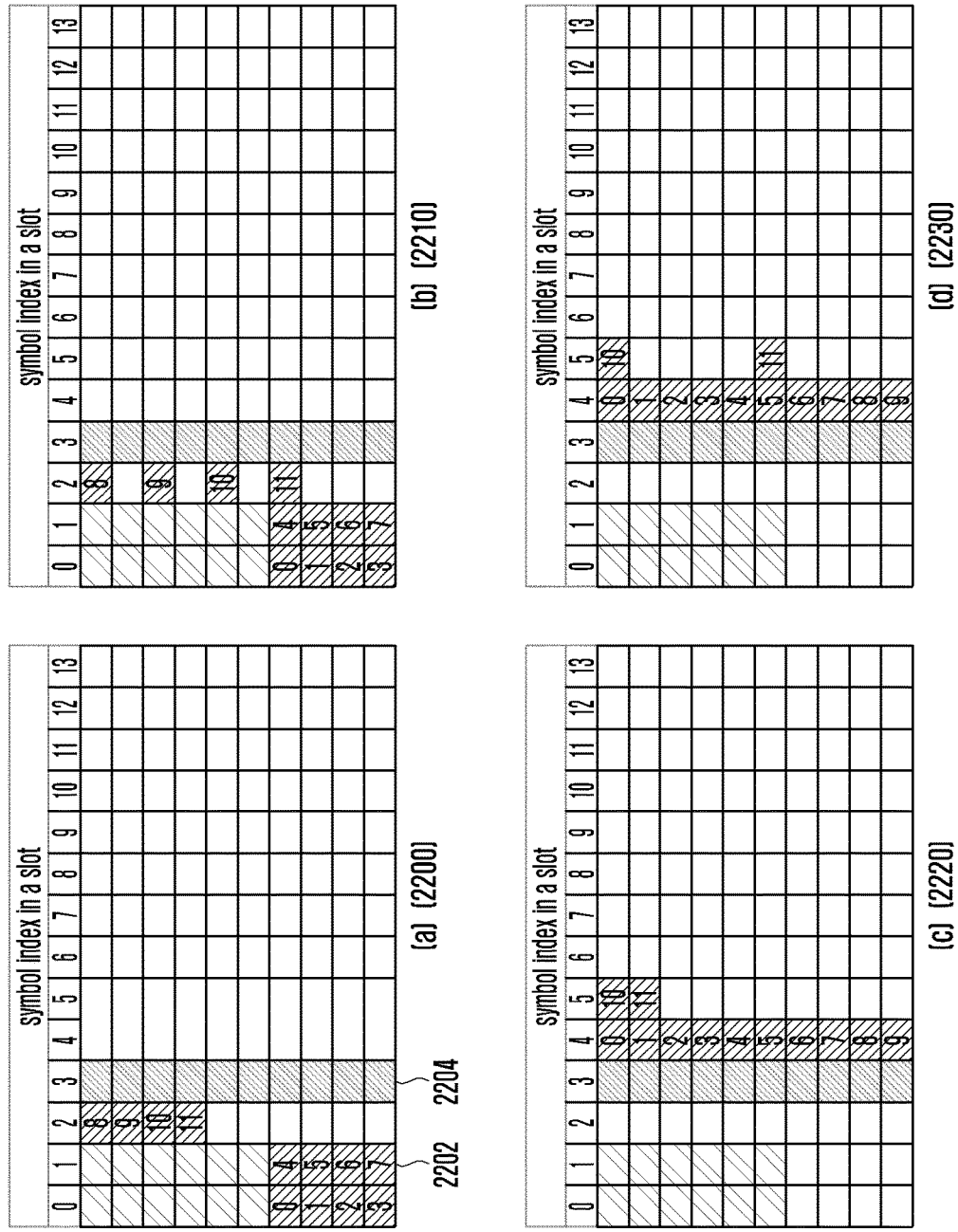
FIG. 22 is a diagram illustrating mapping of second control information according to an embodiment of the disclosure.

FIG. 22 is a diagram illustrating mapping of second control information according to an embodiment of the disclosure.

Referring to FIG. 22, an example in case that a first symbol of the DMRS 2204 for the PSSCH is located in the fourth symbol of the slot, and (a) (2200), (b) (2210), (c) (2220), and (d) (2230) may denote cases that the second control information 2202 is mapped in the same principle as the (a) (2100), (b) (2110), (c) (2120), and (d) (2130) of FIG. 21 is illustrated.

Figure 23:
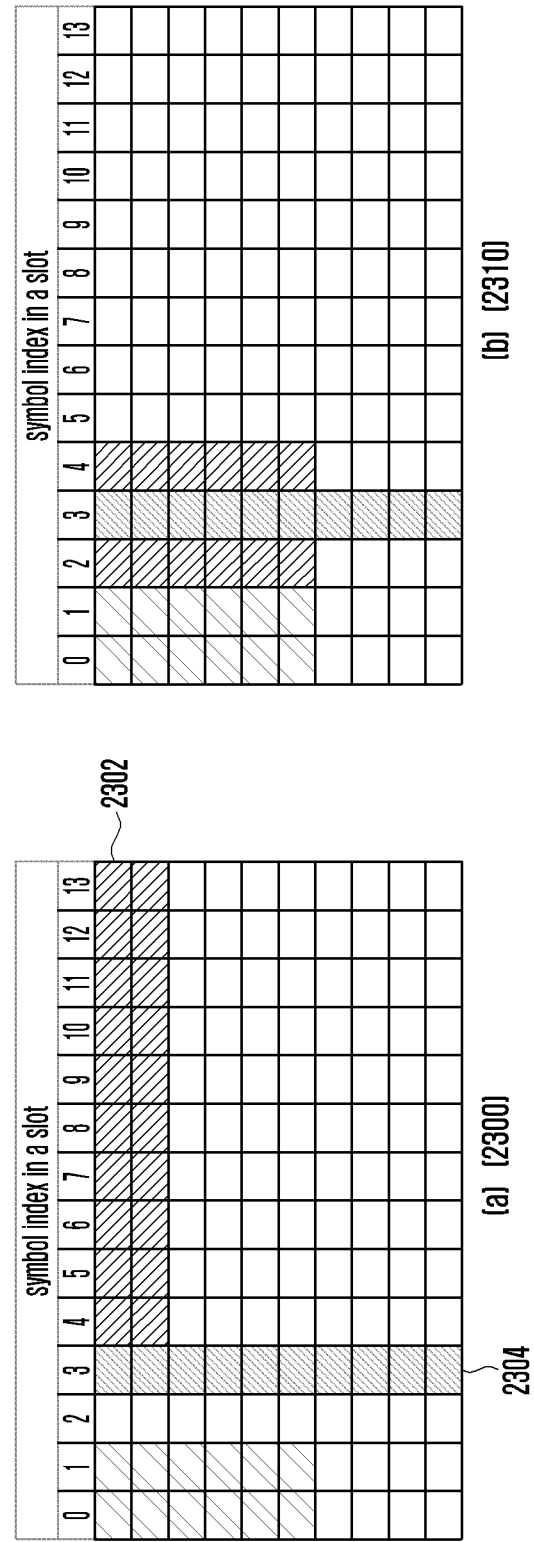
FIG. 23 is a diagram illustrating mapping of second control information according to an embodiment of the disclosure.

FIG. 23 is a diagram illustrating mapping of second control information according to an embodiment of the disclosure.

Referring to FIG. 23, (a) (2300) denotes an example in which second control information 2302 is mapped onto all symbols to which the PSSCH is mapped. The second control information 2302 may be deployed after the DMRS 2304 of the PSSCH. (b)(2310) denotes an example in which the second control information 2302 is mapped onto the front and the back of the DMRS 2304 of the PSSCH. According to the example of FIG. 23, because the second control information is deployed around the DMRS, good channel measurement performance can be secured, and thus reliability of decoding the second control information can be heightened.

If the first control information is obtained through decoding of the PSCCH, the receiving terminal can obtain information of a resource onto which the PSSCH is mapped and other scheduling information. The other scheduling information may include the MCS. Accordingly, if the first control information is obtained, the receiving terminal may grasp a PSSCH resource region and MCS information, and may decode the second control information mapped onto the PSSCH.

In case that the second control information is mapped onto the PSSCH, the number $Q_{SCI2}'$ of bits of the second control information coded using the channel coding may be calculated as described in Equation 2 below.

$$Q'_{SCI2} = \min\left\{\left\lceil\frac{(O_{SCI2} + L_{SCI2}) \cdot \beta_{offset}^{SCI2}}{R \cdot Q_m}\right\rceil, \sum_{l=0}^{N_{symbol}^{PSSCH}-1} M_{sc}^{SCI2}(l)\right\}, \quad \text{Equation 2}$$

Referring to Equation 2 above, R is a coding rate of the PSSCH, and $Q_m$ is a modulation order of the PSSCH, and R and $Q_m$ may be obtained from the MCS information included in the first control information for scheduling the PSSCH. $\beta_{offset}^{SCI2}$ is a parameter for adjusting the number of coded bits of the second control information, and may be determined based on at least one of resource pool configuration, PC5-RRC configuration, or a bit field of the first control information. As described above, $O_{SCI2}$ is the number of bits of the second control information, and $L_{SCI2}$ is the number of CRC bits added to the second control information before the channel coding.

(2-1)-th Embodiment

The (2-1)-th embodiment provides a method and an apparatus for mapping second control information onto a resource. In an embodiment of the disclosure, it is exemplarily described that the second control information is mapped onto the PSSCH to be transmitted, and such mapping may be a method that is similar to the method in which uplink control information (UCI) is mapped onto the PUSCH to be transmitted in an uplink of an NR system in the related art.

This embodiment may provide an example in which the second control information is mapped onto an available resource element (RE) if the corresponding RE exists in a symbol onto which the DMRS is mapped in the second embodiment as described above.

Figure 24:
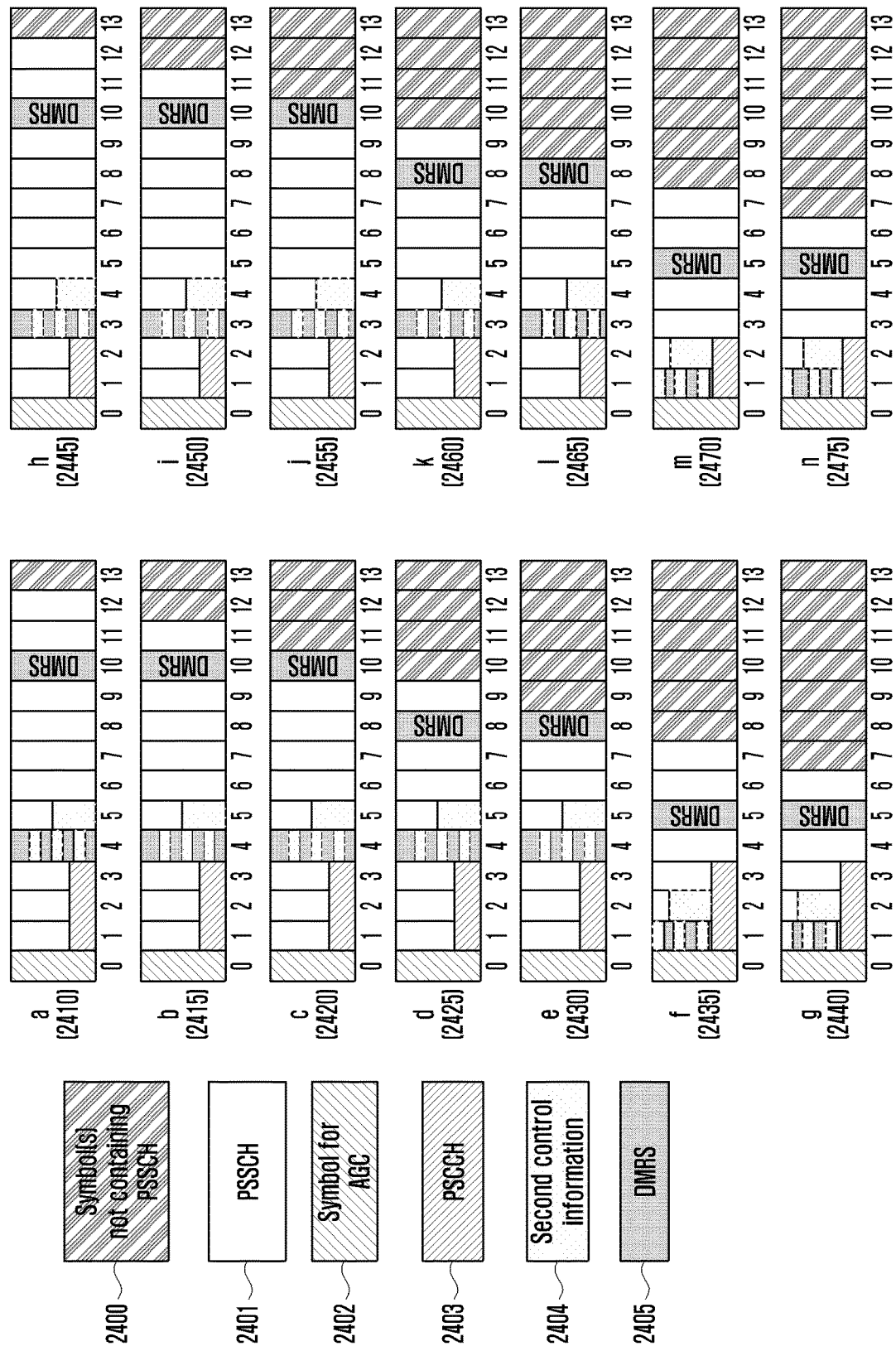
FIG. 24 is a diagram illustrating an operation where second control information starts to be mapped onto a first DMRS symbol among DMRSs for a PSSCH of a sidelink slot according to an embodiment of the disclosure.

FIG. 24 is a diagram illustrating an operation where second control information starts to be mapped onto a first DMRS symbol among DMRSs for a PSSCH of a sidelink slot according to an embodiment of the disclosure. Of course, if there is no remaining RE excluding the DMRS in the DMRS symbol, the second control information may start to be mapped onto the next symbol.

Referring to FIG. 24, each example corresponds to a case that the second control information 2404 is mapped in accordance with the length of the PSSCH symbol 2401. Further, the first symbol in one slot may be used for an automatic gain control (AGC) (2402). The symbol after the PSSCH symbol 2401 may be called a symbol 2400 that does not include the PSSCH. Further, at least one of the second to fourth symbols may be used for the PSCCH transmission (2403).

In case of a (2410), b(2415), c(2420), d(2425), and e(2430), the DMRS 2405 for the PSSCH may be located on the fifth and eleventh symbols, and in case of h(2445), i(2450), j(2455), k(2460), and l(2465), the DMRS 2405 may be located on the fourth and eleventh symbols. In case of f(2435), g(2440), m(2470), and n(2475), the DMRS 2405 may be located on the second and sixth symbols. According to an example of FIG. 26, the second control information 2404 may be mapped onto the DMRS symbol 2405 for the first PSSCH and a symbol next to the DMRS symbol 2405 for the first PSSCH.

Figure 25:
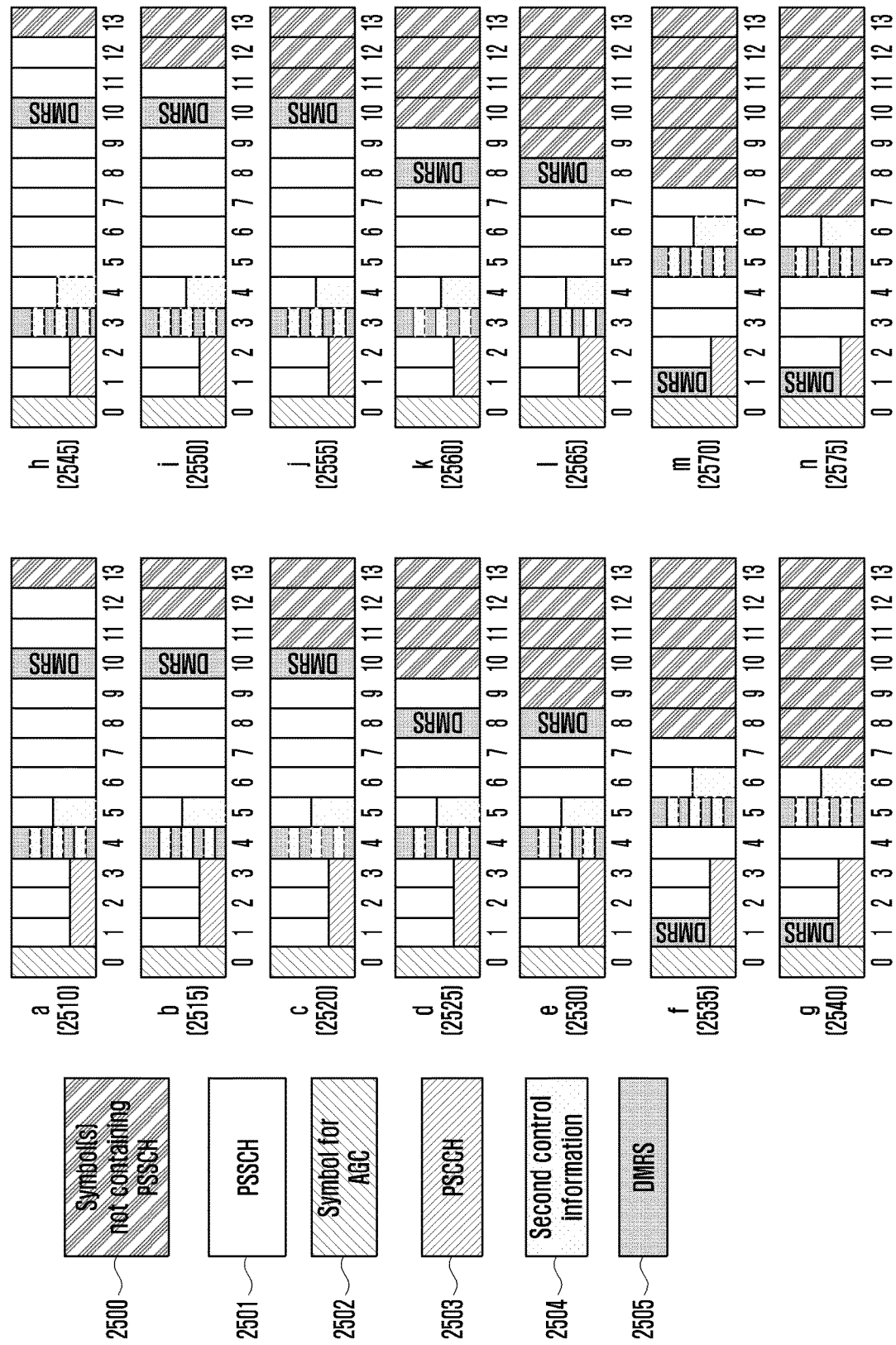
FIG. 25 is a diagram illustrating an operation where second control information starts to be mapped onto a first DMRS symbol, which is transmitted after a PSCCH that is a control channel, among DMRSs for a PSSCH of a sidelink slot according to an embodiment of the disclosure.

FIG. 25 is a diagram illustrating an operation where second control information starts to be mapped onto a first DMRS symbol, which is transmitted after a PSCCH that is a control channel, among DMRSs for a PSSCH of a sidelink slot according to an embodiment of the disclosure.

Referring to FIG. 25, each example corresponds to a case that the second control information 2504 is mapped in accordance with the length of the PSSCH symbol 2501. Further, the first symbol in one slot may be used for an AGC (2502). The symbol after the PSSCH symbol 2501 may be called a symbol 2500 that does not include the PSSCH. Further, at least one of the second to fourth symbols may be used for the PSCCH transmission (2503).

In case of a (2510), b(2515), c(2520), d(2525), and e(2530), the DMRS 2505 for the PSSCH may be located on the fifth and eleventh symbols, and in case of h(2545), i(2550), j(2555), k(2560), and l(2565), the DMRS 2405 may be located on the fourth and eleventh symbols. In case of f(2535), g(2540), m(2570), and n(2575), the DMRS 2505 may be located on the second and sixth symbols. According to an example of FIG. 26, in case that the DMRS symbol 2505 for the first PSSCH is located on the fifth symbol (i.e., in case of a (2510), b(2515), c(2520), d(2525), e(2530), h(2545), i(2550), j(2555), k(2560), and l(2570)), the second control information 2504 may be mapped onto a symbol next to the DMRS symbol 2505 for the first PSSCH. In case that the DMRS symbol 2505 for the first PSSCH is located on the second symbol, and the PSCCH 2501 is located on the second to third symbols or the fourth symbol (i.e., in case of f(2535), g(2540), m(2570), and n(2575)), the second control information may be mapped onto the DMRS symbol 2505 for the second PSSCH, which is the first DMRS symbol being transmitted after the PSCCH, and the next symbol.

Figure 26:
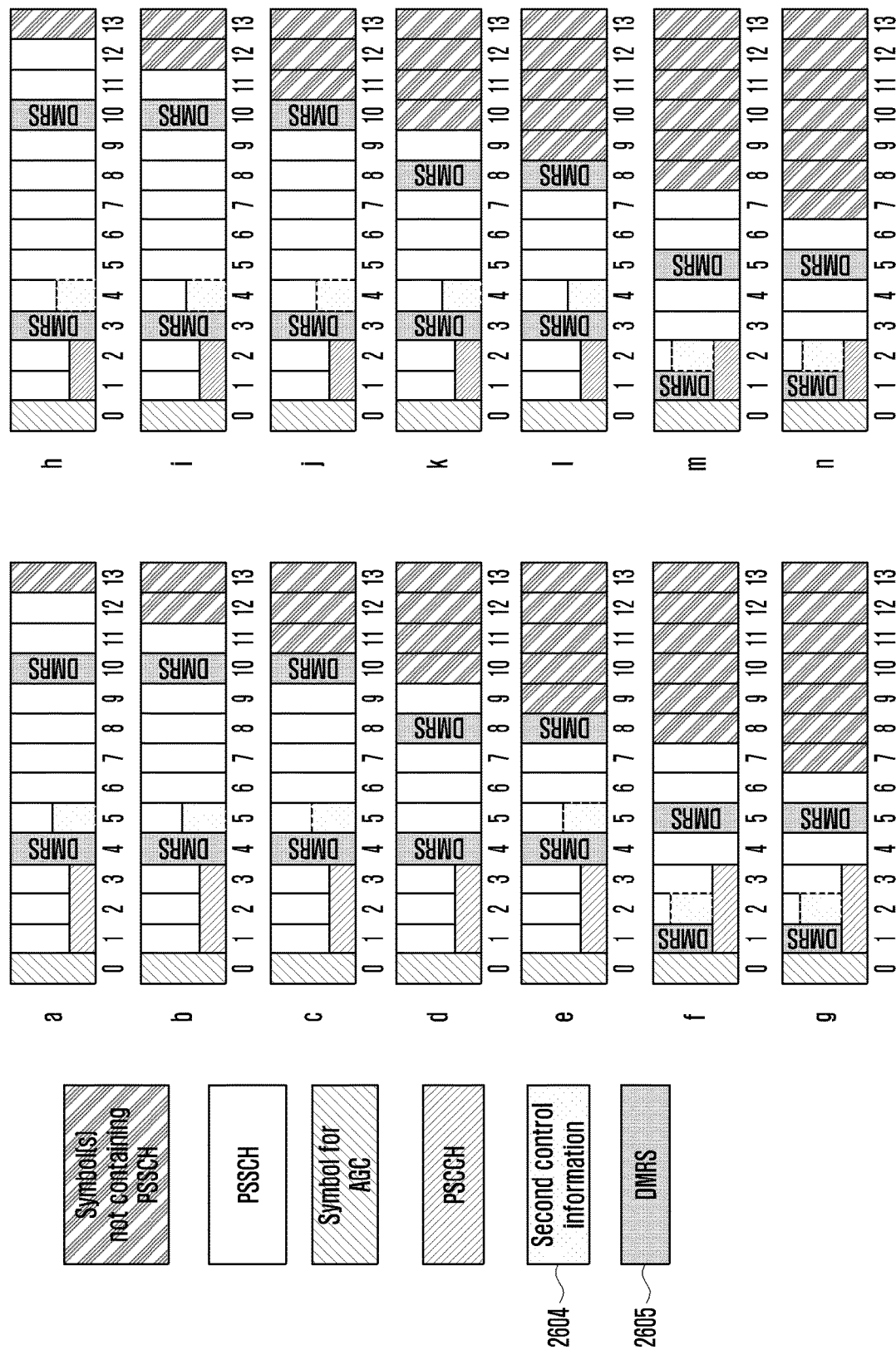
FIG. 26 is a diagram illustrating an operation where second control information starts to be mapped onto a first DMRS symbol, which is transmitted after a PSCCH that is a control channel, among DMRSs for a PSSCH of a sidelink slot according to an embodiment of the disclosure.
Figure 27:
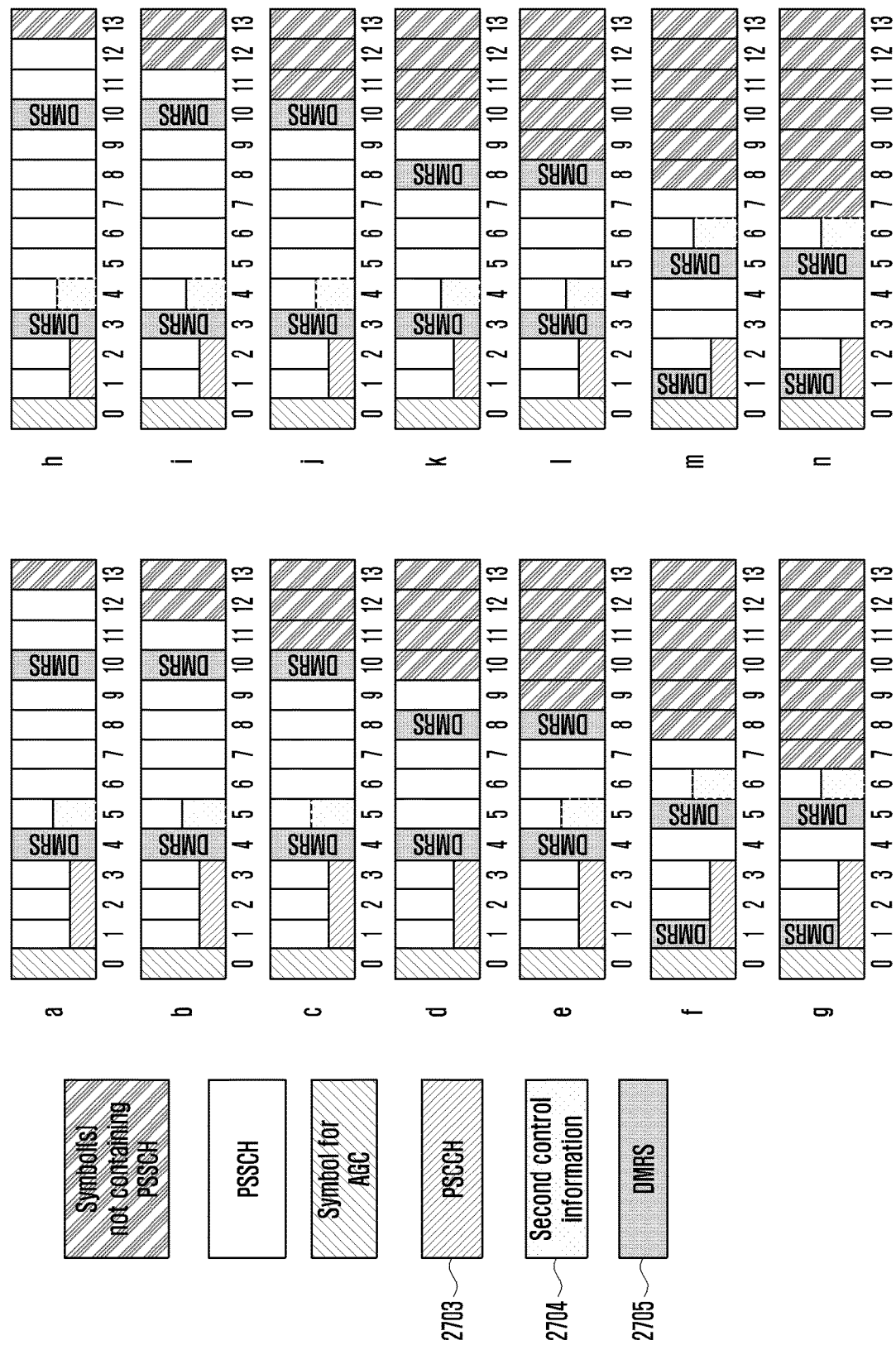
FIG. 27 is a diagram illustrating an operation where which second control information starts to be mapped onto a first DMRS symbol, which is transmitted after a PSCCH that is a control channel, among DMRSs for a PSSCH of a sidelink slot according to an embodiment of the disclosure.

Of course, if there is no remaining RE excluding the DMRS in the DMRS symbol, the second control information may start to be mapped onto the next symbol as shown in FIGS. 26 and 27. FIG. 26 is a diagram illustrating another example in which second control information starts to be mapped onto a first DMRS symbol among DMRSs for a PSSCH of a sidelink slot according to an embodiment of the disclosure.

Referring to FIG. 26, it is exemplified that there is no remaining RE in the DMRS symbol 2605, and thus the second control information 2604 is mapped onto the symbol next to the DMRS symbol 2605 for the first PSSCH.

FIG. 27 is a diagram illustrating an operation where second control information starts to be mapped onto a first DMRS symbol, which is transmitted after a PSCCH that is a control channel, among DMRSs for a PSSCH of a sidelink slot according to an embodiment of the disclosure.

Referring to FIG. 27, it is exemplified that there is no remaining RE in the DMRS symbol 2705, and thus the second control information 2704 is mapped onto the symbol next to the DMRS symbol 2705 for the first PSSCH 2703.

Figure 28:
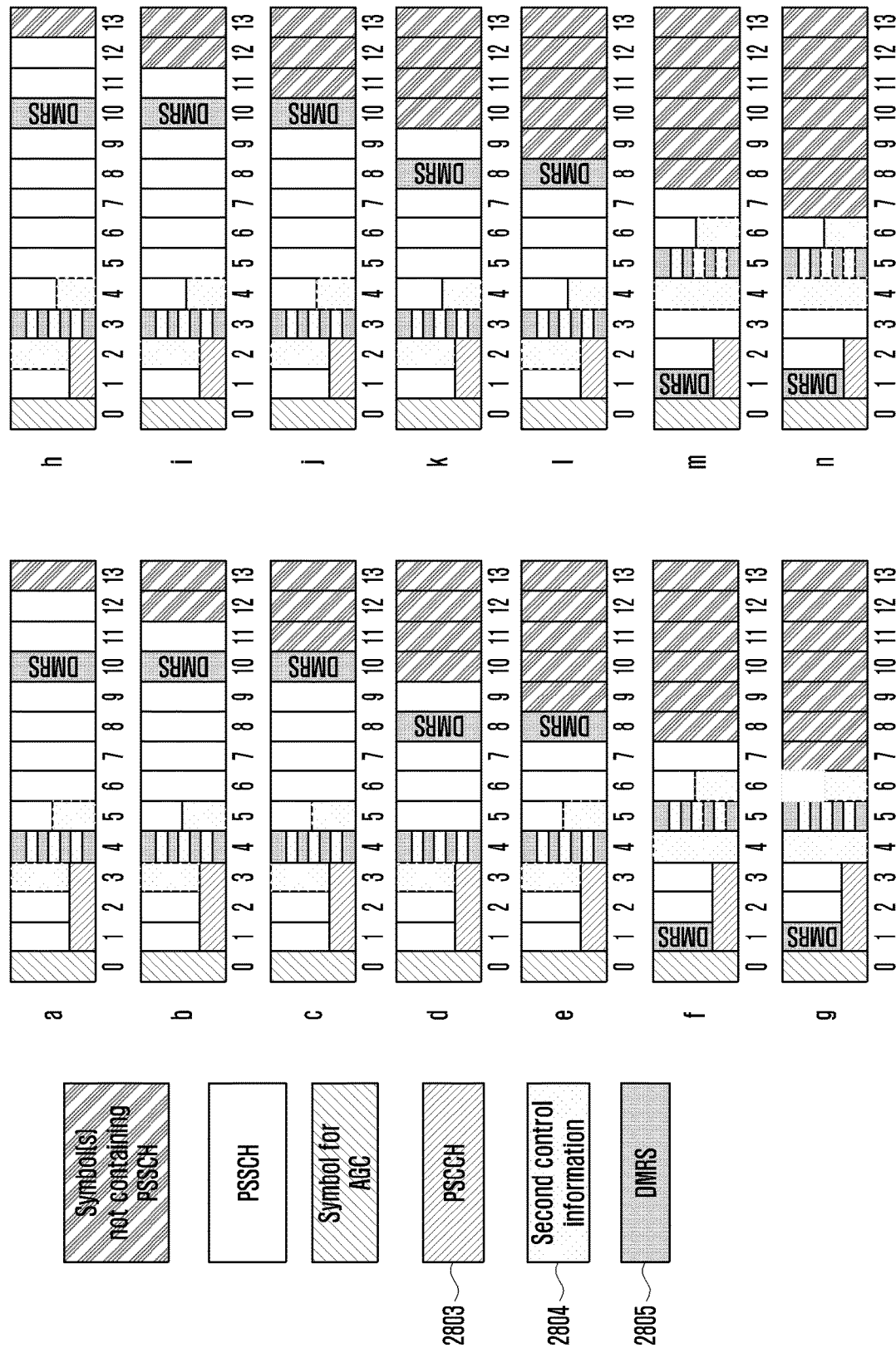
FIG. 28 is a diagram illustrating an operation where second control information starts to be mapped onto a symbol just before a first DMRS symbol, which is transmitted after a PSCCH that is a control channel, among DMRSs for a PSSCH of a sidelink slot according to an embodiment of the disclosure.

FIG. 28 is a diagram illustrating an operation where second control information starts to be mapped onto a symbol just before a first DMRS symbol, which is transmitted after a PSCCH that is a control channel, among DMRSs for a PSSCH of a sidelink slot according to an embodiment of the disclosure.

Referring to FIG. 28, the second control information 2804 may be mapped onto a symbol just before the DMRS symbol 2805 for the first PSSCH after the PSCCH 2803, the DMRS symbol 2805 for the first PSSCH, and the next symbol.

Here, the second control information may start to be mapped onto the lowest subcarrier of the lowest PRB or to be mapped onto the highest subcarrier in a frequency domain among PSSCH allocation resources.

Further, the second control information may be mapped onto one or more symbols, and in case of FIG. 28, the second control information may be mapped onto the symbol just before the first DMRS symbol transmitted after the PSCCH among DMRSs for the PSSCH and/or the first DMRS symbol transmitted after the PSCCH.

Third Embodiment

The third embodiment provides a method and an apparatus for determining the quantity of the number of coded bits onto which the second control information is mapped.

Determination of the mapped resource of the second control information and the quantity of the mapping resources or the number of bits for coding the second control information may be based on the resource pool configuration, PC5-RRC configuration, or the first control information. As an example, in case that the second control information is mapped onto the PSSCH in a similar manner to the example provided in the second embodiment of the disclosure, the number $Q_{SCI2}'$ of coded bits of the second control information coded using the channel coding may be calculated as described in Equation 3 below.

$$Q_{SCI2}' = \min\left\{ \left\lceil \frac{(O_{SCI2} + L_{SCI2}) \cdot \beta_{offset}^{SCI2}}{R \cdot Q_m} \right\rceil, \alpha \sum_{l=0}^{N_{symbol}^{PSSCH}-1} M_{SC}^{SCI2}(l) \right\}, \quad \text{Equation 3}$$

Referring to Equation 3 above, R is a coding rate of the PSSCH, and $Q_m$ is a modulation order of the PSSCH, and R and $Q_m$ may be obtained from the MCS information included in the first control information for scheduling the PSSCH. $\beta_{offset}^{SCI2}$ is a parameter for adjusting the number of coded bits of the second control information, and may be determined based on at least one of resource pool configuration, PC5-RRC configuration, or a bit field of the first control information. As described above, $O_{SCI2}$ is the number of bits of the second control information, and $L_{SCI2}$ is the number of CRC bits added to the second control information before the channel coding. Further, α may be a parameter for determining the mapping quantity of the second control information. In this case, the α value may be transferred from the first control information, or may be a predetermined value.

As an example, if the α value is indicated by the first control information, the receiving terminal may obtain the first control information by decoding the PSCCH, find out the α value, and decode the second control information based on the α value. Thereafter, the receiving terminal may be aware of the resource onto which the PSSCH is mapped and the scheduling parameter in accordance with the bit field values included in the first control information and the second control information, and may decode the PSSCH based on such information.

Hereinafter, provided are a method for calculating the number of coded bits after the channel coding is applied to CSI feedback information and a method for mapping the coded bits onto the PSSCH resource in case that the CSI feedback is mapped onto and transmitted on the PSSCH resource after the second control information is mapped onto the PSSCH region when a method for transmission of control information in 2 stages. Hereinafter, two cases will be described: a first case that only the CSI feedback is mapped onto the PSSCH without a sidelink shared channel (SL-SCH) and a second case that the CSI feedback is mapped onto the PSSCH together with the SL-SCH. As described above, the SL-SCH may mean a MAC PDU or a transmission block coming down from a higher layer.

A case that the SL-SCH is not included in the PSSCH: The number $Q_{SL-CSI}'$ of bits into which the sidelink CSI is coded may be calculated as described in Equation 4 below.

$$Q_{SL-CSI}' = (\Sigma_{l=0}^{N_{symbol}^{PSSCH}-1} M_{sc}^{SL-CSI}(l)) - Q_{SCI2}' \quad \text{Equation 4}$$

Referring to Equation 4 above, $M_{sc}^{SL-CSI}(l)$ is the number of resource elements (REs) used to map the sidelink CSI feedback information on the PSSCH in the l-th OFDM symbol, and $N_{symbol}^{PSSCH}$ is the number of symbols used for the PSSCH including DMRS symbols.

A case that the SL-SCH is included in the PSSCH: The number $Q_{SL-CSI}'$ of bits into which the sidelink CSI is coded may be calculated as described in Equation 5 below.

$$Q_{SL-CSI}' = \min\left\{ \left\lceil \frac{(O_{SL-CSI} + L_{SL-CSI}) \cdot \beta_{offset}^{PSSCH}}{R \cdot Q_m} \right\rceil, \left( \sum_{l=0}^{N_{symbol}^{PSSCH}-1} M_{sc}^{SL-CSI}(l) \right) - Q_{SCI2}' \right\} \quad \text{Equation 5}$$

Referring to Equation 5 above, R is a coding rate of the PSSCH, and $Q_m$ is a modulation order, and R and $Q_m$ may be obtained from the MCS information included in the SCI for scheduling the PSSCH. $\beta_{offset}^{PSSCH}$ is a parameter for adjusting the number of coded bits of the sidelink CSI information, and may be determined based on at least one of resource pool configuration, PC5-RRC configuration, or a bit field of the SCI. As described above, $O_{SL-CSI}$ is the number of bits of the sidelink CSI feedback information, and $L_{SL-CSI}$ is the number of CRC bits added to the second control information before the channel coding.

For example, the above-described methods may mean that the second control information is mapped onto the PSSCH, and the sidelink CSI feedback information is mapped onto the remaining resources.

(3-1)-th Embodiment

The (3-1)-th embodiment provides another example of a method and an apparatus for determining the quantity of the number of mapped coded bits in mapping the second control information.

Determination of the mapped resource of the second control information and the quantity of the mapping resources or the number of bits for coding the second control information may be based on the resource pool configuration, PC5-RRC configuration, or the first control information. As an example, in case that the second control information is mapped onto the PSSCH in a similar manner to the example provided in the second embodiment of the disclosure, the number $Q_{SCI2}'$ of coded bits or symbols of the second control information coded using the channel coding may be calculated as described in Equation 6 below.

$$Q'_{SCI2} = \min\left\{\left\lceil\frac{(O_{SCI2} + L_{SCI2}) \cdot \beta_{offset}^{SCI2}}{R \cdot Q_m}\right\rceil, \alpha \sum_{l=0}^{N_{symbol}^{PSSCH}-1} M_{sc}^{SCI2}(l)\right\}$$ Equation 6

Equation 6 may be able to be replaced and applied by the following Equation 7.

$$Q'_{SCI2} = \min\left\{\left\lceil\frac{(O_{SCI2} + L_{SCI2}) \cdot \beta_{offset}^{SCI2} \cdot \sum_{l=0}^{N_{symbol}^{PSSCH}-1} M_{SC}^{SCI2}(l)}{\sum_{r=0}^{C_{SL-SCH}-1} K_r}\right\rceil,$$

$$\alpha \sum_{l=0}^{N_{symbol}^{PSSCH}-1} M_{sc}^{SCI2}(l)\right\},$$ Equation 7

Referring to Equation 7, $K_r$ may be the size of the r-th code block of a TB included in the SL-SCH, that is, PSSCH, and $K_r$ may include or may be applied not to include the length of the CRC.

As described above, $C_{SL-SCH}$ may be the number of code blocks included in the TB included in the SL-SCH, that is, PSSCH. Further, $\Sigma_{r=0}^{C_{SL-SCH}-1} K_r$ may be the size of the TB, that is, TBS, that is included in the SL-SCH, that is, PSSCH. That is, $\Sigma_{r=0}^{C_{SL-SCH}-1} K_r$ may be replaced and applied by the size of the TB, that is, TBS, that is included in the SL-SCH, that is, PSSCH.

As described above, R is a coding rate of the PSSCH, and $Q_m$ is a modulation order, and R and $Q_m$ may be obtained from the MCS information included in the first control information for scheduling the PSSCH. $\beta_{offset}^{SCI2}$ is a parameter for adjusting the number of coded bits of the second control information, and may be determined based on at least one of resource pool configuration, PC5-RRC configuration, or a bit field of the first control information. As an example, $\beta_{offset}^{SCI2}$ may be a value indicated by the first control information among values configured in the corresponding resource pool, and the size of the bit field for indicating $\beta_{offset}^{SCI2}$ in the first control information may be determined in accordance with the number of values configured in the resource pool. For example, if N values are configured for $\beta_{offset}^{SCI2}$ in the resource pool, the size of the bit field may be, for example, a function of N, such as $\log_2\lceil N \rceil$. As described above, $O_{SCI2}$ is the number of bits of the second control information, and $L_{SCI2}$ is the number of CRC bits added to the second control information before the channel coding. As described above, a may be a parameter to determine the mapping quantity of the second control information. As described above, the α value may be transferred from the first control information, or may be a predetermined value in the corresponding resource pool.

As an example, if the $\beta_{offset}^{SCI2}$ value is indicated by the first control information, the receiving terminal may obtain the first control information by decoding the PSCCH, find out the $\beta_{offset}^{SCI2}$ value, and decode the second control information based on the value. Thereafter, the receiving terminal may be aware of the resource onto which the PSSCH is mapped and the scheduling parameter in accordance with the bit field values included in the first control information and the second control information, and based on the information, the receiving terminal may perform decoding of the PSSCH.

As described above, $N_{symbol}^{PSSCH}$ may be the number of symbols allocated to the corresponding PSSCH, and may also be determined in the following method.

Figure 29:
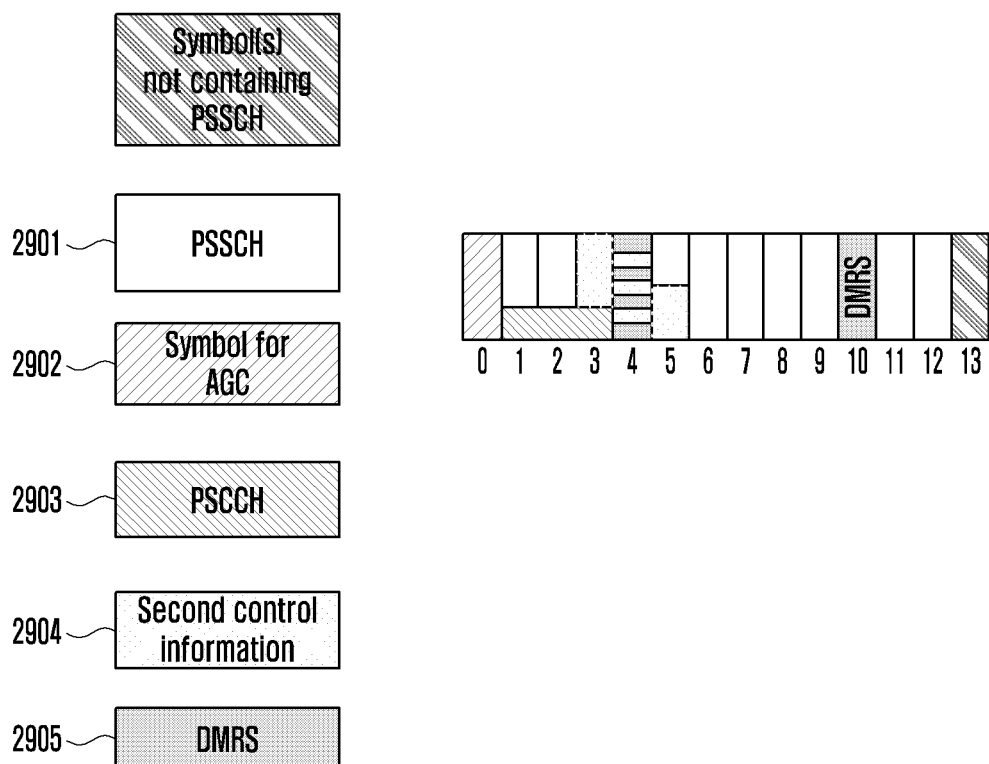
FIG. 29 is a diagram illustrating a PSSCH being mapped onto a sidelink slot according to an embodiment of the disclosure.
Figure 30:
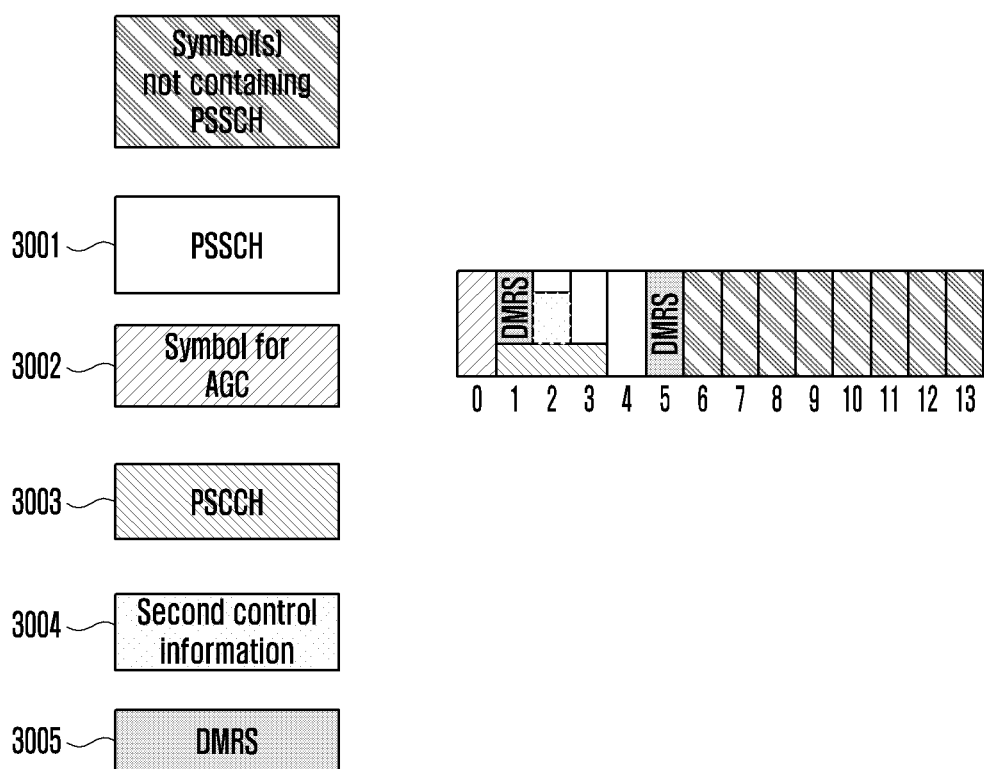
FIG. 30 is a diagram illustrating a PSSCH being mapped onto a sidelink slot according to an embodiment of the disclosure.

FIG. 29 is a diagram illustrating an operation where a PSSCH and second control information are allocated according to an embodiment of the disclosure. FIG. 30 is a diagram illustrating an operation where a PSSCH and second information are allocated according to an embodiment of the disclosure.

Referring to FIG. 29, the first symbol is used for an AGC (2903), a DMRS 2905 for the PSSCH is located, for example, in the fifth and eleventh symbols, a PSCCH 2903 is located in the second to fourth symbols, and the second control information 2904 is located in the fourth to sixth symbols. The PSSCH 2901 is located in the second to thirteenth symbols. With reference to FIG. 30, the first symbol is used for the AGC (3002), the DMRS 3005 for the PSSCH is located, for example, in the second and sixth symbols, the PSCCH 3003 is located in the second to fourth symbols, and the second control information 3004 is located in the third symbol. The PSSCH 3001 is located in the third to fifth symbols.

Method 1: $N_{symbol}^{PSSCH}$ means the number of symbols that do not overlap the PSCCH among symbols allocated to the corresponding PSSCH excluding the symbol for the AGC 2902, and may selectively include a DMRS symbol. For example, in an example of FIG. 29, $N_{symbol}^{PSSCH}$ is the number of symbols from the fourth symbol to the 12$^{th}$ symbol, and thus $N_{symbol}^{PSSCH}$ becomes 9.

Referring to FIG. 30, $N_{symbol}^{PSSCH}$ is the number of symbols from the fourth symbol to the sixth symbol, and thus $N_{symbol}^{PSSCH}$ becomes 3.

Method 2: $N_{symbol}^{PSSCH}$ means the first symbol of the DMRS 3005 for the PSSCH 3001 and the number of symbols allocated to the PSSCH 3001 thereafter among symbols allocated to the corresponding PSSCH 3001 excluding the AGC symbol 3002, and may selectively include a DMRS symbol 3005. For example, in an example of FIG. 29, $N_{symbol}^{PSSCH}$ is the number of symbols from the fourth symbol to the 12$^{th}$ symbol, and thus $N_{symbol}^{PSSCH}$ becomes 9. In an example of FIG. 30, $N_{symbol}^{PSSCH}$ is the number of symbols from the first symbol to the sixth symbol, and thus $N_{symbol}^{PSSCH}$ becomes 6.

Method 3: $N_{symbol}^{PSSCH}$ means the number of symbols that do not overlap the PSCCH 3003 among symbols allocated to the corresponding PSSCH 3001 excluding the symbol for the AGC 3002, and may selectively exclude the DMRS symbol 3005. For example, in an example of FIG. 29, $N_{symbol}^{PSSCH}$ is the number of symbols from the fourth symbol to the 12$^{th}$ symbol excluding the fourth and tenth symbols, and thus $N_{symbol}^{PSSCH}$ becomes 7. In an example of FIG. 30, $N_{symbol}^{PSSCH}$ is the number of symbols from the fourth symbol to the sixth symbol excluding the fifth symbol, and thus $N_{symbol}^{PSSCH}$ becomes 2.

In the above-described Equation, $M_{sc}^{SCI2}(l)$ is the number of REs onto which the second control information 3004 can be mapped, and in the process of acquiring the number of REs, regions onto which at least one of the PSCCH, DMRS, or PT-RS is mapped may be excluded (from the number of REs).

(3-2)-th Embodiment

The (3-2)-th embodiment provides another example of a method and an apparatus for determining the quantity of the number of mapped coded bits in mapping the second control information.

Determination of the mapped resource of the second control information and the quantity of the mapping resources or the number of bits for coding the second control information may be based on the resource pool configuration, PC5-RRC configuration, or the first control information. As an example, in case that the second control information is mapped onto the PSSCH in a similar manner to the example provided in the second embodiment of the disclosure, the number $Q_{SCI2}'$ of coded bits or symbols of the second control information coded using the channel coding may be calculated as in Equation 8 below.

$$Q'_{SCI2} = \min\left\{\left\lceil\frac{(O_{SCI2} + L_{SCI2}) \cdot \beta_{offset}^{SCI2}}{R \cdot Q_m}\right\rceil, \alpha \sum_{l=0}^{N_{symbol}^{PSSCH}-1} M_{sc}^{SCI2}(l)\right\} - \gamma \quad \text{Equation 8}$$

The above Equation 8 may be able to be replaced and applied by the following Equation 9. Here, γ is a variable that is determined, so that the second control information is not mapped onto a RB if there is any RE (i.e., RE onto which the second control information is not mapped) remaining in the corresponding RB of the (OFDM or SC-FDMA) symbol onto which the last symbol is mapped among (modulation) symbols created (modulated) through coding of the second control information when the second control information is mapped.

$$Q'_{SCI2} = \min\left\{\left\lceil\frac{(O_{SCI2} + L_{SCI2}) \cdot \beta_{offset}^{SCI2} \cdot \sum_{l=0}^{N_{symbol}^{PSSCH}-1} M_{sc}^{SCI2}(l)}{\sum_{r=0}^{C_{SL-SCH}-1} K_r}\right\rceil, \right.$$

$$\left. \alpha \sum_{l=0}^{N_{symbol}^{PSSCH}-1} M_{SC}^{SCI2}(l)\right\} - \gamma \quad \text{Equation 9}$$

Referring to Equation 9, γ is a variable that is determined, so that the second control information is not mapped onto a RB if there is any RE (i.e., RE onto which the second control information is not mapped) remaining in the corresponding RB of the (OFDM or SC-FDMA) symbol onto which the last symbol is mapped among (modulation) symbols created (modulated) through coding of the second control information when the second control information is mapped.

As described above, $K_r$ may be the size of the r-th code block of a TB included in the SL-SCH, that is, PSSCH, and $K_r$ may include or may be applied not to include the length of the CRC. As described above, $C_{SL-SCH}$ may be the number of code blocks included in the TB included in the SL-SCH, that is, PSSCH. Further, $\Sigma_{r=0}^{C_{SL-SCH}-1} K_r$ may be the size of the TB, that is, TBS, that is included in the SL-SCH, that is, PSSCH. For example, $\Sigma_{r=0}^{C_{SL-SCH}-1} K_r$ may be replaced and applied by the size of the TB, that is, TBS, that is included in the SL-SCH, that is, PSSCH.

Figure 31:
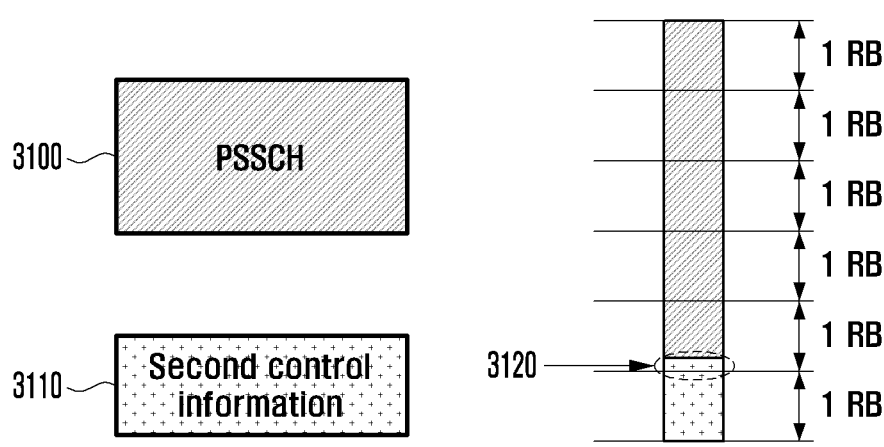
FIG. 31 is a diagram illustrating second control information being mapped onto a part of a resource block (RB) according to an embodiment of the disclosure.

FIG. 31 is a diagram illustrating second control information being mapped onto a part of a resource block (RB) according to an embodiment of the disclosure.

Referring to FIG. 31, Equation 8 and Equation 9 as described above may be equations for avoiding a mapped part, such as "3120" so that the second control information 3110 is not mapped onto only a part of the RB (i.e., the PSSCH 3100 in one RB and the second control information 3110 are mapped onto each other) when the second control information 3110 is mapped in the unit of the RB as in the (3-1)-th embodiment. FIG. 31 may be a diagram illustrating the last symbol onto which the second control information is mapped when the second control information is mapped in the method provided in the (3-1)-th embodiment.

As described above, R is a coding rate of the PSSCH, and $Q_m$ is a modulation order, and R and $Q_m$ may be obtained from the MCS information included in the first control information for scheduling the PSSCH. $\beta_{offset}^{SCI2}$ is a parameter for adjusting the number of coded bits of the second control information, and may be determined based on at least one of resource pool configuration, PC5-RRC configuration, or a bit field of the first control information. As an example, $\beta_{offset}^{SCI2}$ may be a value indicated by the first control information among values configured in the corresponding resource pool, and the size of the bit field for indicating $\beta_{offset}^{SCI2}$ in the first control information may be determined in accordance with the number of values configured in the resource pool. For example, if N values are configured for $\beta_{offset}^{SCI2}$ in the resource pool, the size of the bit field may be, for example, a function of N, such as $\log_2\lceil N \rceil$. As described above, $O_{SCI2}$ is the number of bits of the second control information, and $L_{SCI2}$ is the number of CRC bits added to the second control information before the channel coding. As described above, α may be a parameter to determine the mapping quantity of the second control information. As described above, the α value may be transferred from the first control information, or may be a predetermined value in the corresponding resource pool.

As an example, if the $\beta_{offset}^{SCI2}$ value is indicated by the first control information, the receiving terminal may obtain the first control information by decoding the PSCCH, find out the $\beta_{offset}^{SCI2}$ value, and decode the second control information based on the value. Thereafter, the receiving terminal may be aware of the resource onto which the PSSCH is mapped and the scheduling parameter in accordance with the bit field values included in the first control information and the second control information, and based on the information, the receiving terminal may perform decoding of the PSSCH.

Here, $N_{symbol}^{PSSCH}$ may be the number of symbols allocated to the corresponding PSSCH, and may also be determined in the following method.

Method 1: $N_{symbol}^{PSSCH}$ means the number of symbols that do not overlap the PSCCH among symbols allocated to the corresponding PSSCH excluding the symbol for the AGC, and may selectively include a DMRS symbol. For example, in an example of FIG. 29, $N_{symbol}^{PSSCH}$ is the number of symbols from the fourth symbol to the 12$^{th}$ symbol, and thus $N_{symbol}^{PSSCH}$ becomes 9. In an example of FIG. 30, $N_{symbol}^{PSSCH}$ is the number of symbols from the fourth symbol to the sixth symbol, and thus $N_{symbol}^{PSSCH}$ becomes 3.

Method 2: $N_{symbol}^{PSSCH}$ means the first symbol of the DMRS for the PSSCH and the number of symbols allocated to the PSSCH thereafter among symbols allocated to the corresponding PSSCH excluding the AGC symbol, and may selectively include a DMRS symbol. For example, in an example of FIG. 29, $N_{symbol}^{PSSCH}$ is the number of symbols from the fourth symbol to the 12$^{th}$ symbol, and thus, $N_{symbol}^{PSSCH}$ becomes 9. In an example of FIG. 30, $N_{symbol}^{PSSCH}$ is the number of symbols from the first symbol to the sixth symbol, and thus $N_{symbol}^{PSSCH}$ becomes 6.

Method 3: $N_{symbol}^{PSSCH}$ means the number of symbols that do not overlap the PSCCH among symbols allocated to the corresponding PSSCH excluding the symbol for the AGC, and may selectively exclude the DMRS symbol. For example, in an example of FIG. 29, $N_{symbol}^{PSSCH}$ is the number of symbols from the fourth symbol to the 12$^{th}$ symbol excluding the fourth and tenth symbols, and thus $N_{symbol}^{PSSCH}$ becomes 7. In an example of FIG. 30, $N_{symbol}^{PSSCH}$ is the number of symbols from the fourth symbol to the sixth symbol excluding the fifth symbol, and thus $N_{symbol}^{PSSCH}$ becomes 2.

In the above-described equation, $M_{sc}^{SCI2}(l)$ is the number of REs onto which the second control information can be mapped, and in the process of acquiring the number of REs, regions onto which at least one of the PSCCH, DMRS, or PT-RS is mapped may be excluded (from the number of REs).

(3-3)-th Embodiment

The (3-3)-th embodiment provides another example of a method and an apparatus for determining the quantity of the number of mapped coded bits in mapping the second control information.

Determination of the mapped resource of the second control information and the quantity of the mapping resources or the number of bits for coding the second control information is based on the resource pool configuration, PC5-RRC configuration, or the first control information. As an example, in case that the second control information is mapped onto the PSSCH in a similar manner to the example provided in the second embodiment of the disclosure, the number $Q_{SCI2}'$ of coded bits or symbols of the second control information coded using the channel coding may be calculated as in Equation 10 below.

Equation 10

$$Q_{SCI2}' = \min\left\{ \left\lceil \frac{(O_{SCI2} + L_{SCI2}) \cdot \beta_{offset}^{SCI2}}{R \cdot Q_m} \right\rceil, \alpha \sum_{l=0}^{N_{symbol}^{PSSCH}-1} M_{sc}^{SCI2}(l) \right\} + \gamma$$

Equation 10 may be able to be replaced and applied by the following Equation 11. Here, $\gamma$ is a variable that is determined, so that the second control information is mapped onto all REs remaining in a RB if there is any RE (i.e., REs onto which the second control information is not mapped) remaining in the corresponding RB of the (OFDM or SC-FDMA) symbol onto which the last symbol is mapped among symbols created (modulated) through coding of the second control information when the second control information is mapped.

Equation 11

$$Q_{SCI2}' = \min\left\{ \left\lceil \frac{(O_{SCI2} + L_{SCI2}) \cdot \beta_{offset}^{SCI2} \cdot \sum_{l=0}^{N_{symbol}^{PSSCH}-1} M_{sc}^{SCI2}(l)}{\sum_{r=0}^{C_{SL-SCH}-1} K_r} \right\rceil, \alpha \sum_{l=0}^{N_{symbol}^{PSSCH}-1} M_{sc}^{SCI2}(l) \right\} + \gamma$$

Referring to Equation 11, $\gamma$ is a variable that is determined, so that the second control information is mapped onto all remaining REs of the RB if there is any RE (i.e., REs onto which the second control information is not mapped) remaining in the corresponding RB of the (OFDM or SC-FDMA) symbol onto which the last symbol is mapped among (modulation) symbols created (modulated) through coding of the second control information when the second control information is mapped.

As described above, $K_r$ may be the size of the r-th code block of a TB included in the SL-SCH, that is, PSSCH, and $K_r$ may include or may be applied not to include the length of the CRC. Here, $C_{SL-SCH}$ may be the number of code blocks included in the TB included in the SL-SCH, that is, PSSCH. Further, $\sum_{r=0}^{C_{SL-SCH}-1} K_r$ may be the size of the TB, that is, TBS, that is included in the SL-SCH, that is, PSSCH. For example, $\sum_{r=0}^{C_{SL-SCH}-1} K_r$ may be replaced and applied by the size of the TB, that is, TBS, that is included in the SL-SCH, that is, PSSCH.

Figure 32:
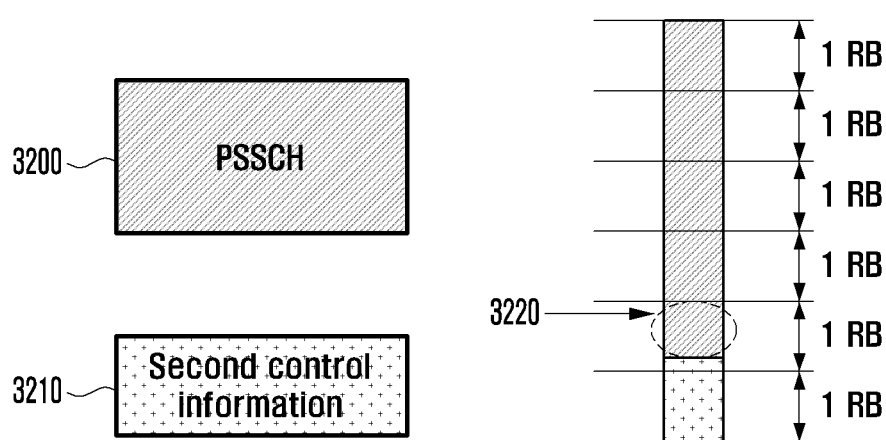
FIG. 32 is a diagram illustrating second control information being mapped onto a part of a RB according to an embodiment of the disclosure.

FIG. 32 is a diagram illustrating second control information being mapped onto a part of a RB according to an embodiment of the disclosure.

Referring to FIG. 32, Equation 10 and Equation 11 as described above may be equations so that the second control information is mapped onto all remaining REs (3220) if there are remaining REs in the RB onto which the second control information 3210 is mapped (i.e., the PSSCH 3200 in one RB and the second control information 3210 are mapped onto each other) when the second control information is mapped in the unit of the RB. FIG. 32 may be a diagram illustrating the last symbol onto which the second control information is mapped when the second control information is mapped in the method provided in the (3-1)-th embodiment.

As described above, R is a coding rate of the PSSCH, and $Q_m$ is a modulation order, and R and $Q_m$ may be obtained from the MCS information included in the first control information for scheduling the PSSCH. $\beta_{offset}^{SCI2}$ is a parameter for adjusting the number of coded bits of the second control information, and may be determined based on at least one of resource pool configuration, PC5-RRC configuration, or a bit field of the first control information. As an example, $\beta_{offset}^{SCI2}$ may be a value indicated by the first control information among values configured in the corresponding resource pool, and the size of the bit field for indicating $\beta_{offset}^{SCI2}$ in the first control information may be determined in accordance with the number of values configured in the resource pool. For example, if N values are configured for $\beta_{offset}^{SCI2}$ in the resource pool, the size of the bit field may be, for example, a function of N, such as $\log_2\lceil N \rceil$. As described above, $O_{SCI2}$ is the number of bits of the second control information, and $L_{SCI2}$ is the number of CRC bits added to the second control information before the channel coding. As described above, $\alpha$ may be a parameter to determine the mapping quantity of the second control information. As described above, the $\alpha$ value may be transferred from the first control information, or may be a predetermined value in the corresponding resource pool.

As an example, if the $\beta_{offset}^{SCI2}$ value is indicated by the first control information, the receiving terminal may obtain the first control information by decoding the PSCCH, find out the $\beta_{offset}^{SCI2}$ value, and decode the second control information based on the value. Thereafter, the receiving terminal may be aware of the resource onto which the PSSCH is mapped and the scheduling parameter in accordance with the bit field values included in the first control information and the second control information, and based on the information, the receiving terminal may perform decoding of the PSSCH.

Here, $N_{symbol}^{PSSCH}$ may be the number of symbols allocated to the corresponding PSSCH, and may also be determined in the following method.

- Method 1: $N_{symbol}^{PSSCH}$ is the number of symbols that do not overlap the PSCCH among symbols allocated to the corresponding PSSCH excluding the symbol for the AGC, and may selectively include a DMRS symbol. For example, in an example of FIG. 29, $N_{symbol}^{PSSCH}$ is the number of symbols from the fourth symbol to the 12$^{th}$ symbol, and thus $N_{symbol}^{PSSCH}$ becomes 9. In an example of FIG. 30, $N_{symbol}^{PSSCH}$ is the number of symbols from the fourth symbol to the sixth symbol, and thus $N_{symbol}^{PSSCH}$ becomes 3.
- Method 2: $N_{symbol}^{PSSCH}$ is the first symbol of the DMRS for the PSSCH and the number of symbols allocated to the PSSCH thereafter among symbols allocated to the corresponding PSSCH excluding the AGC symbol, and may selectively include the DMRS symbol. For example, in an example of FIG. 29, $N_{symbol}^{PSSCH}$ is the number of symbols from the fourth symbol to the 12$^{th}$ symbol, and thus $N_{symbol}^{PSSCH}$ becomes 9. In an example of FIG. 30, $N_{symbol}^{PSSCH}$ is the number of symbols from the first symbol to the sixth symbol, and thus $N_{symbol}^{PSSCH}$ becomes 6.
- Method 3: $N_{symbol}^{PSSCH}$ is the number of symbols that do not overlap the PSCCH among symbols allocated to the corresponding PSSCH excluding the symbol for the AGC, and may selectively exclude the DMRS symbol. For example, in an example of FIG. 29, $N_{symbol}^{PSSCH}$ is the number of symbols from the fourth symbol to the 12$^{th}$ symbol excluding the fourth and tenth symbols, and thus $N_{symbol}^{PSSCH}$ becomes 7. In an example of FIG. 30, $N_{symbol}^{PSSCH}$ is the number of symbols from the fourth symbol to the sixth symbol excluding the fifth symbol, and thus $N_{symbol}^{PSSCH}$ becomes 2.

In the above-described equation, $M_{sc}^{SCI2}(l)$ is the number of REs onto which the second control information can be mapped, and in the process of acquiring the number of REs, regions onto which at least one of the PSCCH, DMRS, or the phase tracking reference signal (PT-RS) is mapped may be excluded (from the number of REs).

(3-4)-th Embodiment

The (3-4)-th embodiment provides another example of a method and an apparatus for determining the quantity of the number of mapped coded bits in mapping the second control information.

Determination of the mapped resource of the second control information and the quantity of the mapping resources or the number of bits for coding the second control information may be based on the resource pool configuration, PC5-RRC configuration, or the first control information. As an example, in case that the second control information is mapped onto the PSSCH in a similar manner to the example provided in the second embodiment of the disclosure, the number $Q_{SCI2}'$ of coded bits or symbols of the second control information coded using the channel coding may be calculated as in Equation 12 below.

$$Q_{SCI2}' = \min\left\{\left\lceil\frac{(O_{SCI2} + L_{SCI2}) \cdot \beta_{offset}^{SCI2}}{R \cdot Q_m}\right\rceil, \alpha \sum_{l=0}^{N_{symbol}^{PSSCH}-1} M_{sc}^{SCI2}(l)\right\} + \gamma$$

Equation 12

Equation 12 may be able to be replaced and applied by the following Equation 13. Here, $\gamma$ is a variable that is determined, so that the second control information is mapped onto all remaining REs in RBs if the number of remaining REs is equal to or larger than X, and the second control information is not mapped onto the REs of the corresponding RBs if the number of remaining REs is smaller than X, in case that there is any remaining RE (i.e., RE onto which the second control information is not mapped) in the corresponding RB of the (OFDM or SC-FDMA) symbol onto which the last symbol is mapped among (modulation) symbols created (modulated) through coding of the second control information when the second control information is mapped. For example, according to circumstances, $\gamma$ may be determined as a value that is smaller than "0". As described above, "6" may be used as the X value. Further, the X value may be predetermined in accordance with the resource pool, or may be a value configured in accordance with higher layer signaling or standards.

$$Q_{SCI2}' = \min\left\{\left\lceil\frac{(O_{SCI2} + L_{SCI2}) \cdot \beta_{offset}^{SCI2} \cdot \sum_{l=0}^{N_{symbol}^{PSSCH}-1} M_{sc}^{SCI2}(l)}{\sum_{r=0}^{C_{SL-SCH}-1} K_r}\right\rceil, \alpha \sum_{l=0}^{N_{symbol}^{PSSCH}-1} M_{sc}^{SCI2}(l)\right\} + \gamma$$

Equation 13

Referring to Equation 13, $\gamma$ is a variable that is determined, so that the second control information is mapped onto all remaining REs in the RBs if the number of remaining REs is equal to or larger than X, and the second control information is not mapped onto the REs of the corresponding RBs if the number of remaining REs is smaller than X, in case that there is any remaining RE (i.e., RE onto which the second control information is not mapped) in the corresponding RB of the (OFDM or SC-FDMA) symbol onto which the last symbol is mapped among symbols created (modulated) through coding of the second control information when the second control information is mapped. For example, according to circumstances, $\gamma$ may be determined as a value that is smaller than "0". As described above, "6" may be used as the X value. Further, the X value may be predetermined in accordance with the resource pool, or may be a value configured in accordance with higher layer signaling or standards.

As described above, $K_r$ may be the size of the r-th code block of a TB included in the SL-SCH, that is, PSSCH, and $K_r$ may include or may be applied not to include the length of the CRC. Here, $C_{SL-SCH}$ may be the number of code blocks included in the TB included in the SL-SCH, that is, PSSCH. Further, $\sum_{r=0}^{C_{SL-SCH}-1} K_r$ may be the size of the TB, that is, TBS, that is included in the SL-SCH, that is, PSSCH. For example, $\sum_{r=0}^{C_{SL-SCH}-1} K_r$ may be replaced and applied by the size of the TB, that is, TBS, that is included in the SL-SCH, that is, PSSCH.

The (3-4)-th embodiment will be described based on FIG. 32. As described above, Equation 12 and Equation 13 as described above may be equations so that the second control information is mapped onto all remaining REs, such as 3220, or the second control information is not mapped onto the RB in which the remaining REs exist, if there are remaining REs in the RB onto which the second control information 3210 is mapped (i.e., the PSSCH 3100 in one RB and the second control information 3210 are mapped onto each other) when the second control information is mapped in the unit of the RB. FIG. 32 may be a diagram illustrating the last symbol onto which the second control information is mapped when the second control information is mapped in the method provided in the (3-1)-th embodiment.

As described above, R is a coding rate of the PSSCH, and $Q_m$ is a modulation order, and R and $Q_m$ may be obtained from the MCS information included in the first control information for scheduling the PSSCH. $\beta_{offset}^{SCI2}$ is a parameter for adjusting the number of coded bits of the second control information, and may be determined based on at least one of resource pool configuration, PC5-RRC configuration, or a bit field of the first control information. As an example, $\beta_{offset}^{SCI2}$ may be a value indicated by the first control information among values configured in the corresponding resource pool, and the size of the bit field for indicating $\beta_{offset}^{SCI2}$ in the first control information may be determined in accordance with the number of values configured in the resource pool. For example, if N values are configured for $\beta_{offset}^{SCI2}$ in the resource pool, the size of the bit field may be, for example, a function of N, such as $\log_2\lceil N \rceil$. As described above, $O_{SCI2}$ is the number of bits of the second control information, and $L_{SCI2}$ is the number of CRC bits added to the second control information before the channel coding. As described above, a may be a parameter to determine the mapping quantity of the second control information. As described above, the $\alpha$ value may be transferred from the first control information, or may be a predetermined value in the corresponding resource pool.

As an example, if the $\beta_{offset}^{SCI2}$ value is indicated by the first control information, the receiving terminal may obtain the first control information by decoding the PSCCH, find out the $\beta_{offset}^{SCI2}$ value, and decode the second control information based on the value. Thereafter, the receiving terminal may be aware of the resource onto which the PSSCH is mapped and the scheduling parameter in accordance with the bit field values included in the first control information and the second control information, and based on the information, the receiving terminal may perform decoding of the PSSCH.

Here, $N_{symbol}^{PSSCH}$ may be the number of symbols allocated to the corresponding PSSCH, and may also be determined in the following method.

Method 1: $N_{symbol}^{PSSCH}$ is the number of symbols that do not overlap the PSCCH among symbols allocated to the corresponding PSSCH excluding the symbol for the AGC, and may selectively include a DMRS symbol. For example, in an example of FIG. 29, $N_{symbol}^{PSSCH}$ is the number of symbols from the fourth symbol to the 12$^{th}$ symbol, and thus $N_{symbol}^{PSSCH}$ becomes 9. In an example of FIG. 30, $N_{symbol}^{PSSCH}$ is the number of symbols from the fourth symbol to the sixth symbol, and thus $N_{symbol}^{PSSCH}$ becomes 3.

Method 2: $N_{symbol}^{PSSCH}$ is the first symbol of the DMRS for the PSSCH and the number of symbols allocated to the PSSCH thereafter among symbols allocated to the corresponding PSSCH excluding the AGC symbol, and may selectively include the DMRS symbol. For example, in an example of FIG. 29, $N_{symbol}^{PSSCH}$ is the number of symbols from the fourth symbol to the 12$^{th}$ symbol, and thus $N_{symbol}^{PSSCH}$ becomes 9. In an example of FIG. 30, $N_{symbol}^{PSSCH}$ is the number of symbols from the first symbol to the sixth symbol, and thus $N_{symbol}^{PSSCH}$ becomes 6.

Method 3: $N_{symbol}^{PSSCH}$ is the number of symbols that do not overlap the PSCCH among symbols allocated to the corresponding PSSCH excluding the symbol for the AGC, and may selectively exclude the DMRS symbol. For example, in an example of FIG. 29, $N_{symbol}^{PSSCH}$ is the number of symbols from the fourth symbol to the 12$^{th}$ symbol excluding the fourth and tenth symbols, and thus $N_{symbol}^{PSSCH}$ becomes 7. In an example of FIG. 30, $N_{symbol}^{PSSCH}$ is the number of symbols from the fourth symbol to the sixth symbol excluding the fifth symbol, and thus $N_{symbol}^{PSSCH}$ becomes 2.

In the above-described equation, $M_{sc}^{SCI2}(l)$ is the number of REs onto which the second control information can be mapped, and in the process of acquiring the number of REs, regions onto which at least one of the PSCCH, DMRS, or PT-RS is mapped may be excluded (from the number of REs).

Fourth Embodiment

The fourth embodiment provides a method for mapping second control information on the assumption of the number of layers and a determining method for calculating the number of coded bits based on the number of layers.

In performing the first embodiment of the disclosure, the second embodiment of the disclosure, and the third embodiment of the disclosure as described above, the number of layers when the second control information is mapped onto a PSSCH region may be determined based on the PSSCH layer number information being provided from first control information, and as another example, the second control information may be mapped always on the assumption of one layer.

If the number of layers being used to map the second control information is determined based on the PSSCH layer number information provided from the first control information, and the number of PSSCH layers in the first control information is "2", two layers may also be used to map the second control information, and if the number of PSSCH layers in the first control information is "1", one layer may also be used to map the second control information. In this case, the $Q'_{SCI2}$ calculation method that is provided in the second embodiment or the third embodiment may be applied, or a determination method for calculating $Q'_{SCI2}$ based on the number of layers may also be applied. For example, $Q'_{SCI2}$ may be determined by the following Equation 14.

$$Q'_{SCI2} = \min\left\{\left\lceil\frac{(O_{SCI2}+L_{SCI2})\cdot\beta_{offset}^{SCI2}}{N_{layers}\cdot R\cdot Q_m}\right\rceil, \sum_{l=0}^{N_{symbol}^{PSSCH}-1} M_{sc}^{SCI2}(l)\right\} \quad \text{Equation 14}$$

or $$Q'_{SCI2} = \min\left\{\left\lceil\frac{(O_{SCI2}+L_{SCI2})\cdot\beta_{offset}^{SCI2}}{N_{layers}\cdot R\cdot Q_m}\right\rceil, \alpha\sum_{l=0}^{N_{symbol}^{PSSCH}-1} M_{SC}^{SCI2}(l)\right\},$$

Referring to Equation 14, $N_{layers}$ may be the number of layers being used when the PSSCH is mapped onto frequency-time resources.

If the second control information is mapped always on the assumption of one layer, the layer number information being used for the PSSCH data mapping may be provided from the second control information.

Fifth Embodiment

The fifth embodiment provides an example in which even the second control information is transmitted on the PSCCH. In this case, the PSCCH on which the first control information is transmitted and the PSCCH on which the second control information is transmitted may be different PSCCHs from each other, and may be respectively mapped onto different frequency-time resources to be transmitted.

In this case, the first control information may transfer frequency and time resource information of the PSCCH on which the second control information is transmitted, and for example, the transmitting terminal may include an index of a sub-channel on which the PSCCH including the second control information or an offset value in the first control information to be notified. The sub-channel information may be frequency resource information. The time resource information may be a value preconfigured in the resource pool, and for example, it may be determined to be transmitted from the next symbol of the PSCCH on which the first control information is transmitted.

As described above, for convenience in explanation, the first to fifth embodiments have been dividedly described. However, the respective embodiments include related operations, and thus it is possible to combine and configure at least two embodiments with each other.

Figure 33:
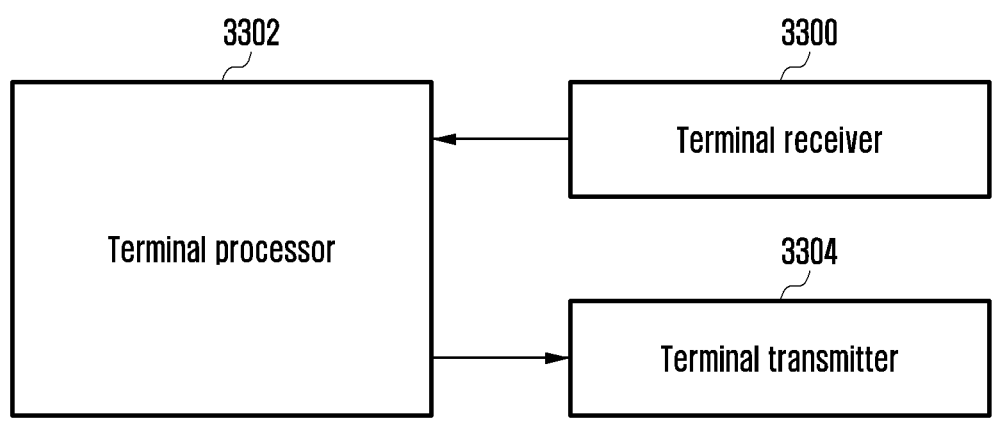
FIG. 33 is a block diagram illustrating an internal structure of a terminal according to an embodiment of the disclosure.
Figure 34:
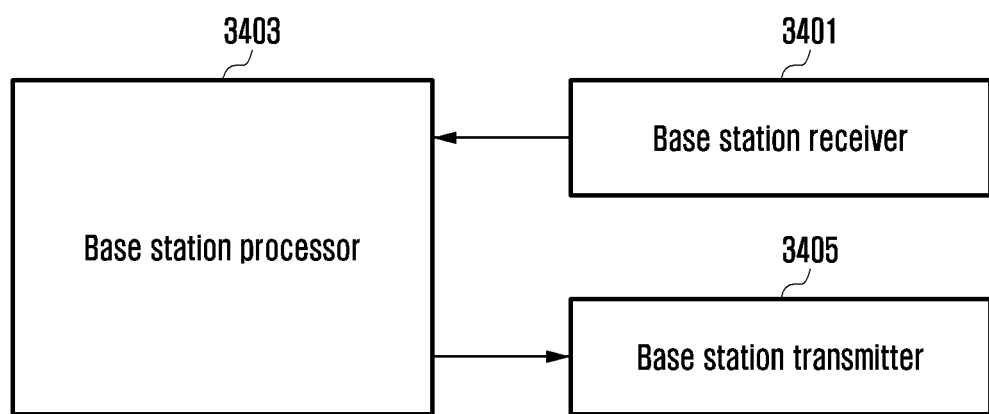
FIG. 34 is a block diagram illustrating an internal structure of a base station according to an embodiment of the disclosure.

In order to perform the above-described embodiments of the disclosure, transmitters, receivers, and processors of a terminal and a base station are illustrated in FIGS. 33 and 34. In the above-described embodiments of the disclosure, transmission and reception methods by a base station and a terminal are presented to transfer source and target IDs or RNTI for user discrimination, and in order to perform this, the receivers, processors, and transmitters of the base station and the terminal should operate according to the respective embodiments. In the following operations, the base station may be a terminal that performs transmission in a sidelink or a base station in the related art. In the following operations, the terminal may be a terminal that performs transmission or reception in the sidelink.

FIG. 33 is a block diagram illustrating an internal structure of a terminal according to an embodiment of the disclosure.

Referring to FIG. 33, the terminal, according to an embodiment of the disclosure, may include a terminal receiver 3300, a terminal transmitter 3304, and a terminal processor 3302. In an embodiment of the disclosure, the terminal receiver 3300 and the terminal transmitter 3304 may be commonly called a transceiver. The transceiver may transmit/receive a signal with a base station. The signal may include control information and data. For this, the transceiver may include an RF transmitter for up-converting and amplifying the frequency of a transmitted signal, and an RF receiver for low-noise-amplifying and down-converting the frequency of a received signal. Further, the transceiver may receive a signal through a radio channel, and may output the received signal to the terminal processor 3302. Further, the transceiver may also transmit the signal that is output from the terminal processor 3302 on the radio channel. The terminal processor 3302 may control a series of processes so that the terminal operates according to the above-described embodiments of the disclosure.

FIG. 34 is a diagram illustrating an internal structure of a base station according to an embodiment of the disclosure.

Referring to FIG. 34, a base station, according to an embodiment of the disclosure, may include a base station receiver 3401, a base station transmitter 3405, and a base station processor 3403. In an embodiment of the disclosure, the base station receiver 3401 and the base station transmitter 3405 may be commonly called a transceiver. The transceiver may transmit/receive a signal with a terminal. The signal may include control information and data. For this, the transceiver may include an RF transmitter for up-converting and amplifying the frequency of a transmitted signal, and an RF receiver for low-noise-amplifying and down-converting the frequency of a received signal. Further, the transceiver may receive a signal through a radio channel, and may output the received signal to the base station processor 3403. Further, the transceiver may also transmit the signal that is output from the base station processor 3403 through the radio channel. The base station processor 3403 may control a series of processes so that the base station operates according to the above-described embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents. Further, according to circumstances, the respective embodiments may be operated in combination. For example, the first embodiment and the fourth embodiment can be combined and applied. Further, other modified examples based on the technical idea of the above-described embodiments can be embodied in an LTE system and a 5G system.

What is claimed is:

1. A method performed by a first terminal in a communication system, the method comprising:
obtaining second sidelink control information (SCI) for sidelink data;
performing an attach of cyclic redundancy check (CRC) bits for the second SCI;
performing an encoding of the second SCI;
generating coded modulated symbols based on the encoded second SCI;
mapping the coded modulated symbols of the second SCI in resources on a physical sidelink shared channel (PSSCH); and
transmitting, to a second terminal, the PSSCH comprising the sidelink data and the second SCI,
wherein a number of the coded modulated symbols is identified based on a parameter $\gamma$, and the parameter $\gamma$ corresponds to a number of one or more remaining resource elements in a resource block to which a last coded modulated symbols of the second SCI is mapped.

2. The method of claim 1,
wherein the number of the coded modulated symbols is further identified based on a sum of the parameter $\gamma$ and a minimum value identified based on between $$\left\lceil \frac{(O_{SCI2} + L_{SCI2}) \cdot \beta_{offset}^{SCI2}}{R \cdot Q_m} \right\rceil \text{ and } \alpha \sum_{l=0}^{N_{symbol}^{PSSCH}-1} M_{sc}^{SCI2}(l),$$

and
where $O_{SCI2}$ is a number of bits of second SCI bits, $L_{SCI2}$ is a number of the CRC bits for the second SCI, $\beta_{offset}^{SCI2}$ is the beta offset, $\alpha$ is a parameter for controlling the number of coded modulated symbols for the second SCI, R is a coding rate of the PSSCH corresponding to the sidelink data, $Q_m$ is a modulation order of the second SCI, $N_{symbol}^{PSSCH}$ is a number of a symbols for the PSSCH, and $M_{sc}^{SCI2}(l)$ is a number of one or more resource elements which is capable of being used for transmitting the second SCI in an orthogonal frequency division multiplexing (OFDM) symbol.

3. The method of claim 1, further comprising:
obtaining first SCI based on the obtained second SCI,
wherein the first SCI includes resource allocation information on the PSSCH.

4. The method of claim 1, wherein the coded modulated symbols of the second SCI are mapped in resource elements in an OFDM symbol containing a first demodulation reference signal (DMRS) of the PSSCH.

5. The method of claim 1, wherein the second SCI includes a hybrid automatic repeat request (HARQ) process identifier, a new data indicator (NDI), a redundancy version (RV) of the PSSCH.

6. The method of claim 1, wherein the coded modulated symbols of the second SCI are mapped frequency first in a resource block unit.

7. A method performed by a second terminal in a communication system, the method comprising:
receiving, from a first terminal, a physical sidelink shared channel (PSSCH) comprising sidelink data and second sidelink control information (SCI);
obtaining coded modulated symbols of the second SCI from resources on the PSSCH;
identifying the second SCI from the coded modulated symbols of the second SCI,
wherein a number of the coded modulated symbols is based on a parameter $\gamma$, and the parameter $\gamma$ corresponds to a number of one or more remaining resource elements in a resource block to which a last coded modulated symbols of the second SCI is mapped.

8. The method of claim 7,
wherein the number of the coded modulated symbols is further based on a sum of the parameter $\gamma$ and a minimum value identified based on between $$\left\lceil \frac{(O_{SCI2} + L_{SCI2}) \cdot \beta_{offset}^{SCI2}}{R \cdot Q_m} \right\rceil \text{ and } \alpha \sum_{l=0}^{N_{symbol}^{PSSCH}-1} M_{sc}^{SCI2}(l),$$

and
where $O_{SCI2}$ is a number of bits of second SCI bits, $L_{SCI2}$ is a number of the CRC bits for the second SCI, $\beta_{offset}^{SCI2}$ is the beta offset, $\alpha$ is a parameter for controlling the number of coded modulated symbols for the second SCI, R is a coding rate of the PSSCH corresponding to the sidelink data, $Q_m$ is a modulation order of the second SCI, $N_{symbol}^{PSSCH}$ is a number of a symbols for the PSSCH, and $M_{sc}^{SCI2}(l)$ is a number of one or more resource elements which is capable of being used for transmitting the second SCI in an orthogonal frequency division multiplexing (OFDM) symbol.

9. The method of claim 7, further comprising:
receiving, from the first terminal, a physical sidelink control channel (PSCCH) comprising first SCI,
wherein the first SCI includes resource allocation information on the PSSCH.

10. The method of claim 7, wherein the coded modulated symbols of the second SCI are mapped in resource elements in an OFDM symbol containing a first demodulation reference signal (DMRS) of the PSSCH.

11. The method of claim 7, wherein the second SCI includes a hybrid automatic repeat request (HARQ) process identifier, a new data indicator (NDI), an redundancy version (RV) of the PSSCH.

12. A first terminal in a communication system, the first terminal comprising:
a transceiver; and
a controller coupled with the transceiver and configured to:
obtain second sidelink control information (SCI) for sidelink data,
perform an attach of cyclic redundancy check (CRC) bits for the second SCI,
perform an encoding of the second SCI,
generate coded modulated symbols based on the encoded second SCI,
map the coded modulated symbols of the second SCI in resources on a physical sidelink shared channel (PSSCH), and
transmit, to a second terminal, the PSSCH comprising the sidelink data and the second SCI,
wherein a number of the coded modulated symbols is identified based on a parameter $\gamma$, and the parameter $\gamma$ corresponds to a number of one or more remaining resource elements in a resource block to which a last coded modulated symbols of the second SCI is mapped.

13. The first terminal of claim 12,
wherein the number of the coded modulated symbols is further identified based on a sum of the parameter $\gamma$ and a minimum value identified based on between $$\left\lceil \frac{(O_{SCI2} + L_{SCI2}) \cdot \beta_{offset}^{SCI2}}{R \cdot Q_m} \right\rceil \text{ and } \alpha \sum_{l=0}^{N_{symbol}^{PSSCH}-1} M_{sc}^{SCI2}(l),$$

and
where $O_{SCI2}$ is a number of bits of second SCI bits, $L_{SCI2}$ is a number of the CRC bits for the second SCI, $\beta_{offset}^{SCI2}$ is the beta offset, $\alpha$ is a parameter for controlling the number of coded modulated symbols for the second SCI, R is a coding rate of the PSSCH corresponding to the sidelink data, $Q_m$ is a modulation order of the second SCI, $N_{symbol}^{PSSCH}$ is a number of a symbols for the PSSCH, and $M_{sc}^{SCI2}(l)$ is a number of one or more resource elements which is capable of being used for transmitting the second SCI in an orthogonal frequency division multiplexing (OFDM) symbol.

14. The first terminal of claim 13,
wherein the controller is further configured to obtaining first SCI based on the obtained second SCI, and
wherein the first SCI includes resource allocation information on the PSSCH.

15. The first terminal of claim 13, wherein the coded modulated symbols of the second SCI are mapped in resource elements in an OFDM symbol containing a first demodulation reference signal (DMRS) of the PSSCH.

16. The first terminal of claim 13, wherein the second SCI includes a hybrid automatic repeat request (HARQ) process identifier, a new data indicator (NDI), a redundancy version (RV) of the PSSCH.

17. The first terminal of claim 13, wherein the coded modulated symbols of the second SCI are mapped frequency first, then mapped in a next symbol.

18. A second terminal in a communication system, the second terminal comprising:
a transceiver; and
a controller coupled with the transceiver and configured to:
receive, from a first terminal, a physical sidelink shared channel (PSSCH) comprising sidelink data and second sidelink control information (SCI),
obtain coded modulated symbols of the second SCI from resources on the PSSCH, and
identify the second SCI from the coded modulated symbols of the second SCI,
wherein a number of the coded modulated symbols is based on a parameter γ, and the parameter γ corresponds to a number of one or more remaining resource elements in a resource block to which a last coded modulated symbols of the second SCI is mapped.

19. The second terminal of claim 18,
wherein the number of the coded modulated symbols is further based on a sum of the parameter γ and a minimum value identified based on between $$\left\lceil \frac{(O_{SCI2} + L_{SCI2}) \cdot \beta_{offset}^{SCI2}}{R \cdot Q_m} \right\rceil \text{ and } \alpha \sum_{l=0}^{N_{symbol}^{PSSCH}-1} M_{sc}^{SCI2}(l),$$

and
where $O_{SCI2}$ is a number of bits of second SCI bits, $L_{SCI2}$ is a number of the CRC bits for the second SCI, $\beta_{offset}^{SCI2}$ is the beta offset, α is a parameter for controlling the number of coded modulated symbols for the second SCI, R is a coding rate of the PSSCH corresponding to the sidelink data, $Q_m$ is a modulation order of the second SCI, $N_{symbol}^{PSSCH}$ is a number of a symbols for the PSSCH, and $M_{sc}^{SCI2}(l)$ is a number of one or more resource elements which is capable of being used for transmitting the second SCI in an orthogonal frequency division multiplexing (OFDM) symbol.

20. The second terminal of claim 18,
wherein the controller is further configured to receive, from the first terminal, a physical sidelink control channel (PSCCH) comprising first SCI, and
wherein the first SCI includes resource allocation information on the PSSCH.

21. The second terminal of claim 18, wherein the coded modulated symbols of the second SCI are mapped in resource elements in an OFDM symbol containing a first demodulation reference signal (DMRS) of the PSSCH.

22. The second terminal of claim 18, wherein the second SCI includes a hybrid automatic repeat request (HARQ) process identifier, a new data indicator (NDI), an redundancy version (RV) of the PSSCH.

* * * * *